US012692326B2

(12) United States Patent
Lundberg et al.

(10) Patent No.: US 12,692,326 B2
(45) **Date of Patent: *Jul. 28, 2026**

(54) POLYMERIC PARTICLES

(71) Applicant: Life Technologies AS, Oslo (NO)

(72) Inventors: Per Nils Pontus Lundberg, Strømmen (NO); Geir Fonnum, Fjellhamar (NO); Kristian Andersson, Raelingen (NO)

(73) Assignee: Life Technologies Corporation, Carlsbad, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 18/143,880

(22) Filed: May 5, 2023

(65) Prior Publication Data

US 2023/0272127 A1 Aug. 31, 2023

Related U.S. Application Data

(63) Continuation of application No. 16/478,452, filed as application No. PCT/EP2018/051349 on Jan. 19, 2018, now Pat. No. 11,680,113.

(30) Foreign Application Priority Data

Jan. 20, 2017 (GB) .................................... 1700983

(51) Int. Cl.
*C08F 2/38* (2006.01)
*C08F 120/54* (2006.01)
(Continued)

(52) U.S. Cl.
CPC .............. *C08F 2/38* (2013.01); *C08F 120/54* (2013.01); *C08F 228/02* (2013.01);
(Continued)

(58) Field of Classification Search
CPC . C08J 3/075; C08J 9/286; C08L 33/26; C08F 120/54; C08F 2/38
See application file for complete search history.

(56) References Cited

U.S. PATENT DOCUMENTS

2002/0106659 A1 8/2002 Karlou-Eyrisch et al.
2004/0018160 A1 1/2004 Hu et al.
(Continued)

FOREIGN PATENT DOCUMENTS

CN 102448995 A 5/2012
CN 104549162 A 4/2015
(Continued)

OTHER PUBLICATIONS

Substance Detail CAS Registry No. 868-63-3â by Scifinder. Accessed Oct. 23, 2025. (Year: 2025).*
(Continued)

*Primary Examiner* — Christina H.W. Rosebach
(74) *Attorney, Agent, or Firm* — Vijay Gore

(57) ABSTRACT

This invention also relates to monodisperse coated hydrogel polymer particles comprising a polymer formed from (a) a hydrophilic vinylic monomer having a log $P_{oct/wat}$ (log P) of less than about 0.6; and (b) a crosslinker comprising at least two vinyl groups; and a coating. Also provided are methods of forming the monodisperse coated hydrogel polymer particles.

10 Claims, 5 Drawing Sheets

(51) Int. Cl.

| | |
|---|---|
| ***C08F 228/02*** | (2006.01) |
| ***C08F 230/02*** | (2006.01) |
| ***C08J 3/075*** | (2006.01) |
| ***C08J 9/28*** | (2006.01) |
| ***C08K 3/22*** | (2006.01) |
| ***C08K 5/5333*** | (2006.01) |
| ***C08L 33/26*** | (2006.01) |
| *C08K 5/42* | (2006.01) |

(52) U.S. Cl.
CPC ............. *C08F 230/02* (2013.01); *C08J 3/075* (2013.01); *C08J 9/286* (2013.01); *C08K 3/22* (2013.01); *C08K 5/5333* (2013.01); *C08L 33/26* (2013.01); *C08J 2333/26* (2013.01); *C08K 2003/2275* (2013.01); *C08K 5/42* (2013.01); *C08K 2201/01* (2013.01); *C08L 2312/00* (2013.01)

(56) References Cited

U.S. PATENT DOCUMENTS

| | | | | |
|---|---|---|---|---|
| 2005/0043696 A1 | 2/2005 | Schmidt et al. | | |
| 2007/0054119 A1 | 3/2007 | Garstecki et al. | | |
| 2013/0211006 A1 * | 8/2013 | Menchen | ............. | C12Q 1/6876 525/54.2 |
| 2018/0215852 A1 * | 8/2018 | Fonnum | ................ | C08F 120/54 |

FOREIGN PATENT DOCUMENTS

| | | | | |
|---|---|---|---|---|
| CN | 104845006 A | 8/2015 | | |
| JP | H0812895 A | 1/1996 | | |
| JP | 2004502851 A | 1/2004 | | |
| JP | 2011521021 A | 7/2011 | | |
| JP | 2011521201 A | 7/2011 | | |
| WO | WO-2010125170 A1 | 11/2010 | | |
| WO | WO-2010149150 A2 | 12/2010 | | |
| WO | WO-2017013138 A1 * | 1/2017 | ............ | C08F 265/10 |

OTHER PUBLICATIONS

2hydroxy ethyl acrylate, Generated by ChemDraw, Jun. 2021. (Year: 2021).
Acrylic acid, Generated by ChemDraw, Jun. 2021. (Year: 2021).
Delgado M., et al., "A Tunable Hydrogel for Encapsulation and Controlled Release of Bioactive Proteins," Biomacromolecules, 2002, vol. 3, No. 2, pp. 262-271.
EP21168234.9, Extended European Search Report, Jul. 27, 2021, 8 pages.
International Preliminary Report on Patentability for Application No. PCT/EP2018/051349, mailed Aug. 1, 2019, 12 pages.
International Search Report and Written Opinion for Application No. PCT/EP2018/051349, mailed Nov. 13, 2018, 16 pages.
Kondo et al., "Development and Application of Thermo-Sensitive Magnetic Immunomicrospheres for Antibody Purification", Applied Microbiology and Biotechnology, 1994, vol. 41, pp. 99-105.
Lowe et al., "The preparation and physico-chemical properties of poly(N-ethylacrylamide) microgels", Polymer, 1998, vol. 39, No. 5, pp. 1207-1212.
Machine Translation of JP08-012895 by Ebisawa et al., (Year: 1996).
N-ethylacrylamide, Generated by ChemDraw, Jun. 2021 (Year: 2021).
Nnmethylenebisacrylamide, Generated by ChemDraw, Jun. 2021. (Year: 2021).
Paquet et al., "Clusters of Superparamagnetic Iron Oxide Nanoparticles Encapsulated in a Hydrogel: A Particle Architecture Generating a Synergistic Enhancement of the T2 Relaxation", ACS Nano, 2011, vol. 5, No. 4, pp. 3104-3112.
Partial International Search Report for Application No. PCT/EP2018/051349, mailed Sep. 21, 2018, 12 pages.
Translation of WO2010149150A2 by Mueller-Schulte. (Year: 2010).
Zhang et al., "Polymer Microgels: Reactors for Semiconductor, Metal, and Magnetic Nanoparticles", Journal of the American Chemical Society, 2004, vol. 126, pp. 7908-7914.

* cited by examiner

POLYMERIC PARTICLES

CROSS REFERENCE

This application is a Divisional of U.S. application Ser. No. 16/478,452, filed Jul. 16, 2019, which is a 371 of International Application No. PCT/EP2018/05134, filed Jan. 19, 2018, which claims priority to GB Application no. 1700983.8 filed Jan. 20, 2017, which disclosures are herein incorporated by reference in their entirety.

This invention relates to monodisperse polymer particles useful in biological assays and other applications. The monodisperse polymer particles are magnetic and/or coated. The invention also relates to processes for preparing such particles and methods of using the particles, as well as other subject matter.

BACKGROUND

Polymeric particles are used in a wide variety of applications, for instance biological assays or sequencing applications. In some of these applications, it is desirable to include magnetic material in the polymeric particles, for example to permit magnetic isolation of the polymeric particles. In some of these applications, it is desirable to provide a coating on the polymeric particles, for example to modify the surface properties of the particles. The base polymer particles are typically made by emulsion polymerisation or dispersion/precipitation polymerisation.

Emulsion polymerisation can be used to form relatively monodisperse polymer particles of from 50-1,000 nm. The formation of monodisperse polymer particles does, however, have a number of important limitations. Firstly, all of the particles must be formed as part of the same batch and within a short timespan relative to the polymerization time. Secondly, growth conditions need to be controlled to ensure that growth of the polymer particles is identical in all particles. Thirdly, as the process requires that monomer is transferred from large reservoir droplets and swelled into the growing particles, the particles are either not crosslinked, or have a very low level of crosslinking, as higher levels of crosslinking will prevent the particles swelling.

Precipitation or dispersion polymerisation may be used to create larger particles, of 0.5-10 micron. Precipitation polymerisation is carried out in a solvent (e.g. alcohols) that dissolves the monomer, but not the polymer. Monodispersity can be achieved when the polymer precipitates out of solution and particles formation happens in a short time span. A relatively large amount of steric stabilizer is required to stabilize the particles after precipitation. The amount and type of stabilizer may change the size of the particles, and porous particles can be obtained by use of a high level of crosslinker. The conditions in precipitation polymerisation are, however, difficult to control, for example it is very difficult to control porosity, which is a result of how the pore structure is built up when the polymers precipitate out of solution. The difficulties of precipitation polymerisation mean that in practice it is nearly impossible to produce porous particle with the same monomer composition and porosity for more than a very limited size variation.

One way to address some of the issues is to produce crosslinked porous or solid monodisperse polymer particles by a two stage process, named the Ugelstad process after the late Professor John Ugelstad, which is described for example in EP-B-3905 and U.S. Pat. No. 4,530,956. An improved Ugelstad process is described in WO 00/61647. In the Ugelstad process, seed particles, suitably made by emulsion polymerization, are converted in two steps into monodisperse particles by seeded suspension polymerization. In a first step, the seed particles are swollen by making a fine (e.g. submicron) aqueous emulsion of a relatively low molecular weight water-insoluble substance and then adding a water-miscible organic solvent (e.g. acetone) so that the water-insoluble substance diffuses into the seed particles. It is convenient for the water-insoluble substance to be a heat-activated polymerisation initiator. In a second step, the solvent is then removed, locking the water-insoluble substance in the seed particles, and the seed particles take up a large quantity of monomer and also a crosslinker. Following initiation of polymerization, e.g. by heating to activate the initiator, larger polymer particles are produced. The Ugelstad process therefore comprises making seed particles by emulsion polymerization and expanding the seed particles by suspension polymerization. The smallest monodisperse particles described in the aforementioned prior art have an average diameter of 1 μm.

In a simplified version of the Ugelstad process, the enhanced capacity for swelling may be achieved simply by the use of oligomeric seed particles, e.g. where the oligomer weight average molecular weight corresponds to up to 50 monomer units (a molecular weight of about 5000 in the case of polystyrene). This is described in U.S. Pat. No. 4,530,956. In another version of the Ugelstad process, described in WO2010/125170, oligomeric seed particles can be used to make monodisperse particles with an average diameter in the submicron range.

Particles made in accordance with the Ugelstad process or its variants as described above may be made magnetic, for example as described in WO 00/61647 or WO 2010/125170. The particles made by the Ugelstad process and its variants as described above are, however, made from hydrophobic monomers, such as styrene, typically using oil (discontinuous phase) in aqueous (continuous phase) systems. The resulting polymer particles are therefore hydrophobic. Hydrophobic particles suffer from the problem of non-specific absorption when used in biological applications. This means that hydrophobic polymer particles are typically surface modified, for example with a coating, to increase the hydrophilicity of the surface prior to use in biological applications.

US 2014/0073715 describes a method of producing monodisperse hydrophilic particles. The method uses monomers that have a hydrophobic protection group added to the monomers that polymerize to form the particles and removing the protection group afterwards. Addition and removal of the protecting group does, however, add to the complexity of the process and may limit the number of different types of monomer that can be used in the process.

It is apparent that known magnetic monodisperse polymeric particles and methods of making such particles are subject to a number of limitations. This also applies to coated monodisperse polymeric particles. There is therefore a need for new monodisperse polymeric particles and new methods of production.

It is an aim of the invention to provide monodisperse magnetic polymeric particles and methods of making monodisperse magnetic polymeric particles with a low coefficient of variation (CV) and/or low % polydispersity. It is also an aim of the invention to provide coated monodisperse polymeric particles and methods of making coated monodisperse polymeric particles with a low coefficient of variation (CV) and/or low % polydispersity.

BRIEF SUMMARY OF THE DISCLOSURE

The invention is based in part on an appreciation that seed particles comprising hydrophilic oligomers may be used in a novel process for forming cross-linked monodisperse polymeric particles. The invention is also based on an appreciation that the cross-linked monodispersed polymeric particles formed may be made magnetic by the deposition of magnetic material in pores of the cross-linked monodispersed polymeric particles. The invention is also based on an appreciation that the cross-linked monodispersed polymeric particles formed may be coated with other substances.

In accordance with a first aspect of the present invention there are provided monodisperse magnetic hydrogel polymer particles comprising a magnetic material and a polymer formed from (a) a hydrophilic vinylic monomer having a log $P_{oct/wat}$ (log P) of less than about 0.6; and (b) a crosslinker comprising at least two vinyl groups.

In an embodiment the hydrophilic vinylic monomer comprises at least one hydrophilic vinylic monomer selected from a monomer:

(i) comprising —C(O)$NH_2$, —C(O)$NHCH_3$, —C(O)$NHCH_2CH_3$, or —C(O)$N(CH_3)_2$;

(ii) a compound of formula (Ib):

(Ib)

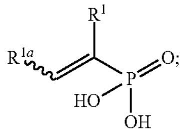

(iii) a compound of formula (Ic):

(Ic)

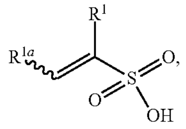

wherein:

$R^1$ and $R^{1a}$ are each independently selected from —H, —$CH_3$, —$CH_2CH_3$ or —$CH_2$C(O)OH;

(iv) 4-acrylolymorpholine or 1-vinylimidazole; and (v) comprising at least two vinyl groups that does not comprise a primary amine, a secondary amine, a hydroxy or a carboxylic acid.

A second aspect of the invention provides monodisperse coated hydrogel polymer particles comprising a polymer formed from (a) a hydrophilic vinylic monomer having a log $P_{oct/wat}$ (log P) of less than about 0.6; and (b) a crosslinker comprising at least two vinyl groups; the particles further comprising a coating.

In an embodiment the hydrophilic vinylic monomer comprises at least one hydrophilic vinylic monomer selected from a monomer:

(i) comprising —C(O)$NH_2$, —C(O)$NHCH_3$, —C(O)$NHCH_2CH_3$, or —C(O)$N(CH_3)_2$;

(ii) a compound of formula (Ib):

(Ib)

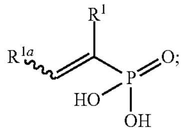

(iii) a compound of formula (Ic):

(Ic)

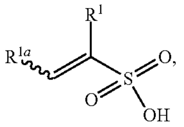

wherein:

$R^1$ and $R^{1a}$ are each independently selected from —H, —$CH_3$, —$CH_2CH_3$ or —$CH_2$C(O)OH;

(iv) 4-acrylolymorpholine or 1-vinylimidazole; and (v) comprising at least two vinyl groups that does not comprise a primary amine, a secondary amine, a hydroxy or a carboxylic acid.

A third aspect of the invention provides monodisperse hydrogel polymer particles formed from (a) a hydrophilic vinylic monomer comprising a monomer selected from 4-acryloylmorpholine and 1-vinylimidazole; and (b) a crosslinker comprising at least two vinyl groups.

A fourth aspect of the invention provides a method of forming monodisperse hydrogel polymer particles, e.g. of the third aspect. In an embodiment the method comprises:

forming a solution (a) of at least 2% wt of a hydrophilic vinylic monomer comprising a monomer selected from 4-acryloylmorpholine and 1-vinylimidazole in an aqueous solution, the solution also comprising the crosslinker comprising at least two vinyl groups;

forming a solution (b) of stabilizer in an organic solvent, wherein the organic solvent is not miscible in water, and wherein at least one of solution (a) and solution (b) comprises a radical initiator; mixing solutions (a) and (b) to form a water-in-oil emulsion (c) and adding monodisperse seed particles to the emulsion;

allowing the monodisperse seed particles to form swollen particles in the emulsion; and polymerising the swollen particles to form the monodisperse hydrogel polymer particles.

In an embodiment the method comprises:

forming a solution (a) of at least 2% wt of a hydrophilic vinylic monomer comprising a monomer selected from 4-acryloylmorpholine and 1-vinylimidazole in an aqueous solution, the aqueous solution also comprising a chain transfer agent;

forming a solution (b) of stabilizer in an organic solvent, wherein the organic solvent is not miscible in water, and wherein at least one of solution (a) and solution (b) comprises a radical initiator;

mixing solutions (a) and (b) to form a water-in-oil emulsion (c) and adding monodisperse seed particles to the emulsion;

allowing the monodisperse seed particles to form swollen particles in the emulsion;

polymerising the swollen particles to form monodisperse polymer particles;

forming a solution (d) of stabilizer in an organic solvent, wherein the organic solvent is not miscible in water;

forming a solution (e) of at least 2% wt of a hydrophilic vinylic monomer comprising a monomer selected from 4-acryloylmorpholine and 1-vinylimidazole in an aqueous solution, the aqueous solution also comprising a crosslinker comprising at least two vinyl groups, wherein at least one of solution (d) and solution (e) comprises a radical initiator;

mixing solutions (d) and (e) to form a water-in-oil emulsion (f) and adding the monodisperse polymer particles to the emulsion;

allowing the monodisperse polymer particles to form swollen polymer particles in the emulsion; and polymerising the swollen polymer particles to form the monodisperse hydrogel polymer particles.

A fifth aspect provides a method of forming monodisperse magnetic hydrogel polymer particles. The method comprises forming an aqueous suspension comprising monodisperse hydrogel polymer particles and a magnetic material or a magnetic material precursor. When the aqueous suspension comprises a magnetic material precursor, the magnetic material precursor is converted into a magnetic material. The magnetic material (whether or not the aqueous suspension initially comprised a magnetic material precursor) is allowed to associate with the polymer particles. The monodisperse hydrogel polymer particles are formed from (a) a hydrophilic vinylic monomer having a log $P_{oct/wat}$ (log P) of less than about 0.6; and (b) a crosslinker comprising at least two vinyl groups. In an embodiment forming the aqueous suspension comprises forming an aqueous suspension of pH less than 6 comprising monodisperse hydrogel polymer particles and $Fe^{2+}$ and/or $Fe^{3+}$ ions; and converting the magnetic material precursor into a magnetic material comprises raising the pH to more than 8; and allowing the magnetic material to precipitate.

A sixth aspect provides a method of forming coated monodisperse hydrogel polymer particles. The method comprises forming a suspension comprising the monodisperse hydrogel polymer particles and at least one epoxide or at least one silicate or at least one silane; and reacting an epoxy group of the at least one epoxide with a surface functional group of the particles; or reacting the silicates to form a silica coating. The monodisperse hydrogel polymer particles are formed from (a) a hydrophilic vinylic monomer having a log $P_{oct/wat}$ (log P) of less than; and (b) a crosslinker comprising at least two vinyl groups.

A seventh aspect comprises monodisperse magnetic hydrogel polymer particles or coated monodisperse hydrogel polymer particles obtainable by the method of the fifth or sixth aspect. The monodisperse magnetic hydrogel polymer particles monodisperse or coated monodisperse hydrogel polymer particles may be obtained by the method of the fifth or sixth aspect.

An eighth aspect comprises the use of monodisperse magnetic hydrogel polymer particles of the first or seventh aspect in an assay.

A ninth aspect comprises the use of coated monodisperse hydrogel polymer particles of the second or seventh aspect in an assay.

A tenth aspect comprises the use of monodisperse hydrogel polymer particles of the third aspect, or monodisperse hydrogel polymer particles formed according to the method of the fourth aspect, in an assay.

An embodiment of the invention provides particles which have been obtained by the processes described in this specification.

An embodiment of the invention provides particles having the characteristics of particles obtained by the methods disclosed herein; whilst such particles are obtainable by the processes described herein, they are characterized solely by their properties and not by their method of manufacture and, accordingly, the scope of protection of claims directed to particles specified by their characteristics is determined solely by the characteristics of the particles to the exclusion of their actual method of manufacture.

The products, processes and uses of the invention are not limited to the subject matter just-mentioned but are, without limitation, described more fully in the following description and claims.

BRIEF DESCRIPTION OF THE DRAWINGS

Embodiments of the invention are further described hereinafter with reference to the accompanying drawings, in which.

DETAILED DESCRIPTION

Figure 1:
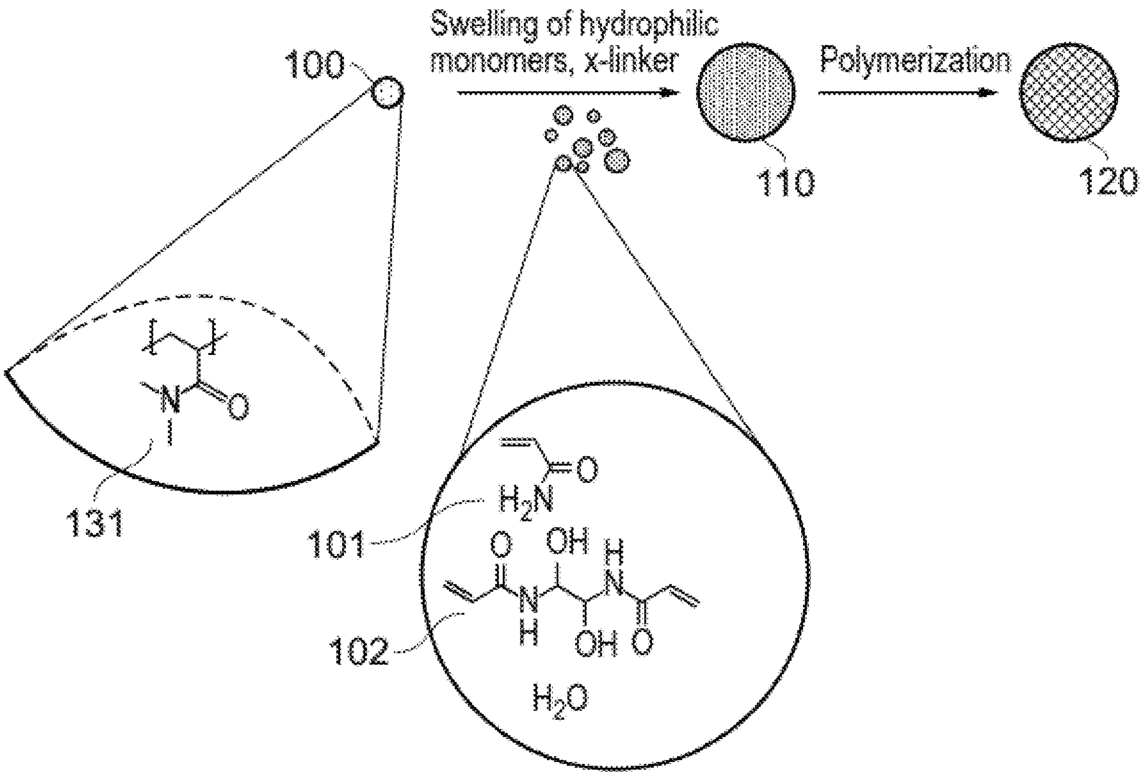
FIG. 1 is a diagrammatic representation of a single-stage swelling particle forming process of the disclosure, including an indication of example monomers.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any embodiments disclosed herein. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

All publications, patent applications, patents, and other references mentioned herein are incorporated by reference in their entirety. In case of conflict, the present specification, including definitions, will control.

The present invention provides in an embodiment novel magnetic polymer particles and another embodiment provides a process by which said novel particles may be prepared. Other embodiments provide methods of using the polymer particles.

The polymer particle forming process involves a water-in-oil emulsion, i.e. a discontinuous aqueous phase suspended in a continuous oil phase. The formed polymer particles may then be made magnetic and/or be coated.

The polymer particle forming process described herein involves, therefore, two different particles, namely a seed particle which is subjected to a swelling and polymerization process to form a polymer particle. The terms "seed particle" and "polymer particle" are therefore used herein as follows:

"Seed particle" means, unless the context requires otherwise, a particle obtainable by dispersion polymerization and used as an intermediate in the polymer particle forming process.

"Polymer particle" refers to a particle which may be made from the seed particle by suspension polymerization in the process described herein. After polymerization, magnetic material may be added to the particles. For example, where the polymer particle comprises pores, magnetic material may be deposited into at least a portion of the pores. After polymerization (and optionally addition of magnetic material), the particles may be coated, for example with an organic (e.g. polymeric) or silica coating.

The polymer particles may be "formed from" specified hydrophilic vinylic monomer and crosslinker. The specified hydrophilic monomer may comprise one or more monomers. The specified crosslinker may comprise one or more crosslinker. "Formed from" in this context may mean that the polymer consists of reacted specified hydrophilic vinylic monomer and crosslinker. "Formed from" in this context may mean that the polymer comprises specified hydrophilic vinylic monomer and crosslinker, together with small amounts of other vinylic monomer and/or crosslinker. For example, the polymer may comprise at least 90% wt specified monomer and crosslinker and not more than 10% wt other vinylic monomer and/or crosslinker; e.g. the polymer may comprise at least 95% wt specified monomer and crosslinker and not more than 5% wt other vinylic monomer and/or crosslinker. For example, the polymer may comprise at least 98% wt specified monomer and crosslinker and not more than 2% wt other vinylic monomer and/or crosslinker; e.g. the polymer may comprise at least 99% wt specified monomer and crosslinker and not more than 1% wt other vinylic monomer and/or crosslinker.

"Magnetic material" means a substance that responds to a magnetic field. When the magnetic material is paramagnetic, the magnetic properties are switched off when the magnetic field is removed. When the magnetic material is superparamagnetic, the magnetic material becomes saturated at relatively low magnetic fields and switching off of the magnetic properties with removal of the magnetic field is very rapid/instant. When the magnetic material is ferromagnetic, all of its magnetic atoms within each domain add a positive contribution to the net magnetization. When the magnetic material is ferrimagnetic, some magnetic atoms within each domain are opposed, but overall the material exhibits net magnetization. Both ferromagnetic and ferrimagnetic material retain magnetic properties after an external magnetic field is removed. Above the material's Currie temperature, ferromagnetic and ferromagnetic material becomes a paramagnetic material. The magnetic properties may also be affected by the size of the magnetic particles in the magnetic material, with some materials being ferromagnetic and ferrimagnetic at larger particle sizes, but superparamagnetic suitably small particle sizes (e.g. nm scale). For example, ferrimagnetic material, e.g. iron oxides, form superparamagnetic crystals when the size of the crystals is sufficiently small (e.g. below about 15 nm scale for iron oxides).

"Magnetic material precursor" means a substance that may be converted to provide a magnetic material. A magnetic material precursor may comprise solvated transition metal ions (e.g. polyvalent cations of Fe, Ni, Co or a combination thereof, optionally in admixture with polyvalent cations of Al, Mn, Cu, Zn, Ca, Ge, Te, Ti or Sn and/or rare earths). The solvated transition metal ions and/or rare earth ions may be converted to a magnetic material by any process that causes the ions to precipitate, e.g. as oxides. Precipitation may be caused by, for example, a pH change, removal of solvent, or a change in temperature. For example, a magnetic material precursor may be provided by an aqueous suspension of pH less than 6 comprising $Fe^{2+}$ and/or $Fe^{3+}$ ions; and the $Fe^{2+}$ and/or $Fe^{3+}$ ions may be converted to a magnetic material by precipitation, e.g. by raising the pH to more than 8.

"Coating" means a covering that is applied to the surface of a substrate. The coating may be an all-over coating, completely covering the substrate, or it may be a partial coating, only covering a portion of the surface of the substrate. The coating may be applied to the substrate by any suitable type of bonding, for example by at least one of covalent bonding, metallic bonding, ionic bonding, hydrogen bonding, van der Waals interactions, hydrophobic interactions, and the like. Porous substrates may be coated so that at least a portion of the coating is present within the pores, while maintaining the porous structure (e.g. because the coating partially fills the pores). Where the substrate comprises a polymer, the coating (or at least a part thereof) may be provided by grafting. Where the coating (or at least a part thereof) is provided by grafting, the coating may be a partial coating. In the present disclosure, unless required otherwise by the context, the substrate is a polymer particle or polymer particles. The polymer particles may be magnetic polymer particles or polymer particles that do not comprise magnetic material.

"Grafting" in the context of polymer chemistry comprises a reaction in which one or more species of block are connected to the main chain of a macromolecule as side-chains having constitutional or configurational features that differ from those in the main chain. Where the substrate is a polymer particle or polymer particles and the coating (or at least a part thereof) is provided by grafting, the polymer of the polymer particle provides the main chain and the coating provides the side chain (or side chains).

The mention of "hydrogel" with reference to polymer, for example polymer particles, means a polymer gel in which the swelling agent is water. A hydrogel polymer may absorb at least 20% of its weight in water. A hydrogel polymer may absorb at least 45%, at least 65%, at least 85%, at least 100% or at least 300% of its weight in in water. For example a hydrogel polymer may absorb at least 1000%, at least 1500% or even at least 2000% of its weight in water.

The mention of "transparent" in relation to polymer particles (for example hydrogel polymer particles) means that the particles are porous and that molecules or other reagents of interest are able to diffuse readily through aqueous solution in the pores of the particles. For example, crosslinked hydrogel polymer particles of the present disclosure may be transparent to oligonucleotides and nucleic acid amplification and sequencing reagents, e.g. the oligonucleotides may be located partly or wholly within the pores, even when a polymerase is attached to the oligonucleotide.

The mention in this specification of "average" diameters unless otherwise specified refers to the mode diameter for cross-linked polymer particles (e.g. cross-linked hydrogel polymer particles, magnetic hydrogel polymer particles and/or coated hydrogel polymer particles) or refers to the z-average diameter for seed particles. The mode diameter may be measured by disc centrifuge, for example by a CPS disc centrifuge. The z-average diameter may be the z-average mean diameter measured by dynamic light scattering (also known as photon correlation spectroscopy). Across the entire scope, there are further hereby disclosed embodiments in which the average diameters are the mode diameter, e.g. the mode diameter as determined by optical microscopy.

The term "monodisperse" means that for a plurality of particles (e.g. at least 100, more preferably at least 1000) the particles have a coefficient of variation (CV) or % polydispersity of their diameters of less than 20%, for example less than 15%, typically of less than 10% and optionally of less than 8%, e.g. less than 5%.

The term "Mw" is the weight average molecular weight of a polymer. It is defined by the following formula:

$$Mw = \frac{\sum N_i M_i^2}{\sum N_i M_i}$$

where $M_i$ is the molecular weight of a particular chain and $N_i$ is the number of chains of that molecular weight. The Mw may be measured using gel permeation chromatography (GPC) relative to a set of standard polymers with a specified eluent solvent system. For example, the Mw of the oligomers or polymers in seed particles may be measured by GPC relative to polystyrene standards using as eluent DMF with 0.01 M LiBr.

The mention in this specification of "polydispersity" or "% polydispersity" refer to a value for dynamic light scattering data derived from the "polydispersity index". The polydispersity index is a number calculated from a simple 2 parameter fit to the correlation data, e.g. dynamic light scattering data, as defined in ISO standard document 13321:1996 E and ISO 22412:2008. The polydispersity index is dimensionless and scaled such that values smaller than 0.05 are rarely seen other than with highly monodisperse standards. Polydispersity index values of greater than 0.7 for a sample of particles indicate that the sample has a very broad size distribution, e.g. the particles are not monodisperse.

The term "alkyl" and "$C_x$-$C_y$ alkyl" (where x is at least 1 and less than 10, and y is a number greater than 10) as used herein include reference to a straight or branched chain alkyl moiety having, e.g. 1, 2, 3, 4, 5, 6, 7, 8, 9 or 10 carbon atoms. The term includes reference to, for example, methyl, ethyl, propyl (n-propyl or isopropyl), butyl (n-butyl, sec-butyl or tert-butyl), pentyl, hexyl and the like. In particular, alkyl may be a "$C_1$-$C_6$ alkyl", i.e. an alkyl having 1, 2, 3, 4, 5 or 6 carbon atoms; or a "$C_1$-$C_4$ alkyl", i.e. an alkyl having 1, 2, 3 or 4 carbon atoms. The term "lower alkyl" includes reference to alkyl groups having 1, 2, 3 or 4 carbon atoms. An alkyl may be optionally substituted, where chemically possible, by 1 to 5 substituents which are each independently at each occurrence selected from: oxo, $=NR^a$, $=NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl.

The term "alcohol" $C_x$-$C_y$ alcohol" (where x is at least 1 and less than 10, and y is a number greater than 10) as used herein include reference to a straight or branched chain alcohol moiety having, e.g. 1, 2, 3, 4, 5, 6, 7, 8, 9 or 10 carbon atoms. The term includes reference to a corresponding alkyl substituted with one or more hydroxyl (—OH) group. The term thus includes reference to a monohydroxy substituted alcohol or a polyol (e.g. a diol or triol). In particular, alcohol may be a "$C_1$-$C_6$ alcohol", i.e. an alkyl having 1, 2, 3, 4, 5 or 6 carbon atoms and 1 or more hydroxyl groups; or a "$C_1$-$C_4$ alcohol", i.e. an alcohol having 1, 2, 3 or 4 carbon atoms and one or more hydroxyl groups.

The symbol ⌇ denotes a point of attachment of a moiety to the remainder of a compound.

The term "log P" as used herein refers to the octanol-water partition coefficient (log $P_{oct/wat}$) for a compound, for example a hydrophilic vinylic monomer. The log P for a compound may be determined by any one of a variety of methods. In particular, for compounds of use in embodiments and other compounds disclosed herein, log P may be measured in accordance with the shake-flask method described in J. Sangster, "Octanol-water partition coefficients of simple organic compounds", *J. Phys. Chem. Ref. Data*, Vol. 18, No. 3, 1989, 1111-1227 (incorporated herein by reference in its entirety) at section 2.1.a on page 1116. Log P may also be calculated from the structure of the compound using software, e.g. log P may be calculated using ChemBioDraw® Ultra 14.0 from CambridgeSoft Corp.

Since log P is an organic phase-water phase partition coefficient, this value for a given compound correlates with the fraction of monomer that is in the water phase. In particular, the lower (including more negative) this value is, the higher the fraction of the compound (e.g. monomer or crosslinker) will be in the water or aqueous phase. Compounds (e.g. monomer or crosslinker) of use in the invention should have a low enough log P, so that at equilibrium the compounds are available in a sufficient amount in the aqueous phase for polymerisation, for example according to the methods for the preparation of particles disclosed herein. Log P may therefore be useful to characterise compounds used in the present invention.

It is also possible to estimate the tendency of a molecule to be in the organic phase or water phase based on the molecular structure of the compound. For example, monomers that comprise more hydrophilic atoms like nitrogen and oxygen and less carbon atoms are likely to have more hydrophilic groups and have an increased tendency to partition to the aqueous phase.

Since the compounds of interest in the present invention (e.g. monomers and/or crosslinkers) are typically polymerizable vinylic monomers, a formula that calculates the ratio between the number of hydrophobic and hydrophilic atoms in a compound may be used to provide an estimate for the relative propensity of the compound to partition to the aqueous phase. For a given class of compounds, the values calculated from such a formula may (approximately) correlate with log P. Such a formula may be used instead of or in addition to log P to determine the monomers useful in the present invention.

For example, a suitable formula for a hydrophilic vinylic monomer of the present invention (such as a compound of formula I, e.g. where $R^1$ is —H, —$CH_3$) is as follows:

$$R_{atom} = \frac{N_C}{N_N + N_O}$$

Where $N_C$ is the number of carbon atoms, $N_N$ the number of nitrogen atoms, and No the number of oxygen atoms in the monomers. Acrylamides, vinylimidazoles, acryloylmorpholines, vinylphosphonic acids and vinylsulfonic acids are suitable if $R_{atom}$<2.75; whereas acrylates and other monomer classes are suitable if $R_{atom}$≤2 and the monomer has water solubility (e.g. at 25° C.)≥50 g/L. Acrylamides in general are more soluble in water phase than the analogous acrylates, and the difference in the passing criteria for $R_{atom}$ reflects this. This $R_{atom}$ formula and cutoff criteria may also apply to crosslinkers used in the present invention, such as a compound of formula (IIa) or (IIb). $R_{atom}$ values for exemplary monomers and crosslinkers are given in table 1.

The Polymer Particle

The invention includes embodiments in which the particles are polymeric and monodisperse. The invention includes embodiments in which the particles are porous. In accordance with the invention, the particles are magnetic and/or comprise a coating. Unless the context requires otherwise, references to "particles" and "polymer particles" below includes reference to monodisperse magnetic hydrogel polymer particles of the invention and/or monodisperse coated hydrogel polymer particles of the invention.

The particles may be in a population of at least 100, e.g. at least 1000. For example, for the purposes of measurement the particles may be in a population of at least 100, e.g. at least 1000. For example, in certain end use applications, the particles may conveniently be in a population of at least 100, e.g. at least 1000.

By "monodisperse" is meant that for a plurality of particles (e.g. at least 100, more preferably at least 1000) the particles have a coefficient of variation (CV) of their diameters of less than 20%, for example less than 15%, typically of less than 10% and optionally of less than 8%, e.g. less than 5%. A particular class of polymer particles has a CV of less than 10%. CV is defined as 100 times (standard deviation) divided by average where "average" is mean particle diameter and standard deviation is standard deviation in particle size. The invention also includes embodiments where the "average" is either the z-average or mode particle diameter. CV is preferably calculated on the main mode. Thus some particles below or above mode size may be discounted in the calculation which may for example be based on about 90% of total particle number (of detectable particles that is). Such a determination of CV is performable on a CPS disc centrifuge.

The polymer particles may be produced by a polymer particle forming process described later in the specification, e.g. by using monodisperse seed particles as described herein.

Reverting now to the polymer particles, this specification discloses crosslinked hydrogel polymer particles. It is a characteristic of crosslinked hydrogel polymer particles that, when placed in an aqueous solution that is a good solvent for the polymer, the particles swell instead of dissolving. By way of example, water is a good solvent for hydrogel particles comprising acrylamide polymer. Hydrogel particles are hydrophilic and swell in water and may be made in a variety of different porosities. The crosslinked hydrogel particles disclosed herein provide a combination of low nonspecific binding, monodispersity and porosities that provide advantages when the particles are used in biological assays. In addition, the non-specific binding and porosity properties may be modified by the inclusion of magnetic material in the particles and/or coating the particles.

The level of crosslinking in a polymer particle made by the process can be expressed as the percentage by weight (% wt) of crosslinker monomer included in the total monomer used in the suspension polymerisation. The % wt of crosslinker monomer may be equivalent to the % wt of the crosslinker in matrix polymer (i.e. the % wt of crosslinker in the dry weight of the crosslinked polymer particles). Thus, where the monomers used in the suspension polymerisation are, for example, a monofunctional acrylamide and a bifunctional acrylamide the percentage of bifunctional acrylamide (the crosslinker monomer) is calculated as weight percent based upon the total weight of bifunctional acrylamide plus monofunctional acrylamide. Typical levels of crosslinking include >1% wt crosslinker, for example >2% wt crosslinker, e.g. >5% wt crosslinker. For example, the level of crosslinking may be >10% wt crosslinker, or >15% wt crosslinker, e.g. >20% wt crosslinker or >25% wt crosslinker. The level of crosslinking may also be, for instance 5-60% wt crosslinker, for example 10-50% wt crosslinker, e.g. 20-40% wt crosslinker or 20-30% wt crosslinker. The level of crosslinking may also be 1-30% wt crosslinker, for example 1-20% wt crosslinker, e.g. 1-10% wt crosslinker; or the level of crosslinking may also be 2-30% wt crosslinker, for example 2-20% wt crosslinker, e.g. 2-10% wt crosslinker; levels which, e.g. are suitable for porous hydrogel particles.

The level of crosslinking may be >30% wt crosslinker or >40% wt crosslinker, for example in highly crosslinked particles. The level of crosslinking may be 10-90% wt crosslinker, 20-80% wt crosslinker or 25-75% wt crosslinker, e.g. 25-60% wt crosslinker or 30-50% wt crosslinker. In highly crosslinked particles the level of crosslinking may be up to 100% wt crosslinker, for example the hydrophilic vinylic monomer may be a crosslinker.

Where the particles are magnetic polymer particles (e.g. magnetic hydrogel polymer particles), the level of crosslinking is preferably >10% wt crosslinker, for example >30% wt crosslinker or >40% wt crosslinker. These levels of crosslinking may provide particles with better retention of magnetic material compared to particles with lower levels of crosslinking. The level of crosslinking may be 10-90% wt crosslinker, 20-80% wt crosslinker or 25-75% wt crosslinker, e.g. 25-60% wt crosslinker or 30-50% wt crosslinker.

As stated above, crosslinked particles swell when placed in a good solvent for the polymer. The amount of swelling, e.g. measured as an increase in diameter, is related to the level of crosslinking. Particles with a higher degree of crosslinking will typically swell less than particles made from a similar polymer, but with a lower degree of crosslinking. This property can be used to determine the relative level of crosslinking in a sample of polymer particles by comparing the sample with a series of standards of known, different levels of crosslinking.

The particles suitably comprise an addition polymer made by polymerising one or more vinylic unsaturated monomers. The vinylic unsaturated monomers may comprise a generalised vinyl group that has been optionally substituted, —CR═CR'H, where R is H or alkyl (e.g. where R is $—CH_3$ or $—CH_2CH_3$), and where R' is H, alkyl (e.g. $—CH_3$ or $—CH_2CH_3$) or a functional group (e.g. a carboxylic acid, a phosphonic acid, a primary amine or a secondary amine. The vinylic unsaturated monomers may comprise a generalised vinyl group, $—CR═CH_2$, where R is H or alkyl (e.g. where R is $—CH_3$ or $—CH_2CH_3$). The vinylic unsaturated monomers may comprise a vinyl group, $—CH═CH_2$. The monomers may be hydrophilic vinylic monomers, for example vinylic monomers with a log P value of less than about 1, e.g. a log P value of less than about 0.5. The hydrophilic vinylic monomers may comprise a generalised vinyl group that has been optionally substituted, —CR═CR'H, where R is H or alkyl (e.g. where R is $—CH_3$ or $—CH_2CH_3$), and where R' is H, alkyl (e.g. $—CH_3$ or $—CH_2CH_3$) or a functional group (e.g. a carboxylic acid, a phosphonic acid, a primary amine or a secondary amine. The hydrophilic vinylic monomers may comprise a generalised vinyl group, $—CR═CH_2$, where R is H or alkyl (e.g. where R is $—CH_3$ or $—CH_2CH_3$). The hydrophilic vinylic monomers may comprise a vinyl group, $—CH═CH_2$. The monomers may be vinylic monomers with a log P of less than about 0.6, e.g. a log P of less than about 0.52. The monomers may be vinylic monomers with a log P of less than about 0.5. For example, the monomers may be vinylic monomers with a log P of less than about 0.3 or of less than about 0.2, e.g. the monomers may be vinylic monomers with a log P of less than about 0.1. The monomers may be vinylic monomers with a log P of less than about 0, e.g. with a log P of less than about −0.2. The monomers may be vinylic monomers that have a log P of more than about −3.8, e.g. with a log P of more than about −3 or about −2. The monomers may be vinylic monomers that have a log P of from 0.6 to −3. The monomers may be vinylic monomers that have a log P of from 0.5 to −2, for example a log P of from 0 to −2, e.g. a log P of from −0.2 to −2. In particular, the monomers may be vinylic monomers that also comprise a hydrophilic group, for example an acrylamide monomer or an acrylate monomer.

The monomers may have a specified value for $R_{atom}$. Where the monomers are acrylamides, vinylimidazoles, acryloylmorpholines, vinylphosphonic acids and vinylsulfonic acids, the specified $R_{atom}$ may be $R_{atom}<2.75$. Where the monomers are acrylates of other monomer classes, the specified $R_{atom}$ may be $R_{atom}\leq 2$ and the monomer has water solubility (e.g. at 25° C.)≥50 g/L.

The monomer used in the particles may be at least one compound of formula (I):

(I)

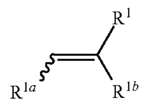

wherein:

$R^1$ is —H, $—CH_3$, $—CH_2CH_3$ or $—CH_2C(O)OH$; $R^{1a}$ is —H, $—CH_3$, $—CH_2CH_3$, $—CH_2C(O)OH$ or $—C(O)R^2$; $R^{1b}$ is $—C(O)R^2$, $—P(O)(OH)_2$, $—S(O)_2OH$, or heterocycle with 3 to 8 ring atoms where the heteroatom(s) are selected from N, O, or S; or $R^{1b}$ in combination with $R^{1a}$ or $R^1$ is —C(O)—O—C(O)—; $R^2$ is selected from $—OR^3$, $—N(R^4)R^5$ or —N-linked amino acid; $R^3$ is selected from —H, $—C_1$-$C_6$ alkyl, or $—C_1$-$C_6$ alcohol; and $R^4$ and $R^5$ are each independently selected from —H, $—C_1$-$C_6$ alkyl, $—C_1$-$C_6$ haloalkyl, $—C_1$-$C_6$ alcohol; or $R^4$ and $R^5$ together with the nitrogen to which they are attached form a heterocycle with 3 to 8 ring atoms where the heteroatoms are selected from N, O, or S.

In an embodiment, $R^1$ is —H, $—CH_3$, $—CH_2CH_3$ or $—CH_2C(O)OH$; $R^{1a}$ is —H or $—C(O)R^2$; $R^{1b}$ is $—C(O)R^2$, $—P(O)(OH)_2$ or $—S(O)_2OH$; or $R^{1b}$ in combination with $R^{1a}$ or $R^1$ is —C(O)—O—C(O)—; $R^2$ is selected from $—OR^3$ or $—N(R^4)R^5$; $R^3$ is selected from —H, $—C_1$-$C_6$ alkyl, or $—C_1$-$C_6$ alcohol; and $R^4$ and $R^5$ are each independently selected from —H, $—C_1$-$C_6$ alkyl, $—C_1$-$C_6$ haloalkyl, $—C_1$-$C_6$ alcohol.

Where $R^3$ is $—C_1$-$C_6$ alkyl or $—C_1$-$C_6$ alcohol, the alkyl or alcohol may be substituted, where chemically possible, by 1 to 5 (e.g. 1, 2, 3 or 4) substituents which are each independently at each occurrence selected from: oxo, $═NR^a$, $═NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl. For example, where $R^3$ is $—C_1$-$C_6$ alkyl or $—C_1$-$C_6$ alcohol, the alkyl or alcohol may be substituted, where chemically possible, by 1 to 5 (e.g. 1, 2, 3 or 4) substituents which are each independently at each occurrence selected from $OR^a$ or $CO_2R^a$, optionally where $R^a$ is H.

Where $R^4$ and/or $R^5$ are $—C_1$-$C_6$ alkyl, $—C_1$-$C_6$ haloalkyl, $—C_1$-$C_6$ alcohol, each may be independently substituted, where chemically possible, by 1 to 5 (e.g. 1, 2, 3 or 4) substituents which are each independently at each occurrence selected from: oxo, $═NR^a$, $═NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl. For example, where $R^4$ and/or $R^5$ are $—C_1$-$C_6$ alkyl, $—C_1$-$C_6$ haloalkyl, $—C_1$-$C_6$ alcohol, each may be independently substituted, where chemically possible, by 1 to 5 (e.g. 1, 2, 3 or 4) substituents which are each independently at each occurrence selected from $OR^a$ or $CO_2R^a$, optionally where $R^a$ is H.

$R^1$ may be —H, $—CH_3$ or $—CH_2CH_3$. $R^1$ may be —H or $—CH_3$. For example, $R^1$ may be —H. $R^1$ may be $—CH_2C(O)OH$.

$R^{1a}$ may be —H, $—CH_3$ or $—CH_2CH_3$. $R^{1a}$ may be —H. $R^{1a}$ may be $—C(O)R^2$. $R^{1a}$ may be $—CH_2C(O)OH$.

$R^{1b}$ may be $—C(O)R^2$. $R^{1b}$ may be $—P(O)(OH)_2$. $R^{1b}$ may be $—S(O)_2OH$. When $R^{1b}$ is $—C(O)R^2$, $R^{1a}$ may be —H. When $R^{1b}$ is $—C(O)R^2$, $R^{1a}$ may be $—C(O)R^2$, and $R^2$ may optionally be $—OR^3$. When $R^{1b}$ is $—P(O)(OH)_2$, $R^{1a}$ may be —H and $R^1$ may be —H, $—CH_3$ or $—CH_2CH_3$ (e.g. —H). When $R^{1b}$ is $—S(O)_2OH$, $R^{1a}$ may be —H and $R^1$ may be —H, $—CH_3$ or $—CH_2CH_3$ (e.g. —H).

$R^{1b}$ may be a heterocycle with 3 to 8 ring atoms where the heteroatom(s) are selected from N, O, or S. $R^{1b}$ may be an imidazolyl.

$R^{1b}$ in combination with $R^{1a}$ or $R^1$ may be —C(O)—O—C(O)—.

$R^2$ may be $—OR^3$. $R^2$ may be $—N(R^4)R^5$. $R^2$ may be $—NH_2$, $—NHCH_3$, $—NHCH_2CH_3$, or, $—NH(CH_3)_2$. $R^2$ may be an N-linked amino acid. The N-linked amino acid may be selected from arginine, histidine, lysine, aspartic acid, glutamic acid, serine, threonine, asparagine, glutamine, cysteine, glycine, proline, alanine, p-alanine, and methionine.

$R^3$ may be —H. $R^3$ may be $—C_1$-$C_6$ alkyl. For example, $R^3$ may be $—C_1$-$C_6$ alkyl substituted by 1 or 2 substituents which are each independently at each occurrence selected from: oxo, halo, cyano, $NR^aR^a$, $NR^aCONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H. $R^3$ may be $—C_1$-$C_6$ alcohol. For example, $R^3$ may be $—C_1$-$C_6$ alcohol substituted by 1 or 2 substituents which are each independently at each occurrence selected from: oxo, halo, cyano, $NR^aR^a$, $NR^aCONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H.

$R^4$ may be —H or $—C_1$-$C_6$ alkyl. $R^4$ may be $—C_1$-$C_6$ alkyl. For example, $R^4$ may be $—C_1$-$C_6$ alkyl substituted by 1 or 2 substituents which are each independently at each occurrence selected from: oxo, halo, cyano, $NR^aR^a$, $NR^a$-$CONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H.

$R^5$ may be —H or $—C_1$-$C_6$ alkyl. $R^5$ may be $—C_1$-$C_6$ alkyl. For example, $R^5$ may be $—C_1$-$C_6$ alkyl substituted by 1 or 2 substituents which are each independently at each occurrence selected from: oxo, halo, cyano, $NR^aR^a$, $NR^a$-$CONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H.

$R^4$ and $R^5$ together with the nitrogen to which they are attached may form a heterocycle with 3 to 8 ring atoms (e.g. 4, 5, or 6 ring atoms) where the heteroatoms are selected from N, O, or S. $R^4$ and $R^5$ together with the nitrogen to which they are attached may form a morpholino heterocycle.

The monomer used in the particles may be at least one compound of formula (Ia):

(Ia)

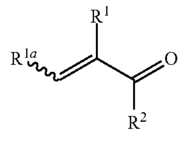

wherein $R^1$, $R^2$ and $R^{1a}$ are as defined elsewhere.

The monomer used in the particles may be at least one compound of formula (Ib):

(Ib)

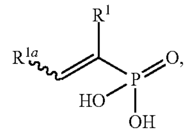

wherein $R^1$ and $R^{1a}$ are as defined elsewhere. In an embodiment, $R^1$ and $R^{1a}$ are each independently selected from —H, $—CH_3$, $—CH_2CH_3$ or $—CH_2C(O)OH$.

The monomer used in the particles may be at least one compound of formula (Ic):

(Ic)

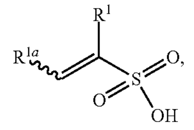

wherein $R^1$ and $R^{1a}$ are as defined elsewhere. In an embodiment, $R^1$ and $R^{1a}$ are each independently selected from —H, $—CH_3$, $—CH_2CH_3$ or $—CH_2C(O)OH$.

The compound of formula (I), (Ia), (Ib) or (Ic) may have a log P value of less than about 1, e.g. a log P of less than about 0.5. The compound of formula (I), (Ia), (Ib) or (1c) may have a log P of less than about 0.6, e.g. a log P of less than about 0.52. The compound of formula (I), (Ia), (Ib) or (1c) may have a log P of less than about 0.5. For example, the compound of formula (I), (Ia), (Ib) or (1c) may have a log P of less than about 0.3 or of less than about 0.2, e.g. the compound of formula (I), (Ia), (Ib) or (1c) may have a log P of less than about 0.1. The compound of formula (I), (Ia), (Ib) or (1c) may have a log P of less than about 0, e.g. with a log P of less than about −0.2. The compound of formula (I), (Ia), (Ib) or (Ic) may have a log P of more than about −3.8, e.g. a log P of more than about −3 or about −2. The compound of formula (I), (Ia), (Ib) or (1c) may have a log P of from 0.6 to −3. The compound of formula (I), (Ia), (Ib) or (1c) may have a log P of from 0.5 to −2, for example a log P of from 0 to −2, e.g. a log P of from −0.2 to −2.

The compound of formula (I) or (Ia) may have an $R_{atom}<2.75$, where the compound is an acrylamide, vinylimidazole, acryloylmorpholine, vinylphosphonic acid, or vinylsulfonic acid; or an $R_{atom}\leq 2$ and a water solubility 50 g/L where the compound is an acrylate or other monomer class. The compound of formula (Ib) or (Ic) may have an $R_{atom}<2.75$.

The monomer may comprise at least one hydrophilic vinylic monomer comprising an amide group selected from $—C(O)NH_2$, $—C(O)NHCH_3$, $—C(O)NHCH_2CH_3$, or $—C(O)N(CH_3)_2$. The monomer may comprise at least one hydrophilic vinylic monomer comprising a primary amide group ($—C(O)NH_2$).

Acrylamide monomers and/or acrylate monomers may be mentioned in particular. Suitable monomers include acrylamide (prop-2-enamide), N-(hydroxymethyl)acrylamide, N-hydroxyethyl acrylamide, N-[tris(hydroxymethyl) methyl]acrylamide, 4-acrylolymorpholine, 3-acrylamidopropanoic acid, methacrylamide, N-(2-hydroxyethyl) methacrylamide, N-(3-aminopropyl)methacrylamide, hydroxypropylacrylamide, N,N-dimethylacrylamide, 2-hydroxyethyl acrylate, 2-hydroxyethyl methacrylate, acrylic acid; other acrylamide monomers, acrylic monomers, methacrylamide monomers, or methacrylic monomers with a log P value of less than about 1 (e.g. with a log P value of less than about 0.5); other acrylamide monomers, or methacrylamide monomers with an $R_{atom}$<2.75; and other acrylic acid monomers, or methacrylic acid monomers with an $R_{atom}$≤2 and water solubility (e.g. at 25° C.)≥50 g/L.

The monomer may comprise a mixture of monomers. For example, the monomer may comprise at least one monomer as defined above and at least one compatible functional monomer. An exemplary functional monomer is a hydrophilic vinylic monomer as defined herein, which comprises a carboxylic acid (—COOH), a phosphonic acid (—P(O)$(OH)_2$), a sulfonic acid (—$S(O)_2OH$), a primary amine or a secondary amine. For example, the monomer may comprise at least one monomer of formula (I), (Ia), (Ib) or (Ic) that does not comprise a carboxylic acid (—COOH), a phosphonic acid (—$P(O)(OH)_2$), a sulfonic acid (—$S(O)_2OH$), a primary amine or a secondary amine; and a monomer of formula (I), (Ia) or (Ib) that comprises at least one carboxylic acid (—COOH), phosphonic acid (—$P(O)(OH)_2$), a sulfonic acid (—$S(O)_2OH$), primary amine or secondary amine (e.g. that comprises at least one carboxylic acid (—COOH) or phosphonic acid (—$P(O)(OH)_2$)).

In highly crosslinked particles, the monomer may be or comprise a crosslinker, e.g. a crosslinker as defined elsewhere herein. For example, the monomer may be or comprise at least one compound of formula (IIa) or (IIb).

A functional monomer may be a vinylic monomer with a log P value of less than about 1, e.g. a log P of less than about 0.5, which comprises a carboxylic acid or primary amine. A functional monomer may be a vinylic monomer with a log P of less than about 0.6, e.g. a log P of less than about 0.52. A functional monomer may be a vinylic monomer with a log P of less than about 0.5. For example, the functional monomer may be a vinylic monomer with a log P of less than about 0.3 or of less than about 0.2, e.g. the functional monomer may be a vinylic monomer with a log P of less than about 0.1. A functional monomer may be a vinylic monomer with a log P of less than about 0, e.g. with a log P of less than about −0.2. A functional monomer may be a vinylic monomer that has a log P of more than about −3.8, e.g. with a log P of more than about −3 or about −2. A functional monomer may be a vinylic monomer that has a log P of from 0.6 to −3. A functional monomer may be a vinylic monomer that has a log P of from 0.5 to −2, for example a log P of from 0 to −2, e.g. a log P of from −0.2 to −2. A functional monomer may be a compound of formula (I), (Ia) or (Ib) which comprises a carboxylic acid, phosphonic acid, sulfonic acid or primary amine. A functional monomer may comprise a carboxylic acid, phosphonic acid or sulfonic acid, e.g. may comprise a carboxylic acid or a phosphonic acid. A functional monomer may be an acrylamide monomer which comprises a carboxylic acid or primary amine.

Suitable functional monomers include 3-acrylamidopropionic acid, 4-acrylamidobutanoic acid, 5-acrylamidopentanoic acid, N-(3-aminopropyl)methacrylamide, acrylic acid, fumaric acid, itaconic acid, vinyl phosphonic acid, vinyl sulfonic acid and 1-vinylimidazole. Further suitable functional monomers comprise anhydrides, e.g. maleic anhydride or itaconic anhydride, which may be hydrolysed during polymerisation to provide carboxylic acid groups.

Where at least one functional monomer is present, the amount of the functional monomer may be about 0.1 to about 100% mol, for example about 0.2 to about 50% mol, e.g. about 0.5 to about 40% mol or about 1 to about 30% mol (such as about 2 to about 20% mol). For example, the amount of the functional monomer may be at least about 2 to about 100% mol, for example about 2 to about 50% mol, e.g. about 4 to about 40% mol or about 4 to about 30% mol (such as about 2 to about 20% mol). The amount of functional monomer may be about 5 to about 100% mol, e.g. about 5 to about 80% mol. The % mol may refer to the amount of functional monomer as percent by mol of the total hydrophilic vinylic monomer. The amount of functional monomer may be about 0.1 to about 60% wt, for example about 0.2 to about 50% wt, e.g. about 0.5 to about 40% wt. The amount of functional monomer may be about 1 to about 60% wt, for example about 2 to about 50% wt, e.g. about 2 or 3 to about 40% wt. The amount of functional monomer may be about 0.1 to about 10% wt, for example about 0.2 to about 5% wt, e.g. about 0.5 to about 2% wt. The % wt may refer to the percent by weight of the functional monomer included in the total monomer used in the polymerisation process. The total monomer may, for example, comprise a hydrophilic vinylic monomer that is not the at least one functional monomer, a crosslinker and a functional monomer.

Crosslinking may be achieved by incorporating a crosslinker comprising at least two (e.g. two) vinyl groups (—$CH=CH_2$) as a comonomer. The crosslinker may be at least one compound of formula (IIa) or (IIb):

(IIa)

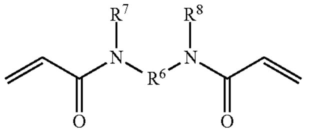

(IIb)

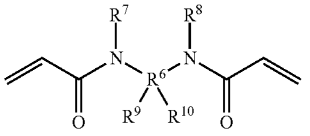

wherein $R^6$ is selected from —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, polyether comprising 2 to 100 $C_2$-$C_3$ ether units; $R^7$ and $R^8$ are each independently selected from —H, —$C_1$-$C_6$ alkyl, —$C_1$-$C_6$ heteroalkyl, —$C_3$-$C_6$ cycloalkyl, —$C_1$-$C_6$ hydroxyalkyl, or —$C_1$-$C_6$ ether; or $R^7$ and $R^8$ are joined together to form —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, polyether comprising 2 to 100 $C_2$-$C_3$ ether units; $R^9$ is —$N(R^{11})C(O)CH=CH_2$; $R^{10}$ is selected from —H and —$N(R^{12})C(O)CH=CH_2$; and $R^{11}$ and $R^{12}$ are each independently selected from —H, —$C_1$-$C_6$ alkyl, —$C_1$-$C_6$ heteroalkyl, —$C_3$—C cycloalkyl, —$C_1$-$C_6$ hydroxyalkyl, or —$C_1$-$C_6$ ether.

The crosslinker may be at least one compound of formula (IIa). The crosslinker may be at least one compound of formula (IIb).

$R^6$, $R^7$, $R^8$, $R^9$, $R^{10}$, $R^{11}$ and $R^{12}$ may be independently substituted, where chemically possible, by 1 to 5 substituents which are each independently at each occurrence selected from: oxo, $=NR^a$, $=NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$- alkynyl, $C_1$-$C_4$ haloalkyl; wherein $R^a$ is independently at each occurrence selected from: H, $C_1$-$C_4$ alkyl and $C_1$-$C_4$ alkenyl.

$R^6$ may be selected from —$C_1$-$C_6$ alkyl-, —$C_1$-$C_6$ heteroalkyl-, —$C_1$-$C_6$ cycloalkyl-, —$C_1$-$C_6$ hydroxyalkyl- and —$C_1$-$C_6$ ether-. $R^6$ may be selected from —$C_1$-$C_6$ alkyl- and —$C_1$-$C_6$ hydroxyalkyl-. $R^6$ may be a —$C_1$-$C_6$ alkyl-, for example —$CH_2$—, —$(CH_2)_2$—, —$(CH_2)_3$—, or —$(CH_2)_4$—, e.g. —$(CH_2)_2$—. $R^6$ may be a —$C_1$-$C_6$ hydroxyalkyl-, for example —C(OH)H—, —$(C(OH)H)_2$—, —$(C(OH)H)_3$—, or —$(C(OH)H)_4$—, e.g. —$(C(OH)H)_2$—.

$R^6$ may be a —$C_1$-$C_6$ heteroalkyl-, optionally wherein the heteroatom is an amine (e.g. a tertiary amine). For example a —$C_1$-$C_6$ heteroalkyl-substituted by C(O)$R^a$ on the hetero atom, optionally wherein the heteroatom is an amine, e.g. $R^6$ may be —$CH_2CH_2N(C(O)CH{=}CH_2)CH_2CH_2$—.

Where $R^6$ is a polyether, the polyether may be linear or branched. $R^6$ may be a polyether comprising 2 to 100 $C_2$-$C_3$ ether units, e.g. a polyether comprising 2 to 50 $C_2$-$C_3$ ether units. $R^6$ may be a polyether comprising 2 to 100 $C_2$ ether units, e.g. a polyether comprising 2 to 50 $C_2$ ether units. For example $R^6$ may be —$(CH_2)_r(OCH_2CH_2)_nO(CH_2)_s$, wherein r and s are each independently 2 or 3 (e.g. 2); and n is an integer from 1 to 100 (e.g. 1 to 50 or 1 to 25; such as 5 to 50 or 5 to 25). Without wishing to be bound by any theory, it is believed that crosslinkers comprising a polyether (e.g. where $R^6$ is a polyether) have excellent solubility in the aqueous phase. This means that, while such crosslinkers may be used to provide particles with a low level of crosslinking (e.g. 1-20% wt crosslinker, or 1-10% wt crosslinker), such polyether comprising crosslinkers are particularly suitable for providing particles comprising relatively high levels of crosslinking, for example >20% wt crosslinker, >25% wt crosslinker, or >30% wt crosslinker. For example, the level of crosslinking may be 10-90% wt crosslinker, 20-80% wt crosslinker or 25-75% wt crosslinker, e.g. 25-60% wt crosslinker or 30-50% wt crosslinker.

$R^7$ and/or $R^8$ and/or $R^{11}$ and/or $R^{12}$ may be H. For example, $R^7$ and/or $R^8$ may be H. For example, $R^{11}$ and/or $R^{12}$ may be H.

$R^7$ and $R^8$ may joined together to form —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, polyether comprising 2 to 100 $C_2$-$C_3$ ether units. When $R^7$ and $R^8$ are joined together to form —$C_1$-$C_6$ alkyl-, the group defined by $R^7$ and $R^8$ may be the same as $R^6$. For example, $R^6$ may be —$C_1$-$C_6$ alkyl- and $R^7$ and $R^8$ may be —$C_1$-$C_6$ alkyl-.

$R^6$ may be selected from —$C_1$-$C_6$ alkyl-, —$C_1$-$C_6$ heteroalkyl-, —$C_1$-$C_6$ cycloalkyl-, —$C_1$-$C_6$ ether-, or polyether comprising 2 to 100 $C_2$-$C_3$ ether units; $R^7$ and $R^8$ may be each independently selected from —H, —$C_1$-$C_6$ alkyl, —$C_1$-$C_6$ heteroalkyl, —$C_3$-$C_6$ cycloalkyl, or —$C_1$-$C_6$ ether; or $R^7$ and $R^8$ are joined together to form —$C_1$-$C_6$ alkyl-, —$C_1$-$C_6$ heteroalkyl-, —$C_1$-$C_6$ cycloalkyl-, —$C_1$-$C_6$ ether-, polyether comprising 2 to 100 $C_2$-$C_3$ ether units; and $R^{11}$ and $R^{12}$ are each independently selected from —H, —$C_1$-$C_6$ alkyl, —$C_1$-$C_6$ heteroalkyl, —$C_3$-$C_6$ cycloalkyl, or —$C_1$-$C_6$ ether.

The compound of formula (IIa) or (IIb) may have a log P value of less than about 1, e.g. a log P of less than about 0.5. The compound of formula (IIa) or (IIb) may have a log P of less than about 0.6. The compound of formula (IIa) or (IIb) may have a log P of less than about 0.5. For example, the compound of formula (IIa) or (IIb) may have a log P of less than about 0.3 or of less than about 0.2, e.g. the compound of formula (IIa) or (IIb) may have a log P of less than about 0.1. The compound of formula (IIa) or (IIb) may have a log P of less than about 0, e.g. with a log P of less than about −0.2. The compound of formula (IIa) or (IIb) may have a log P of more than −3.8, e.g. a log P of more than about −3 or about −2. The compound of formula (IIa) or (IIb) may have a log P of from 0.6 to −3. The compound of formula (IIa) or (IIb) may have a log P of from 0.5 to −2, for example a log P of from 0 to −2, e.g. a log P of from −0.2 to −2.

The compound of formula (IIa) or (IIb) may have an $R_{atom}$<2.75.

Exemplary crosslinkers of use in particles of the invention include N,N'-(1,2-dihydroxyethylene)bisacrylamide, N,N'-methylenebis(acrylamide), N,N'-ethylenebis(acrylamide), piperazine diacrylamide, glycerol 1,3-diglycerolate diacrylate, N,N'-((ethane-1,2-diylbis(oxy))bis(ethane-2,1-diyl)) diacrylamide, polyethyleneglycol diacrylamide (MW≤2000), 4-arm PEG-acrylamide (MW≤2000), N,N-bis (2-acrylamidoethyl)acrylamide. The exemplary crosslinkers N,N'-((ethane-1,2-diylbis(oxy))bis(ethane-2,1-diyl))diacrylamide,polyethyleneglycol diacrylamide (MW≤2000) and 4-arm PEG-acrylamide (MW≤2000), (in particular N'-((ethane-1,2-diylbis(oxy))bis(ethane-2,1-diyl))diacrylamide) are particular suitable for use in highly crosslinked particles and mechanically more stable particles, for example particles with a level of crosslinking of at least 20% wt crosslinker (e.g. a level of crosslinking of at least 30% wt crosslinker). An embodiment of the invention includes the use of a combination of crosslinkers. As a particular monomer may be mentioned acrylamide (prop-2-en-amide), for which N,N'-(1,2-dihydroxy bisacrylamide) is a suitable crosslinker. As a particular monomer may be mentioned hydroxymethyl acrylamide, for which N,N'-((ethane-1,2-diylbis(oxy))bis (ethane-2,1-diyl))diacrylamide is a suitable crosslinker. As a particular monomer may be mentioned hydroxyethyl acrylamide, for which N,N'-((ethane-1,2-diylbis(oxy))bis(ethane-2,1-diyl))diacrylamide is a suitable crosslinker.

The crosslinker may comprise N,N'-methylenebis(acrylamide), N,N'-ethylenebis(acrylamide), piperazine diacrylamide, N,N'-((ethane-1,2-diylbis(oxy))bis(ethane-2,1-diyl)) diacrylamide, polyethyleneglycol diacrylamide (MW≤2000), 4-Arm PEG-Acrylamide (MW≤2000), N,N-bis(2-acrylamidoethyl)acrylamide.

The crosslinker may be a compound that does not comprise a primary amine, secondary amine, hydroxy or carboxylic acid. The crosslinker may be a compound of formula (IIa) or formula (IIb) that does not comprise a primary amine, secondary amine, hydroxyl or carboxylic acid.

A number of exemplary monomers and crosslinkers that may be used are set out in Table 1. A number of other monomers are set out in Table 2. The log P values for the monomers listed in table 1 and table 2 were determined using the software ChemBioDraw® Ultra 14.0 from CambridgeSoft Corp. The $R_{atom}$ values were calculated according to the formula $R_{atom}$=$N_C/(N_N+N_O)$, where $N_O$, $N_N$ and $N_O$ respectively represent the numbers of carbon, nitrogen and oxygen atoms in the monomer or crosslinker. In some particles that are embodiments of the invention the monomers of Table 2 are not used, for example due to the log P values of the monomers. In addition, the monomers methyl acrylate and methacrylic acid of Table 2 may be used in conventional Ugelstad procedures, therefore these monomers and other monomers with higher log P values may be less preferred for use in the particles of the present invention, which may be made with a polymer particle forming process described herein.

TABLE 1

Exemplary Monomers and crosslinkers

| Name | Abbreviation | Structure | log P | $R_{atom}$ | Function |
|---|---|---|---|---|---|
| Acrylamide | AAm | 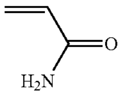 | −0.27 | 1.5 | Monomer |
| N-(Hydroxymethyl) acrylamide | HMAAm | 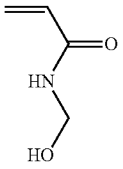 | −0.28 | 1.3 | Monomer |
| N-Hydroxyethyl acrylamide | HEAAm | 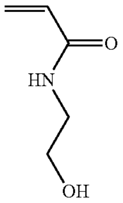 | −0.56 | 1.7 | Monomer |
| N-[Tris(hydroxymethyl) methyl]-acrylamide | THMAAm | 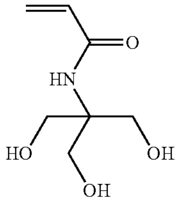 | −1.73 | 1.4 | Monomer |
| 4-Acryloylmorpholine | AM | 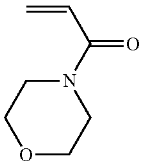 | −0.2 | 2.3 | Monomer |
| 3-acrylamidopropanoic acid | AAPA | 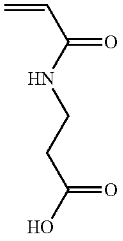 | −0.48 | 1.5 | Functional monomer |
| Acrylic acid | AA | 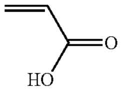 | 0.38 | 1.5 | Functional monomer |
| Methacrylamide | MAAm | 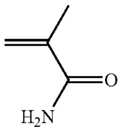 | 0.08 | 2.0 | Monomer |

TABLE 1-continued

Exemplary Monomers and crosslinkers

| Name | Abbrevi-ation | Structure | log P | $R_{atom}$ | Function |
|---|---|---|---|---|---|
| N-(2-hydroxyethyl)-methacrylamide | HEMAAm | 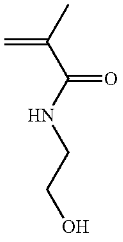 | −0.21 | 2.0 | Monomer |
| N-(3-Aminopropyl)-methacrylamide | APMAAm | 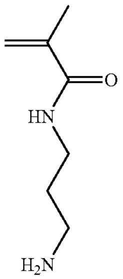 | −0.59 | 2.3 | Functional monomer |
| 2-Hydroxyethyl acrylate | HEA | 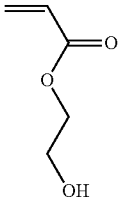 | 0.12 | 1.7 | Monomer |
| 2-Hydroxyethyl methacrylate | HEMA | 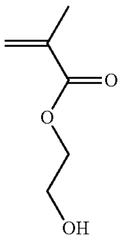 | 0.47 | 2.0 | Monomer |
| Fumaric acid | FuA | 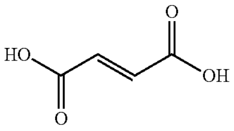 | −0.36 | 1.0 | Functional monomer |
| Itaconic acid | ItA | 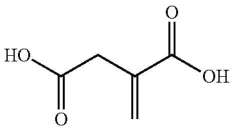 | −0.26 | 1.3 | Functional monomer |
| Vinyl phosphonic acid | VPA | 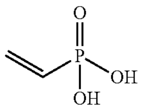 | 0.51 | 0.7 | Functional monomer |

TABLE 1-continued

Exemplary Monomers and crosslinkers

| Name | Abbreviation | Structure | log P | $R_{atom}$ | Function |
| --- | --- | --- | --- | --- | --- |
| 1-Vinylimidazole | VIm | 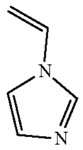 | 0.15 | 2.5 | Functional monomer |
| N,N'-(1,2-Dihydroxyethylene)-bisacrylamide | DHEBAAm | 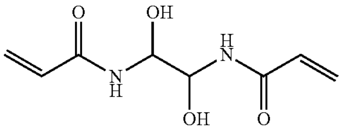 | −0.47 | 1.3 | Cross-linker |
| N,N'-Methylenebis(acryl-amide) | MBAAm | 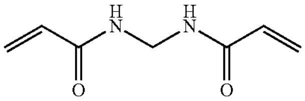 | −0.04 | 1.8 | Cross-linker |
| N,N'-Ethylenebis(acryl-amide) | EBAAm | 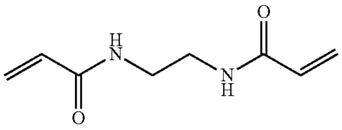 | −0.32 | 2.0 | Cross-linker |
| Piperazine diacrylamide | PDAAm | 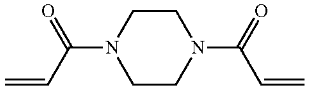 | −0.09 | 2.5 | Cross-linker |
| Glycerol 1,3-diglycerolate diacrylate | GDGDA | 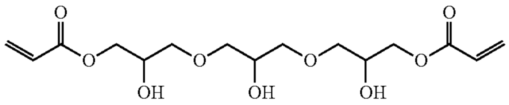 [SMILES: C=CC(=O)OCC(O)COCC(O)COCC(O)COC(=O)C=C] | −0.89 | 1.7 | Cross-linker |
| N,N'-((ethane-1,2-diylbis(oxy))bis(eth-ane-2,1-diyl))diacrylamide | EGBEAAm | 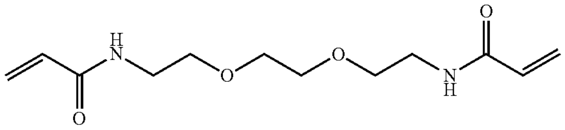 [SMILES: C=CC(=O)NCCOCCOCCNC(=O)C=C] | −0.63 | 2.0 | Cross-linker |
| Polyethyleneglycol diacrylamide (MW ≤ 2000) | PEGDAAm | 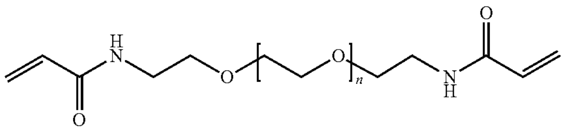 | ≤−0.63* | 2.0 (n = 10) 2.0 (n = 100) | Cross-linker |
| 4-Arm PEG-Acrylamide (MW ≤ 2000) | 4PEGAAm | 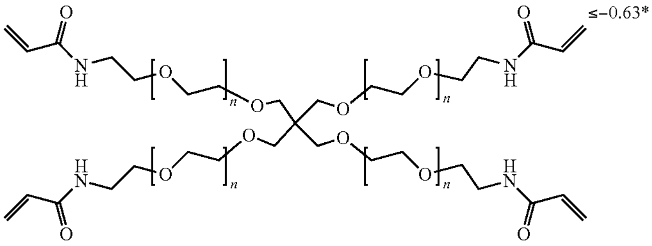 | ≤−0.63* | 2.1 (n = 10) 2.0 (n = 100) | Cross-linker |
| N,N-bis(2-acrylamidoethyl)-acrylamide | BAAmEAAm | 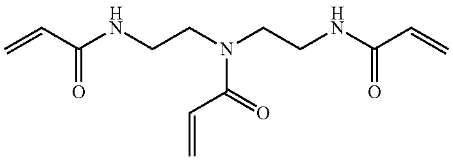 [SMILES: C=CC(=O)NCCN(CCNC(=O)C=C)C(=O)C=C] | −0.37 | 2.2 | Cross-linker |

TABLE 1-continued

| Exemplary Monomers and crosslinkers | | | | | |
|---|---|---|---|---|---|
| Name | Abbreviation | Structure | log P | $R_{atom}$ | Function |
| hydroxypropylacrylamide | HPAAm | 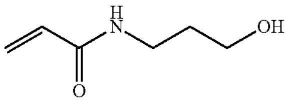 | −0.45 | 2.0 | Monomer |
| N,N-dimethylacrylamide | DMAAm | 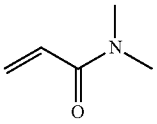 | 0.2 | 2.5 | Monomer |

TABLE 2

| Other Monomers and crosslinkers | | | | | |
|---|---|---|---|---|---|
| Name | Abbreviation | Structure | log P | $R_{atom}$ | Function |
| N-isopropylacrylamide | NIPAm | 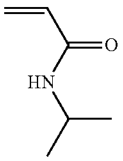 | 0.62 | 3.0 | Monomer |
| Methyl acrylate | MA | 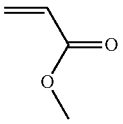 | 0.64 | 2.0 | Monomer |
| Methacrylic acid | MAA | 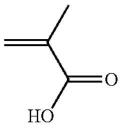 | 0.73 | 2.0 | Functional monomer |
| Propargyl acrylate | PA | 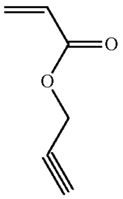 | 0.86 | 3.0 | Monomer |
| Methyl methacrylate | MMA | 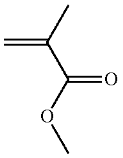 | 0.99 | 2.5 | Monomer |
| Chloromethyl acrylate | CMA | 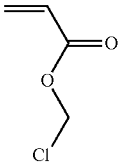 | 1.16 | 2.0 | Monomer |

TABLE 2-continued

| Other Monomers and crosslinkers | | | | | |
|---|---|---|---|---|---|
| Name | Abbreviation | Structure | log P | $R_{atom}$ | Function |
| Vinyl acrylate | VA | 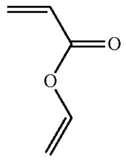 | 1.22 | 2.5 | Monomer |
| N,N'-hexamethylene-bis-acrylamide | HMBAAm | 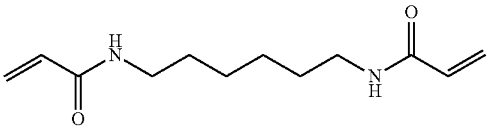 [SMILES: C=CC(=O)NCCCCCCNC(=O)C=C] | 1.07 | 3.0 | Cross-linker |
| Ethyleneglycol dimethacrylate | EGDMA | 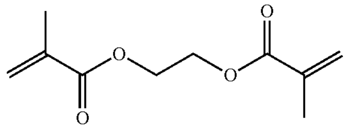 | 1.74 | 2.5 | Cross-linker |

The level of crosslinking in the crosslinked hydrogel polymer particles can be expressed as the percentage by weight (% wt) of crosslinker monomer included in the total monomer used in the polymerisation. Typical levels of crosslinking include >1% wt crosslinker, for example >2% wt crosslinker, e.g. >5% wt crosslinker. For example, the level of crosslinking may be >10% wt crosslinker, or >15% wt crosslinker, e.g. >20% wt crosslinker (such as >30% wt crosslinker or >40 wt % crosslinker). The level of crosslinking may also be 1-60% wt crosslinker, e.g. 5-30% wt crosslinker. For example, the level of crosslinking may be 5-60% wt crosslinker, for example 10-50% wt crosslinker. The level of crosslinking may also be, for instance 15-40% wt crosslinker, for example 20-40% wt crosslinker, e.g. 20-30% wt crosslinker. The level of crosslinking may be 10-90% wt crosslinker, 20-80% wt crosslinker or 25-75% wt crosslinker, e.g. 25-60% wt crosslinker or 30-50% wt crosslinker; for example in highly crosslinked particles. The level of crosslinking may also be 1-30% wt crosslinker, for example 1-20% wt crosslinker, e.g. 1-10% wt crosslinker. The level of crosslinking may also be 2-30% wt crosslinker, for example 2-20% wt crosslinker, e.g. 2-10% wt crosslinker. In highly crosslinked particles the level of crosslinking may be up to 100% wt crosslinker, for example the hydrophilic vinylic monomer may be a crosslinker.

In an embodiment, the particles may have an average diameter of at least 500 nm, e.g. at least 600 nm, optionally at least 800 nm, as in the case of particles having a diameter of at least 1 μm.

In an embodiment, the particles may have an average diameter of not more than 10 μm, e.g. not more than 5 μm, optionally not more than 3 μm, as in the case of particles having a diameter of not more than 2 μm.

In an embodiment, the invention includes a class of polymer particles having average diameters of from 0.5 μm to 10 μm, e.g. of from 0.8 μm to 5 μm.

The size and size distribution of the polymer particles may be determined as described below under the heading “analytical methods”.

The disclosure includes porous polymer particles having a porosity of at least 5%, e.g. at least 10% or at least 30%. The disclosure includes porous particles having a porosity of from 20% to 95%, particularly of from 30% to 95%, e.g. of from 40% to 95%, such as from 50% to 80%.

Porosity may be calculated after determining the density of the hydrogel polymer particles, as acrylamide and acrylate polymer has a density of about 1.3 g/mL, while water has a density of about 1 g/mL. The porous polymer particles may be transparent to solvated molecules, for example the porous polymer particles may be transparent to oligonucleotides and nucleic acid amplification reagents and sequencing reagents (e.g. primers, nucleotides and polymerases). While this method of determining porosity works well for the intermediate hydrogel polymer particles, this method is not effective for determining the porosity of magnetic polymer particles, as the magnetic material is typically of higher density than the polymer. In addition, this method only works well for coated particles where the coating has a similar density to the acrylamide and acrylate polymer.

The porosity may be determined for magnetic or coated particles for which the size (e.g. diameter) is known in the swollen (i.e. water-saturated hydrogel particles) state by comparing the mass of the swollen particles to the mass of the dried particles. The particles may be dried by, for example, placing the particles in a vacuum desiccator for at least 24 hours. As the pores of the swollen hydrogel particles comprise predominantly water, the volume of the water that was present in the pores may be determined (using density of water). This volume can be compared to the total volume of the swollen hydrogel particles (calculated from the diameter of the particles) to determine the porosity percentage of the particles. This method is believed to be effective for magnetic polymer particles and coated polymer particles.

In an embodiment, the particles comprise functional groups. The functional groups may be selected from hydroxyl, carboxylic acid (—COOH), phosphonic acid (—P(O)$(OH)_2$), sulfonic acid (—$S(O)_2(OH)$), primary amine and secondary amine. The functional groups may be selected from carboxylic acid, phosphonic acid, and sulfonic acid (—$S(O)_2(OH)$), e.g. the functional groups may be selected from carboxylic acid and phosphonic acid. The functional groups may comprise carboxylic acid and/or phosphonic acid and/or sulfonic acid (e.g. carboxylic acid and/or phosphonic acid). The functional groups (e.g. carboxylic acid and/or phosphonic acid) may enhance the level of deposition of magnetic material in polymer particles comprising magnetic material. The functional groups may enhance binding of the coating to the polymer of the coated polymer particles, for example functional groups may provide a chemical handle for covalent bonding, ionic bonding or hydrogen bonding.

In an embodiment, the functional groups are provided by a hydrophilic vinylic monomer (e.g. compound of formula (Ia) or (Ib)) and not a crosslinker (e.g. compound of formula (IIa) or formula (IIb)). The functional groups may be enhanced to facilitate binding with target analytes (e.g. oligonucleotides) or target receptors. Exemplary methods of enhancing functional groups of particles of the invention are described herein in the section relating to "Uses of the Particles".

In an embodiment, the polymer particles comprise a magnetic material (e.g. the particles are magnetic hydrogel polymer particles). Porous polymer particles may comprise a magnetic material in the pores, for example one or more magnetic materials. The invention is not limited as to the identity of the magnetic material, e.g. the magnetic material may comprise at least one of a paramagnetic, superparamagnetic, ferromagnetic or ferrimagnetic material. The polymer particles may comprise a paramagnetic material. The polymer particles may comprise a superparamagnetic material. The polymer particles may comprise ferromagnetic material, ferrimagnetic material or both.

In an embodiment, the polymer particles described herein comprise nanoparticulate magnetic material and/or superparamagnetic material, particularly superparamagnetic crystals. The use of superparamagnetic material in particles of the invention may be particularly advantageous, as the lack of magnetic properties in the absence of an applied magnetic field reduces clumping of the polymer particles and assists in dispersion of the polymer particles. This is beneficial when the magnetic polymer particles are used in an assay, as it facilities even distribution of the magnetic polymer particles during the assay, with a relatively strong magnetic field only applied when it is desired to isolate the polymer particles from the bulk of the assay solution.

The superparamagnetic crystals of the polymer particles may be of any material capable of being deposited in superparamagnetic crystalline form on the polymer particles or in the pores thereof, should the particle be porous. The magnetic material may comprise, or be a metal oxide or alloy. The magnetic material may comprise, or be, an iron oxide, for example a ferrite such as, e.g. magnetite or maghemite, or a combination thereof. A portion of the iron in the iron oxide, e.g. magnetite or maghemite, may be substituted by (i.e. replaced with) Al, Mn, Ni, Cu, Co, Zn, Ca, Ge, Te, Ti or Sn or a combination thereof. In particular, magnetite or maghemite may have a portion of their iron substituted by Mn. As mentioned, some particles contain a combination of magnetite and maghemite; in this case, either the magnetite or the maghemite, or both, may have such partial substitution of their iron content. Additionally or alternatively, particles of the disclosure may include iron-based metal nanoparticles and FeNi alloy nanoparticles, in either case to increase the saturation magnetization of the particles. Where a portion of the iron is substituted by one or more other elements the total amount substituted can be up to 5 mol %, for example in the range of 0.1 to 5 mol %, for example 0.5 to 4 mol %, e.g. 1 to 3 mol %.

In an embodiment, the polymer particles are ferrimagnetic and in particular the magnetic material may comprise, or be, ferrimagnetic iron oxide crystals. Accordingly, the disclosure includes polymer particles as described herein which comprise magnetic material selected from ferrimagnetic iron oxide crystals, superparamagnetic iron oxide crystals and combinations thereof.

The total quantity of magnetic material present is generally more than 20%, preferably more than 25%, desirably more than or equal to 30%, e.g. up to 85% wt or at least 50 wt %, e.g. 30 to 80 wt %. The percentage is a weight percentage calculated on the weight of magnetic material (e.g. metal oxides) based upon the overall dry weight of the particles. Where the magnetic material consists of superparamagnetic material, therefore, the total quantity of superparamagnetic material present is generally more than 20%, preferably more than 25%, desirably more than or equal to 30%, e.g. up to 85% wt or at least 50 wt %, e.g. 30 to 80 wt %, the percentages each being a weight percentage calculated on the weight of magnetic material (e.g. metal oxides) based upon the overall dry weight of the particles.

In an embodiment, the polymer particles comprise a coating. The polymer particles comprising a coating may comprise magnetic material, or the polymer particles comprising a coating may not comprise a magnetic material. The coating is typically provided on the outer surface of the particles and for porous particles, the coating may also be provided on the solvent-accessible surface of the pores. The coating may be polymer coating. The coating may be a silica coating. The coating may completely cover the surface of the polymer particle. The coating may cover a portion of the surface of the polymer particle. The use of coating may provide a number of advantages. For example, a coating may be used to modify the surface chemistry of the polymer particles, where appropriate, for different applications. Where the polymer particles comprise magnetic material, a coating may serve to isolate the magnetic material from the bulk of a solution that the particles are suspended in, e.g. to prevent the magnetic material leaching from the particles and/or prevent the magnetic material reacting with other components present in the solution.

In an embodiment, the coating is a polymer coating. Where the coating is a polymer coating, the coating (or at least a part thereof) may be provided by grafting. In an embodiment, the coating is an organic coating formed from at least one epoxide monomer. The at least one epoxide monomer may comprise a mixture of epoxide monomers, e.g. at least two or at least three epoxide monomers. The at least one epoxide monomer (or mixture of epoxide monomers) may be selected from an epichlorohydrin, epibromohydrin, isopropylglycidyl ether, butyl glycidyl ether, allylglycidyl ether, 1,4-butanediol diglycidyl ether (1,4-bis (2,3-epoxypropoxy) butane), neopentylglycol diglycidyl ether, ethylene glycol diglycidyl ether, glycerol diglycidyl ether, glycidol, and glycidyl methacrylate, ethyl hexyl glycidylether, methyl glycidylether, glycerol propoxylate triglycidylether, poly(propylene glycol) diglycidylether, 1,3 butanediol diglycidylether, tert butyl glycidylether, 1,4 cyclohexanedimethanol diglycidyl ether, diethylene glycol diglycidyl ether, dodecyl glycidylether, O-(2,3 epoxypropyl)-O'-methylpolyethylene glycol glycidylether, glycidyl tetrafluoroethyl ether, 1,6 hexanediol diglycidylether, octyl glycidylether, decyl glycidylether, poly(epichlorohydrin-co-ethylene oxide-co-allyl glycidylether), polyethylene glycol diglycidyl ether, trimethylolethane triglycidylether, trimethylolpropane, triglycidylether, tert-butyldimethylsilyl glycidylether, 1,2-epoxybutane, 1,2-epoxypentane, 1,2-epoxy-5-hexene, 1,2-epoxy-hexane, 1,2-epoxy-7-octene, 1,2-epoxyoctane, 1,2,7,8-diepoxyoctane, 1,2-epoxy-9-decene, 1,2-epoxydecane, 1,2-epoxydodecane, 1,2-epoxytetradecane, or a combination thereof. The at least one epoxide monomer (or mixture of epoxide monomers) may be selected from 1,4-butanediol diglycidyl ether, glycidol, glycidyl methacrylate, or a combination thereof.

In an embodiment, the coating comprises silica. A silica coating may be formed by reaction of silicates (e.g. $Na_2SiO_3$) at a pH of less than about 11 in the presence of the polymer particles. A silica coating may be formed by reaction of orthosilicates (e.g. tetraethyl orthosilicate) at a temperature of at least 80° C. (e.g. a temperature of at least 90° C. or 100° C.) in the presence of the polymer particles.

In an embodiment, the particles, which may be magnetic and/or coated, may be bound to an affinity ligand the nature of which will be selected based on its affinity for a particular analyte whose presence or absence in a sample is to be ascertained. The affinity ligand may comprise any molecule capable of being linked to a particle which is also capable of specific recognition of a particular analyte. Affinity ligands include monoclonal antibodies, polyclonal antibodies, antibody fragments, nucleic acids, oligonucleotides, proteins, oligopeptides, polysaccharides, sugars, peptides, peptide encoding nucleic acid molecules, antigens, drugs and other ligands. Examples of suitable affinity ligands are available in the published literature and are well known. The use of further binding partners, secondary affinity ligands and linking groups which is routine in the art will not be discussed further herein although it will be appreciated that the use of such species with the particles of the invention is possible if desired.

The particles of the invention may be stable (i.e. resistant to polymer degradation) in aqueous solution over the typical temperature ranges of aqueous solutions. The monodisperse crosslinked hydrogel polymer particles may be stable at a temperature of up to about 100° C. For example the monodisperse crosslinked hydrogel polymer particles may be stable in a temperature range of from about 0° C. to about 100° C.

Seed Particles

The polymer particles may be prepared by a polymer particle forming process, starting with specific seed particles. The applicant has identified that the seed particles typically used in other processes, e.g. polystyrene seed particles, are not compatible with the process of the invention and the disclosure. The disclosure therefore provides seed particles that are suitable for use in a polymer particle forming process of the invention and the disclosure.

The seed particles may be (and are preferably) monodisperse. The seed particles comprise a plurality of non-crosslinked oligomers of poly N,N-dimethylacrylamide and a z-average diameter of from 100 nm to 1,500 nm. Each of the seed particles may comprise more than $1\times10^5$ (e.g. more than $1\times10^6$) non-crosslinked oligomers of poly N,N-dimethylacrylamide, for example each of the seed particles may comprise more than $5\times10^6$ non-crosslinked oligomers of poly N,N-dimethylacrylamide.

The seed particles may have a z-average diameter of from 150 nm to 1,300 nm. For example, the seed particles may have a z-average diameter of 300 nm to 1,100 nm.

The oligomers have a weight average molecular weight (Mw) of from about 2,000 Da to about 100,000 Da when measured by GPC relative to polystyrene standards. Additionally or alternatively to the specified Mw range, the polymer of each oligomer may comprise about 30 to 2,000 (e.g. about 60 to about 1,000, or about 80 to about 500) monomer units.

The Mw of the seed particle oligomers may be less than 100,000 Da, optionally less than 50,000 Da, further optionally less than 40,000 Da, e.g. less than 30,000 Da. The Mw may be more than 4,000 Da, optionally more than 5,000 Da, further optionally more than 6,000 Da, as in the case of more than 8,000 Da, e.g. more than 10,000 Da. For example, the Mw may be from 5,000 Da to 70,000 Da, e.g. from 6,000 Da to 60,000 Da, for example from 7,000 Da to 50,000 Da or from 8,000 Da to 40,000 Da.

Without wishing to be bound by any theory, it is believed that the Mw of the oligomers of the seed particles is an important characteristic of the seed particles. For example, it may be that having the Mw of the seed particle oligomers in the specified range is necessary to provide seed particles that form monodisperse polymer particles during the particle forming process described herein. If the seed particle polymer has a higher molecular weight, for example because no chain transfer agent was used during seed particle formation (such as for the monodisperse microspheres of M. Babic and D. Horak, *Macromolecular Reaction Engineering,* 2007, 1, 86-94), the particles are not suitable for use in the present process, for example because the particles resulting from such a process may not be monodisperse, e.g. the CV may be greater than 20%.

The seed particles may have the characteristics of seed particles formed in accordance with the methods of forming seed particles disclosed herein. For example, the seed particles may have the characteristics of seed particles formed by radical initiated polymerisation of N,N-dimethylacrylamide in an organic solvent in the presence of a stabilizer and a chain transfer agent.

Preparation of Seed Particles

The polymer particles may be prepared by a process as described herein, starting with specific seed particles. The disclosure therefore provides methods of preparing monodisperse seed particles.

The monodisperse seed particles may be made by a method comprising dissolving N,N-dimethylacrylamide, a stabilizer, a radical initiator and a chain transfer agent in an organic solvent to form a reaction mixture; and heating the reaction mixture to activate the initiator, thereby forming the monodisperse seed particles.

In this method, once the reaction mixture is formed in a suitable container, the reaction mixture is typically mixed, for example with a stirrer during the heating step.

Preferably, the polymerization reaction will occur in a reaction mixture that comprises a minimal amount of oxygen. Thus the reaction mixture may be purged of oxygen prior to heating the reaction mixture. The purging may comprise sparging with a chemically inert gas. The inert gas may be nitrogen or a noble gas (e.g. helium, neon, argon, krypton or xenon). For example, the inert gas may be argon, helium or nitrogen, e.g. argon or nitrogen.

The method may be considered an inverse precipitation polymerization, with the hydrophilic seed particles precipitating out of the organic solvent. The stabilizer may prevent aggregation of seed particles, assisting in the formation the monodisperse seed particles. The selection of a suitable stabilizer is dependent on the ability of the stabilizer to be dissolved in the organic solvent. The stabilizer may be a block copolymer of styrene and a polyolefin, for example a triblock copolymer based on styrene and ethylene/butylene, e.g. a linear triblock copolymer consisting of styrene and ethylene/butylene. The stabilizer may be a triblock copolymer consisting of a midblock of poly(ethylene-co-butylene) and outer blocks of polystyrene. Exemplary stabilizers comprise Kraton A1535H, Kraton G1650M, Kraton G1652M, or Kraton G1657M, or combinations thereof.

The radical initiator may be a peroxide initiator or an azo-initiator, for example a peroxide initiator or an azo-initiator that decomposes at elevated temperature. Exemplary radical initiators include 2,2'-Azobis(2-methylpropionitrile), 2,2'-Azodi(2-methylbutyronitrile), 2,2'-Azobis(2, 4-dimethyl valeronitrile), dibenzoylperoxide and the like. The radical initiator may be 2,2'-Azobis(2-methylpropionitrile). The radical initiator may be 2,2'-azodi(2-methylbutyronitrile). The temperature to which the reaction mixture may be heated will depend on the temperature at which the radical initiator is activated. Heating the reaction mixture to activate the initiator may comprise heating the reaction mixture to a temperature of at least 40° C., for example heating to a temperature of at least 50° C., e.g. heating to a temperature of at least 60° C., or e.g. heating to a temperature of at least 70° C. For example, when the radical initiator is 2,2'-Azobis(2-methylpropionitrile), the reaction mixture maybe heated to a temperature of at least 50° C. or a temperature of at least 60° C.

The addition of a chain transfer agent reduces the molecular weight of the polymer of the seed particles by reacting with the free radical of a growing polymer chain to terminate the chain and transfer the lone electron to a radical species derived from the chain transfer agent. The radical species derived from the chain transfer agent may then react with a monomer to form a radical from the monomer, which can then react with another monomer to commence formation of a new polymer chain. The chain transfer reagent may be a thiol or a haloalkane. For example, the chain transfer agent may be selected from thiols (e.g. 1-octanethiol, hexane thiol, 6-mercapto-1-hexanol, benzylthiol), alkyl thiols (e.g. 1-octanethiol, hexane thiol), carbon tetrachloride and bromotrichloromethane. For example, the chain transfer agent may be 1-octanethiol. The total amount of chain transfer agent added can be in the range 1 mol per 10 mol of monomer to 1 mol per 300 mol of monomer, for example 1 mol per 20 mol of monomer to 1 mol per 100 mol monomer, e.g. approximately 1 mol chain transfer agent per 30 mol of monomer. The time of addition of the chain transfer agent is important to obtain monodisperse seed particles: the chain transfer agent should be present in the reaction mixture prior to the initiation of polymerization (i.e. prior to activation of the radical initiator). This finding is surprising, as for seed particles of use in conventional Ugelstad processes (e.g. polystyrene seed particles), the chain transfer agent, if added, should be added after the commencement of particle formation as taught in WO 2010/125170, the content of which is incorporated herein by reference.

The organic solvent may comprise a mixture of an alkane component and an aromatic component. The organic solvent may comprise a single component, for example an alkane component or an aromatic component. The alkane component may be or comprise hexane, heptane or octane. The aromatic component may be or comprise a $C_1$-$C_{10}$ alkyl substituted phenyl or a $C_1$-$C_8$ di-alkyl substituted phenyl, for example a $C_1$-$C_4$ alkyl substituted phenyl, e.g. toluene. Where the organic solvent comprises a single component and that component is an aromatic component, the aromatic component may be a $C_4$-$C_{12}$ alkyl substituted phenyl, or a $C_2$-$C_8$ di alkyl substituted phenyl. The alkane component may be heptane and the aromatic component may be toluene. The alkane component and aromatic component may be present in a weight ratio of alkane component:aromatic component of between about 0.5:1 to about 20:1, for example the weight ratio of alkane component:aromatic component may be between about 1:1 to about 15:1, e.g. between about 1:1 to about 10:1.

The reaction mixture may comprise: the N,N-dimethylacrylamide in an amount of about 2% wt to about 5% wt; the stabiliser in an amount of about 1% wt to about 5% wt; the radical initiator in an amount of about 0.01% wt to about 4% wt (e.g. about 0.05% wt to about 0.25% wt); and the chain transfer reagent in an amount of about 0.05% wt to about 0.25% wt.

The monodisperse seed particles may then be subjected to a particle forming process, for example as outlined below:

Preparation of Particles

The disclosure provides a method of forming monodisperse crosslinked hydrogel polymer particles. An Ugelstad process cannot be used to directly form such particles, for example because the Ugelstad process requires that the particles form in the oil phase of an oil-in-water emulsion, while hydrogel polymer particles and corresponding hydrophilic monomers would be preferentially soluble in water (as is provided by the log P and/or $R_{atom}$. The applicant has addressed this by providing the methods of the present disclosure, which provide a particle forming process that uses an aqueous (discontinuous phase) in oil (continuous phase) system. This is believed to represent the first such process that has been used to form monodisperse crosslinked polymer particles.

The disclosure provides a method of forming monodisperse crosslinked hydrogel polymer particles. The method comprises forming a solution (a) of at least 2% wt of a hydrophilic vinylic monomer in an aqueous solution, the aqueous solution also comprising a crosslinker comprising at least two vinyl groups; forming a solution (b) of stabilizer in an organic solvent, wherein the organic solvent is not miscible in water, and wherein at least one of solution (a) and (b) comprises a radical initiator; mixing solutions (a) and (b) to form a water-in-oil emulsion (c) and adding monodisperse seed particles to the emulsion; allowing the monodisperse seed particles to form swollen particles in the emulsion; and polymerising the swollen particles to form the monodisperse crosslinked hydrogel polymer particles. As explained below, this method may be considered a single stage method, as it comprises a single step of swelling and a single step of polymerisation.

The solution (a) may be formed by first forming a solution of at least 2% wt of the hydrophilic vinylic monomer in an aqueous solution, and then adding the crosslinker; the crosslinker may be added before the hydrophilic vinylic monomer; or the hydrophilic vinylic monomer and crosslinker may be added to the solution at about the same time. Similarly, the stabilizer and radical initiator may be added to solution (b) at about the same time or sequentially.

In the context of the present disclosure, an organic solvent is considered not miscible with water when the organic solvent and water would separate into two separate phases, when an amount of at least 5% wt water is mixed with the organic solvent.

Figure 2:
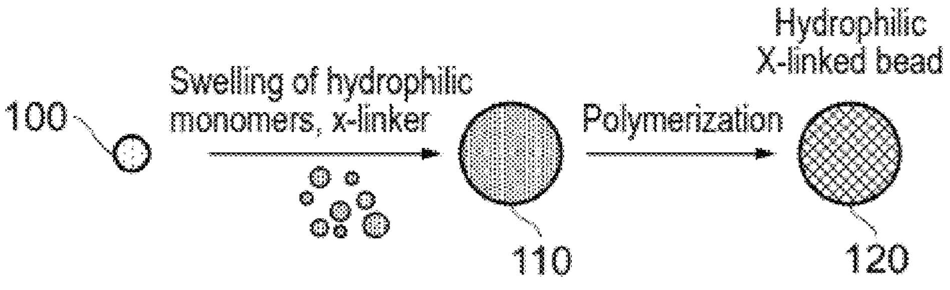
FIG. 2 is a diagrammatic representation of a single-stage particle forming process of the disclosure.

This method involves swelling the seed particles with an aqueous discontinuous phase in an oil continuous phase. A schematic of this process, which may be considered a single stage process as it comprises a single step of swelling and single step of polymerisation, is provided in FIG. 1 (illustrated with specific monomers) and FIG. 2 (illustrated more generally). The method illustrated in FIGS. 1 and 2 is conveniently divided into 2 steps, swelling of the monodisperse seed particles 100 to form swollen particles 110 and polymerisation of the monomer in the swollen seed particles to form crosslinked hydrogel polymer particles 120. Prior to the first step a water-in-oil emulsion is formed. The water-in-oil emulsion is formed by mixing an aqueous solution comprising exemplary monomer acrylamide 101 and exemplary crosslinker 1,2-dihydroxy bisacrylamide 102 with an oil phase comprising a steric stabiliser, with the emulsion formed when the water and oil phases are agitated (e.g. by stirring). If a (very) highly crosslinked particle is desired, it is also possible to replace the monomer with a crosslinker, so that the only monomers present in the water-in-oil emulsion are crosslinking monomers (i.e. crosslinkers, e.g. 1,2-dihydroxy bisacrylamide 102). The water-in-oil emulsion also typically contains an initiator, which may have been added to the oil phase. The initiator is a compound that upon activation will initiate polymerisation of the monomer and crosslinker. The monodisperse seed particles 100 comprise non-crosslinked oligomers of poly N,N-dimethylacrylamide 131 and are considered "activated seed particles". The seed particles 100 may be prepared as described elsewhere in this application. In the first step monodisperse seed particles 100 are added to the water-in-oil emulsion and the emulsion is agitated for a period of time (for instance for at least 30 minutes or for at least 1 hour, typically for 4-48 hours). During this period of time the monomer 101 and crosslinker 102 diffuse into the activated seed particles 100 to form the swollen seed particles 110. The swollen seed particles 110 comprise a mixture of at least the monomer 101, the crosslinker 102 and polymer from the activated seed particles 100. The swollen seed particles 110 may also include other components, for instance one or more porogens, which can enter the particles if included in the water-in-oil emulsion. For example, in the illustrated method, water is also present in the swollen seed particles 110, and this water may be considered a porogen. The second step comprises polymerisation of the monomer 101 and crosslinker 102 to form the crosslinked hydrogel polymer particles 120. In the second step polymerisation is initiated by activating the initiator, for example by heating the emulsion.

The provision of activated seed particles is a key feature of a successful Ugelstad process. Activation of the seed particle is typically provided by adding an organic compound of very low solubility as an emulsion to produce entropically activated seed particles. The applicant has, however, surprisingly determined that this additional activation step is not necessary in the process, for example where the seed particles comprise oligomers of poly N,N-dimethylacrylamide.

Swelling is key for the particle forming process. In this process, the monomers and (when present) porogen are required to have a limited solubility in the continuous phase. If the monomers and the porogen have a solubility that is too high in the continuous phase, the solubility will not assist in driving the monomers (and optional porogen) to enter the seeds and form swollen particles. If, on the other hand, the monomers (and optional porogen) have insufficient solubility in the continuous phase, there will be negligible diffusion through the continuous phase and thus no mass transport of monomer to the seeds are possible, preventing the formation of swollen particles. Solubility may be conveniently be measured with log P. The time to complete swelling, i.e. the time until all monomer (and optional porogen) are co-localized to the seed particles, will depend highly on factors such as temperature, solubility, and viscosity and will thus vary from system to system. Typical time scales for the step of allowing the monodisperse seed particles to form swollen particles will therefore vary from 30 min to 48 h. For example, the step of allowing the monodisperse seed particles to swell may be performed for at least 30 minutes, e.g. for at least 1 hour. The step of allowing the monodisperse seed particles to swell may be performed for at least 4 hours, at least 8 hours or at least 12 hours. The upper limit for the swelling time is not believe to be critical, for example it is believed that a swelling time of several days, e.g. 3 days or 2 days may be used.

The step of allowing the monodisperse seed particles to form swollen particles may comprise mixing the emulsion, e.g. mixing the emulsion for substantially all of the swelling time. The step of allowing the monodisperse seed particles to form swollen particles may be performed at a temperature of between about 10° C. to about 60° C., for example at a temperature of between about 10° C. to about 40° C., e.g. at a temperature of between about 15° C. to about 30° C. For example the mixing may be performed at a temperature of between about 10° C. to about 60° C., for example at a temperature of between about 10° C. to about 40° C., e.g. at a temperature of between about 15° C. to about 30° C.

Solution (a) comprises at least 2% wt of hydrophilic vinylic monomer in an aqueous solution. The aqueous solution may be water. The aqueous solution may comprise water and up to 50% wt (for example up to 30% wt or up to 25% wt, e.g. up to 20% wt, optionally up to 10% wt) of a water miscible organic solvent. The water miscible organic solvent may be a $C_1$-$C_4$ alcohol, for example ethanol or methanol, e.g. methanol. The water miscible organic solvent may be a $C_2$-$C_4$ nitrile, for example acetonitrile.

The hydrophilic vinylic monomers may comprise a generalised vinyl group that has been optionally substituted, —CR═CR'H, where R is H or alkyl (e.g. where R is —$CH_3$ or —$CH_2CH_3$), and where R' is H, alkyl (e.g. —$CH_3$ or —$CH_2CH_3$) or a functional group (e.g. a carboxylic acid, a phosphonic acid, a primary amine or a secondary amine. The hydrophilic vinylic monomer may comprise a generalised vinyl group, —CR═$CH_2$, where R is alkyl (e.g. where R is —$CH_3$ or —$CH_2CH_3$). The hydrophilic vinylic monomer may comprise a vinyl group, —CH═$CH_2$. The hydrophilic vinylic monomer may be vinylic monomers with a log P value of less than about 1, e.g. a log P of less than about 0.5. The monomers may be vinylic monomers with a log P of less than about 0.6 (e.g. of less than about 0.52). The monomers may be vinylic monomers with a log P of less than about 0.5. For example, the monomers may be vinylic monomers with a log P of less than about 0.3 or of less than about 0.2, e.g. the monomers may be vinylic monomers with a log P of less than about 0.1. The monomers may be vinylic monomers with a log P of less than about 0, e.g. with a log P of less than about −0.2. The monomers may be vinylic monomers that have a log P of more than about −3.8, e.g. with a log P of more than about −3 or about −2. The monomers may be vinylic monomers that have a log P of from 0.6 to −3. The monomers may be vinylic monomers that have a log P of from 0.5 to −2, for example a log P of from 0 to −2, e.g. a log P of from −0.2 to −2. In particular, the monomers may be vinylic monomers that also comprise a hydrophilic group, for example an acrylamide monomer or an acrylate monomer.

The monomers may have a specified value for $R_{atom}$. Where the monomers are acrylamides, vinylimidazoles, acryloylmorpholines, vinylphosphonic acids and vinylsulfonic acids, the specified $R_{atom}$ may be $R_{atom}<2.75$. Where the monomers are acrylates of other monomer classes, the specified $R_{atom}$ may be $R_{atom}\leq 2$ and the monomer has water solubility (e.g. at 25° C.) 50 g/L.

The monomer used in the method may be at least one compound of formula (I) where $R^1$ is —H, —$CH_3$, —$CH_2CH_3$ or —$CH_2C(O)OH$; $R^{1a}$ is —H, —$CH_3$, —$CH_2CH_3$, —$CH_2C(O)OH$ or —$C(O)R^2$; $R^{1b}$ is —$C(O)R^2$, —$P(O)(OH)_2$, —$S(O)_2OH$, or heterocycle with 3 to 8 ring atoms where the heteroatom(s) are selected from N, O, or S; or $R^{1b}$ in combination with $R^{1a}$ or $R^1$ is —C(O)—O—C(O)—; $R^2$ is selected from —$OR^3$, —$N(R^4)R^5$ or —N-linked amino acid; $R^3$ is selected from —H, —$C_1$-$C_6$ alkyl, or —$C_1$-$C_6$ alcohol; and $R^4$ and $R^5$ are each independently selected from —H, —$C_1$-$C_6$ alkyl, —$C_1$-$C_6$ haloalkyl, —$C_1$-$C_6$ alcohol; or $R^4$ and $R^5$ together with the nitrogen to which they are attached form a heterocycle with 3 to 8 ring atoms where the heteroatoms are selected from N, O, or S.

The monomer used in the method may be at least one compound of formula (I) where $R^1$ is —H, —$CH_3$, —$CH_2CH_3$ or —$CH_2C(O)OH$; $R^{1a}$ is —H or —$C(O)R^2$; $R^{1b}$ is —$C(O)R^2$, —$P(O)(OH)_2$ or —$S(O)_2OH$; or $R^{1b}$ in combination with $R^{1a}$ or $R^1$ is —C(O)—O—C(O)—; $R^2$ is —$OR^3$ or —$N(R^4)R^5$; $R^3$ is —H, —$C_1$-$C_6$ alkyl, or —$C_1$-$C_6$ alcohol; and $R^4$ and $R^5$ are each independently selected from —H, —$C_1$-$C_6$ alkyl, —$C_1$-$C_6$ haloalkyl, —$C_1$-$C_6$ alcohol.

Where $R^3$ is —$C_1$-$C_6$ alkyl or —$C_1$-$C_6$ alcohol, the alkyl or alcohol may be substituted, where chemically possible, by 1 to 5 substituents (e.g. 1, 2, 3 or 4) which are each independently at each occurrence selected from: oxo, =$NR^a$, =$NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl. For example, where $R^3$ is —$C_1$-$C_6$ alkyl or —$C_1$-$C_6$ alcohol, the alkyl or alcohol may be substituted, where chemically possible, by 1 to 5 (e.g. 1, 2, 3 or 4) substituents which are each independently at each occurrence selected from $OR^a$ or $CO_2R^a$, optionally where $R^a$ is H.

Where $R^4$ and/or $R^5$ are —$C_1$-$C_6$ alkyl, —$C_1$-$C_6$ haloalkyl, —$C_1$-$C_6$ alcohol, each may be independently substituted, where chemically possible, by 1 to 5 (e.g. 1, 2, 3 or 4) substituents which are each independently at each occurrence selected from: oxo, =$NR^a$, =$NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl. For example, where $R^4$ and/or $R^5$ are —$C_1$-$C_6$ alkyl, —$C_1$-$C_6$ haloalkyl, —$C_1$-$C_6$ alcohol, each may be independently substituted, where chemically possible, by 1 to 5 (e.g. 1, 2, 3 or 4) substituents which are each independently at each occurrence selected from $OR^a$ or $CO_2R^a$, optionally where $R^a$ is H.

$R^1$ may be —H, —$CH_3$ or —$CH_2CH_3$. $R^1$ may be —H or —$CH_3$. For example, $R^1$ may be —H. $R^1$ may be —$CH_2C(O)OH$.

$R^{1a}$ may be —H, —$CH_3$ or —$CH_2CH_3$. $R^{1a}$ may be —H. $R^{1a}$ may be —$C(O)R^2$. $R^{1a}$ may be —$CH_2C(O)OH$.

$R^{1b}$ may be —$C(O)R^2$. $R^{1b}$ may be —$P(O)(OH)_2$. $R^{1b}$ may be —$S(O)_2OH$. When $R^{1b}$ is —$C(O)R^2$, $R^{1a}$ may be —H. When $R^{1b}$ is —$C(O)R^2$, $R^{1a}$ may be —$C(O)R^2$, and $R^2$ may optionally be —$OR^3$. When $R^{1b}$ is —$P(O)(OH)_2$, $R^{1a}$ may be —H and $R^1$ may be —H, —$CH_3$ or —$CH_2CH_3$ (e.g. —H). When $R^{1b}$ is —$S(O)_2OH$, $R^{1a}$ may be —H and $R^1$ may be —H, —$CH_3$ or —$CH_2CH_3$ (e.g. —H).

$R^{1b}$ may be a heterocycle with 3 to 8 ring atoms where the heteroatom(s) are selected from N, O, or S. $R^{1b}$ may be an imidazolyl.

$R^{1b}$ in combination with $R^{1a}$ or $R^1$ may be —C(O)—O—C(O)—.

$R^2$ may be —$OR^3$. $R^2$ may be —$N(R^4)R^5$. $R^2$ may be —$NH_2$, —$NHCH_3$, —$NHCH_2CH_3$, or, —$NH(CH_3)_2$. $R^2$ may be an N-linked amino acid. The N-linked amino acid may be selected from arginine, histidine, lysine, aspartic acid, glutamic acid, serine, threonine, asparagine, glutamine, cysteine, glycine, proline, alanine, p-alanine, and methionine.

$R^3$ may be —H. $R^3$ may be —$C_1$-$C_6$ alkyl. For example, $R^3$ may be —$C_1$-$C_6$ alkyl substituted by 1 or 2 substituents which are each independently at each occurrence selected from: oxo, halo, cyano, $NR^aR^a$, $NR^aCONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H. $R^3$ may be —$C_1$-$C_6$ alcohol. For example, $R^3$ may be —$C_1$-$C_6$ alcohol substituted by 1 or 2 substituents which are each independently at each occurrence selected from: oxo, halo, cyano, $NR^aR^a$, $NR^aCONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H.

$R^4$ may be —H or —$C_1$-$C_6$ alkyl. $R^4$ may be —$C_1$-$C_6$ alkyl. For example, $R^4$ may be —$C_1$-$C_6$ alkyl substituted by 1 or 2 substituents which are each independently at each occurrence selected from: oxo, halo, cyano, $NR^aR^a$, $NR^a$-$CONR^aR^a$, $NR^aCO_2R^a$, $OR^a$; $CO_2R^a$ $C(O)R^a$, $CONR^aR^a$, $C_1$-$C_4$-alkyl, $CO_2$—$C_4$-alkenyl, $CO_2$—$C_4$-alkynyl, $C_1$-$C_4$ haloalkyl; wherein $R^a$ is independently at each occurrence selected from: H and $C_1$-$C_4$ alkyl, for example wherein $R^a$ is —H.

$R^5$ may be —H or —$C_1$-$C_6$ alkyl. $R^5$ may be —$C_1$-$C_6$ alkyl. For example, $R^5$ may be —$C_1$-$C_6$ alkyl substituted by 1 or 2 substituents which are each independently at each occurrence selected from: oxo, halo, cyano, $NR^aR^a$, $NR^a$-$CONR^aR^a$, $NR^aCO_2R^a$, $OR^a$; $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H and $C_1$-$C_4$ alkyl, for example wherein $R^a$ is —H.

$R^4$ and $R^5$ together with the nitrogen to which they are attached may form a heterocycle with 3 to 8 ring atoms (e.g. 4, 5, or 6 ring atoms) where the heteroatoms are selected from N, O, or S. $R^4$ and $R^5$ together with the nitrogen to which they are attached may form a morpholino heterocycle.

The monomer used in the method may be at least one compound of formula (I), (Ia), (Ib) or (1c).

The compound of formula (I), (Ia), (Ib) or (Ic) may have a log P value of less than about 1, e.g. a log P of less than about 0.5. The compound of formula (I), (Ia), (Ib) or (1c) may have a log P of less than about 0.6 (e.g. of less than about 0.52). The compound of formula (I), (Ia), (Ib) or (1c) may have a log P of less than about 0.5. For example, the compound of formula (I), (Ia), (Ib) or (1c) may have a log P of less than about 0.3 or of less than about 0.2, e.g. the compound of formula (I), (Ia), (Ib) or (1c) may have a log P of less than about 0.1. The compound of formula (I), (Ia), (Ib) or (1c) may have a log P of less than about 0, e.g. with a log P of less than about −0.2. The compound of formula (I), (Ia), (Ib) or (Ic) may have a log P of more than about −3.8, e.g. a log P of more than about −3 or about −2. The compound of formula (I), (Ia), (Ib) or (1c) may have a log P of from 0.6 to −3. The compound of formula (I), (Ia), (Ib) or (1c) may have a log P of from 0.5 to −2, for example a log P of from 0 to −2, e.g. a log P of from −0.2 to −2.

The compound of formula (I) or (Ia) may have an $R_{atom}$<2.75, where the compound is an acrylamide, vinylimidazole, acryloylmorpholine, vinylphosphonic acid, or vinylsulfonic acid; or an $R_{atom}$≤2 and a water solubility 50 g/L where the compound is an acrylate or other monomer class. The compound of formula (Ib) or (Ic) may have an $R_{atom}$<2.75.

The monomer may comprise at least one hydrophilic vinylic monomer comprising an amide group selected from —C(O)$NH_2$, —C(O)$NHCH_3$, —C(O)$NHCH_2CH_3$, or —C(O)$N(CH_3)_2$. The monomer may comprise at least one hydrophilic vinylic monomer comprising a primary amide group (—C(O)$NH_2$).

Acrylamide monomers and/or acrylic monomers may be mentioned in particular. Suitable monomers include acrylamide (prop-2-enamide), N-(hydroxymethyl)acrylamide, N-hydroxyethyl acrylamide, N-[tris(hydroxymethyl) methyl]acrylamide, 4-acrylolymorpholine, 3-acrylamidopropanoic acid, methacrylamide, N-(2-hydroxyethyl) methacrylamide, N-(3-aminopropyl)methacrylamide, hydroxypropylacrylamide, N,N-dimethylacrylamide, 2-hydroxyethyl acrylate, 2-hydroxyethyl methacrylate, acrylic acid; other acrylamide monomers, acrylic monomers, methacrylamide monomers, or methacrylic monomers with a log P value of less than about 1 (e.g. with a log P value of less than about 0.5); other acrylamide monomers, or methacrylamide monomers with an $R_{atom}$<2.75; and other acrylic acid monomers, or methacrylic acid monomers with an $R_{atom}$≤2 and water solubility (e.g. at 25° C.) 50 g/L.

The solution (a) may comprise not more than 60% wt hydrophilic vinylic monomer. For example, the solution (a) may comprise not more than 55% wt or 50% wt hydrophilic vinylic monomer. For example, the solution (a) may comprise not more than 45% wt or 40% wt hydrophilic vinylic monomer; e.g. solution (a) may comprise not more than 30% wt hydrophilic vinylic monomer. The solution (a) may comprise at least 2% wt hydrophilic vinylic monomer. The solution (a) may comprise at least 5% wt hydrophilic vinylic monomer. The solution (a) may comprise at least 8% wt hydrophilic vinylic monomer. The solution (a) may comprise at least 2% wt % (e.g. 5% wt) hydrophilic vinylic monomer and not more than 60% wt hydrophilic vinylic monomer, for example the solution (a) may comprise at least 8% wt hydrophilic vinylic monomer and not more than 60% wt hydrophilic vinylic monomer. The solution (a) may comprise at least 2% wt % (e.g. 5% wt) hydrophilic vinylic monomer and not more than 50% wt hydrophilic vinylic monomer, for example the solution (a) may comprise at least 8% wt hydrophilic vinylic monomer and not more than 50% wt hydrophilic vinylic monomer. The solution (a) may comprise at least 2% wt % (e.g. 5% wt) hydrophilic vinylic monomer and not more than 45% wt hydrophilic vinylic monomer, for example the solution (a) may comprise at least 8% wt hydrophilic vinylic monomer and not more than 45% wt hydrophilic vinylic monomer. The solution (a) may comprise at least 2% wt % (e.g. 5% wt) hydrophilic vinylic monomer and not more than 30% wt hydrophilic vinylic monomer, for example the solution (a) may comprise at least 8% wt vinylic monomer and not more than 30% wt hydrophilic vinylic monomer. The solution (a) may comprise at least 2% wt % (e.g. 5% wt) hydrophilic vinylic monomer and not more than 15% hydrophilic vinylic monomer, e.g. the solution (a) may comprise about 10% wt hydrophilic vinylic monomer.

The hydrophilic vinylic monomer may comprise a mixture of monomers. For example, the monomer may comprise at least one monomer as defined above and at least one compatible functional monomer. An exemplary functional monomer is a hydrophilic vinylic monomer as defined herein, which comprises a carboxylic acid (—COOH), a phosphonic acid (—P(O)$(OH)_2$), a sulfonic acid (—S$(O)_2$OH), primary amine or secondary amine. For example, the monomer may comprise at least one monomer of formula (I), (Ia) or (Ib) that does not comprise a carboxylic acid (—COOH), a phosphonic acid (—P(O)$(OH)_2$), a sulfonic acid (—S$(O)_2$OH), a primary amine or a secondary amine; and a monomer of formula (I), (Ia), (Ib) or (Ic) that comprises at least one carboxylic acid (—COOH), phosphonic acid (—P(O)$(OH)_2$), sulfonic acid (—S$(O)_2$OH), primary amine or secondary amine (e.g. that comprises at least one carboxylic acid (—COOH) or phosphonic acid (—P(O)$(OH)_2$)).

A functional monomer may be a vinylic monomer with a log P value of less than about 1 (e.g. a log P of less than about 0.5), which comprises a carboxylic acid or primary amine. A functional monomer may be a vinylic monomer with a log P of less than about 0.6. A functional monomer may be a vinylic monomer with a log P of less than about 0.52. A functional monomer may be a vinylic monomer with a log P of less than about 0.5. For example, the functional monomer may be a vinylic monomer with a log P of less than about 0.3 or of less than about 0.2, e.g. the functional monomer may be a vinylic monomer with a log P of less than about 0.1. A functional monomer may be a vinylic monomer with a log P of less than about 0, e.g. with a log P of less than about −0.2. A functional monomer may be a vinylic monomer that has a log P of more than about −3.8, e.g. with a log P of more than about −3 or about −2. A functional monomer may be a vinylic monomer that has a log P of from 0.6 to −3. A functional monomer may be a vinylic monomer that has a log P of from 0.5 to −2, for example a log P of from 0 to −2, e.g. a log P of from −0.2 to −2. A functional monomer may be a compound of formula (I), (Ia) or (Ib) which comprises a carboxylic acid or primary amine. A functional monomer may be an acrylamide monomer which comprises a carboxylic acid, phosphonic acid, sulfonic acid or primary amine. A functional monomer may comprise a carboxylic acid, phosphonic acid or sulfonic acid, e.g. may comprise a carboxylic acid or a phosphonic acid. Suitable functional monomers include 3-acrylamidopropionic acid, 4-acrylamidobutanoic acid, 5-acrylamidopentanoic acid, N-(3-aminopropyl)methacrylamide, acrylic acid, fumaric acid, itaconic acid, vinyl phosphonic acid, vinyl sulfonic acid and 1-vinylimidazole. Further suitable functional monomers comprise anhydrides, e.g. maleic anhydride or itaconic anhydride, which may be hydrolysed after polymerisation to provide carboxylic acid groups.

Where at least one functional monomer is present, the amount of the functional monomer may be about 0.1 to about 100% mol, for example about 0.2 to about 50% mol, e.g. about 0.5 to about 40% mol or about 1 to about 30% mol (such as about 2 to about 20% mol). For example, the amount of the functional monomer may be at least about 2 to about 100% mol, for example about 2 to about 50% mol, e.g. about 4 to about 40% mol or about 4 to about 30% mol (such as about 2 to about 20% mol). The amount of functional monomer may be about 5 to about 100% mol, e.g. about 5 to about 80% mol. The % mol may refer to the amount of functional monomer as percent by mol of the total hydrophilic vinylic monomer. The amount of functional monomer may be about 0.1 to about 60% mol, for example about 0.2 to about 50% mol, e.g. about 0.5 to about 40% mol. The amount of functional monomer may be about 1 to about 60% wt, for example about 2 to about 50% wt, e.g. about 2 or 3 to about 40% wt. The amount of functional monomer may be about 0.1 to about 10% wt, for example about 0.2 to about 5% wt, e.g. about 0.5 to about 2% wt. The % mol may refer to the mol percent of the functional monomer included in the total hydrophilic vinylic monomer of solution (a) (i.e. the solution comprising at least 2% wt hydrophilic vinylic monomer in water).

In highly crosslinked particles, the monomer may be or comprise a crosslinker. For example, the monomer may be or comprise at least one compound of formula (IIa) or (IIb).

The crosslinker used in the method may comprise at least two (e.g. 2) vinyl groups ($—CH{=}CH_2$). The crosslinker used in the method may be at least one compound of formula (IIa) or formula (IIb), wherein $R^6$ is selected from $—C_1$-$C_6$ alkyl-, $—C_1$-$C_6$ heteroalkyl-, $—C_1$-$C_6$ cycloalkyl-, $—C_1$-$C_6$ hydroxyalkyl-, $—C_1$-$C_6$ ether-, or polyether comprising 2 to 100 $C_2$-$C_3$ ether units; and $R^7$ and $R^8$ are each independently selected from —H, $—C_1$-$C_6$ alkyl, $—C_1$-$C_6$ heteroalkyl, $—C_3$-$C_6$ cycloalkyl, $—C_1$-$C_6$ hydroxyalkyl, or $—C_1$-$C_6$ ether; or $R^7$ and $R^8$ are joined together to form $—C_1$-$C_6$ alkyl-, $—C_1$-$C_6$ heteroalkyl-, $—C_1$-$C_6$ cycloalkyl-, $—C_1$-$C_6$ hydroxyalkyl-, $—C_1$-$C_6$ ether-, polyether comprising 2 to 100 $C_2$-$C_3$ ether units, $R^9$ is $—N(R^{11})C(O)CH{=}CH_2$; $R^{10}$ is selected from —H and $—N(R^{12})C(O)CH{=}CH_2$; and $R^{11}$ and $R^{12}$ are each independently selected from —H, $—C_1$-$C_6$ alkyl, $—C_1$-$C_6$ heteroalkyl, $—C_3$-$C_6$ cycloalkyl, $—C_1$-$C_6$ hydroxyalkyl, or $—C_1$-$C_6$ ether.

The crosslinker may be at least one compound of formula (IIa). The crosslinker may be at least one compound of formula (IIb).

$R^6$, $R^7$, $R^8$, $R^9$, $R^{10}$, $R^{11}$ and $R^{12}$ may be independently substituted, where chemically possible, by 1 to 5 substituents which are each independently at each occurrence selected from: oxo, $=NR^a$, $=NOR^a$, halo, nitro, cyano, $NR^aR^a$, $NR^aS(O)_2R^a$, $NR^aCONR^aR^a$, $NR^aCO_2R^a$, $OR^a$; $SR^a$, $S(O)R^a$, $S(O)_2OR^a$, $S(O)_2R^a$, $S(O)_2NR^aR^a$, $CO_2R^a$ $C(O)R^a$, $CONR^aR^a$, $C_1$-$C_4$-alkyl, $C_2$-$C_4$-alkenyl, $C_2$-$C_4$-alkynyl, $C_1$-$C_4$ haloalkyl; wherein $R^a$ is independently at each occurrence selected from: H, $C_1$-$C_4$ alkyl and $C_1$-$C_4$ alkenyl.

$R^6$ may be selected from $—C_1$-$C_6$ alkyl-, $—C_1$-$C_6$ heteroalkyl-, $—C_1$-$C_6$ cycloalkyl-, $—C_1$-$C_6$ hydroxyalkyl- and $—C_1$-$C_6$ ether-. $R^6$ may be selected from $—C_1$-$C_6$ alkyl- and $—C_1$-$C_6$ hydroxyalkyl-. $R^6$ may be a $—C_1$-$C_6$ alkyl-, for example $—CH_2—$, $—(CH_2)_2—$, $—(CH_2)_3—$, or $—(CH_2)_4—$, e.g. $—(CH_2)_2—$. $R^6$ may be a $—C_1$-$C_6$ hydroxyalkyl-, for example $—C(OH)H—$, $—(C(OH)H)_2—$, $—(C(OH)H)_3—$, or $—(C(OH)H)_4—$, e.g. $—(C(OH)H)_2—$.

$R^6$ may be a $—C_1$-$C_6$ heteroalkyl-, optionally wherein the heteroatom is an amine (e.g. a tertiary amine). For example a $—C_1$-$C_6$ heteroalkyl-substituted by $C(O)R^a$ on the hetero atom, optionally wherein the heteroatom is an amine, e.g. $R^6$ may be $—CH_2CH_2N(C(O)CH{=}CH_2)CH_2CH_2—$.

Where $R^6$ is a polyether, the polyether may be linear or branched. $R^6$ may be a polyether comprising 2 to 100 $C_2$-$C_3$ ether units, e.g. a polyether comprising 2 to 50 $C_2$-$C_3$ ether units. $R^6$ may be a polyether comprising 2 to 100 $C_2$ ether units, e.g. a polyether comprising 2 to 50 $C_2$ ether units. For example $R^6$ may be $—(CH_2)_r(OCH_2CH_2)_nO(CH_2)_s$, wherein r and s are each independently 2 or 3 (e.g. 2); and n is an integer from 1 to 100 (e.g. 5 to 50 or 5 to 25). Without wishing to be bound by any theory, it is believed that crosslinkers comprising a polyether (e.g. where $R^6$ is a polyether) have excellent solubility in the aqueous phase. This means that, while such crosslinkers may be used to provide particles with a low level of crosslinking (e.g. 1-20% wt crosslinker, or 1-10% wt crosslinker), such polyether comprising crosslinkers are particularly suitable for providing particles comprising relatively high levels of crosslinking, for example >20% wt crosslinker, >25% wt crosslinker, or >30% wt crosslinker. For example, the level of crosslinking may be 10-90% wt crosslinker, 20-80% wt crosslinker or 25-75% wt crosslinker, e.g. 25-60% wt crosslinker or 30-50% wt crosslinker.

$R^7$ and/or $R^8$ and/or $R^{11}$ and/or $R^{12}$ may be H. For example, $R^7$ and/or $R^a$ may be H. For example, $R^{11}$ and/or $R^{12}$ may be H.

$R^7$ and $R^8$ may joined together to form $—C_1$-$C_6$ alkyl-, $—C_1$-$C_6$ heteroalkyl-, $—C_1$-$C_6$ cycloalkyl-, $—C_1$-$C_6$ hydroxyalkyl-, $—C_1$-$C_6$ ether-, polyether comprising 2 to 100 $C_2$-$C_3$ ether units. When $R^7$ and $R^8$ are joined together to form $—C_1$-$C_6$ alkyl-, the group defined by $R^7$ and $R^8$ may be the same as $R^6$. For example, $R^6$ may be $—C_1$-$C_6$ alkyl- and $R^7$ and $R^8$ may be $—C_1$-$C_6$ alkyl-.

$R^6$ may be selected from $—C_1$-$C_6$ alkyl-, $—C_1$-$C_6$ heteroalkyl-, $—C_1$-$C_6$ cycloalkyl-, $—C_1$-$C_6$ ether-, or polyether comprising 2 to 100 $C_2$-$C_3$ ether units; $R^7$ and $R^8$ may be each independently selected from —H, $—C_1$-$C_6$ alkyl, $—C_1$-$C_6$ heteroalkyl, $—C_3$-$C_6$ cycloalkyl, or $—C_1$-$C_6$ ether; or $R^7$ and $R^8$ are joined together to form $—C_1$-$C_6$ alkyl-, $—C_1$-$C_6$ heteroalkyl-, $—C_1$-$C_6$ cycloalkyl-, $—C_1$-$C_6$ ether-, polyether comprising 2 to 100 $C_2$-$C_3$ ether units; and $R^{11}$ and $R^{12}$ are each independently selected from —H, $—C_1$-$C_6$ alkyl, $—C_1$-$C_6$ heteroalkyl, $—C_3$-$C_6$ cycloalkyl, or $—C_1$-$C_6$ ether.

The compound of formula (IIa) or (IIb) may have a log P value of less than about 1, e.g. a log P of less than about 0.5. The compound of formula (IIa) or (IIb) may have a log P of less than about 0.6. The compound of formula (IIa) or (IIb) may have a log P of less than about 0.5. For example, the compound of formula (IIa) or (IIb) may have a log P of less than about 0.3 or of less than about 0.2, e.g. the compound of formula (IIa) or (IIb) may have a log P of less than about 0.1. The compound of formula (IIa) or (IIb) may have a log P of less than about 0, e.g. with a log P of less than about −0.2. The compound of formula (IIa) or (IIb) may have a log P of more than −3.8, e.g. a log P of more than about −3 or about −2. The compound of formula (IIa) or (IIb) may have a log P of from 0.6 to −3. The compound of formula (IIa) or (IIb) may have a log P of from 0.5 to −2, for example a log P of from 0 to −2, e.g. a log P of from −0.2 to −2.

The compound of formula (IIa) or (IIb) may have an $R_{atom}<2.75$.

Exemplary crosslinkers of use in embodiments of the method include N,N'-(1,2-dihydroxyethylene)bisacrylamide, N,N'-methylenebis(acrylamide), N,N'-ethylenebis(acrylamide), piperazine diacrylamide, glycerol 1,3-diglycerolate diacrylate. N,N'-((ethane-1,2-diylbis(oxy))bis(ethane-2,1-diyl))diacrylamide, polyethyleneglycol diacrylamide (MW≤2000), 4-arm PEG-acrylamide (MW≤2000), N,N-bis(2-acrylamidoethyl)acrylamide. The exemplary crosslinkers N,N'-((ethane-1,2-diylbis(oxy))bis(ethane-2,1-diyl))diacrylamide, polyethyleneglycol diacrylamide (MW≤2000) and 4-Arm PEG-Acrylamide (MW≤2000) (e.g., N'-((ethane-1,2-diylbis(oxy))bis(ethane-2,1-diyl))diacrylamide) are particular suitable for use in highly crosslinked particles and mechanically more stable particles, i.e. particles with a level of crosslinking of at least 20% wt crosslinker (e.g. a level of crosslinking of at least 30% wt crosslinker). Embodiments may also include the use of a combination of crosslinkers.

The crosslinker may comprise N,N'-methylenebis(acrylamide), N,N'-ethylenebis(acrylamide), piperazine diacrylamide, N,N'-((ethane-1,2-diylbis(oxy))bis(ethane-2,1-diyl))diacrylamide, polyethyleneglycol diacrylamide (MW≤2000), 4-Arm PEG-Acrylamide (MW≤2000), N,N-bis(2-acrylamidoethyl)acrylamide.

The crosslinker may be a compound that does not comprise a primary amine, secondary amine, hydroxy or carboxylic acid. The crosslinker may be a compound of formula (IIa) or formula (IIb) that does not comprise a primary amine, secondary amine, hydroxyl or carboxylic acid The level of crosslinking in the crosslinked hydrogel polymer particles formed by the method can be expressed as the percentage by weight (% wt) of crosslinker monomer included in the total monomer used in the polymerisation. Typical levels of crosslinking include >5% wt crosslinker, for example >10% wt crosslinker, or >15% wt crosslinker, e.g. >20% wt crosslinker. The level of crosslinking may also be, for instance 5-60% wt crosslinker, for example 10-50% wt crosslinker. The level of crosslinking may also be, for instance 15-40% wt crosslinker, for example 20-40% wt crosslinker, e.g. 20-30% wt crosslinker. The solution (a) may therefore comprise at an amount of crosslinker in % wt that corresponds to 5-60% of the amount of hydrophilic vinylic monomer, for example 10-50% of the amount of hydrophilic vinylic monomer. The solution (a) may therefore comprise at an amount of crosslinker in % wt that corresponds to, for instance 15-40% of the amount of hydrophilic vinylic monomer, for example 20-40% of the amount of hydrophilic vinylic monomer, e.g. 20-30% of the amount of hydrophilic vinylic monomer.

The level of crosslinking may be >30% wt crosslinker or >40% wt crosslinker (e.g. >50% wt crosslinker), for example in highly crosslinked particles. The level of crosslinking may be 10-90% wt crosslinker, 20-80% wt crosslinker or 25-75% wt crosslinker, e.g. 25-60% wt crosslinker or 30-50% wt crosslinker. In highly crosslinked particles the level of crosslinking may be up to 100% wt crosslinker, for example the hydrophilic vinylic monomer may be a crosslinker, e.g. the hydrophilic vinylic monomer and the crosslinker may be the same compound. The solution (a) may therefore comprise at an amount of crosslinker in % wt that corresponds to 20-80% of the amount of hydrophilic vinylic monomer, for example 25-60% of the amount of hydrophilic vinylic monomer.

As a particular hydrophilic vinylic monomer may be mentioned acrylamide (prop-2-enamide), for which 1,2-dihydroxy bisacrylamide is a suitable crosslinker. As a particular hydrophilic vinylic monomer may be mentioned hydroxymethyl acrylamide, for which N,N'-((ethane-1,2-diylbis(oxy))bis(ethane-2,1-diyl))diacrylamide is a suitable crosslinker. As a particular hydrophilic vinylic monomer may be mentioned hydroxyethyl acrylamide, for which N,N'-((ethane-1,2-diylbis(oxy))bis(ethane-2,1-diyl))diacrylamide is a suitable crosslinker. Additional particular hydrophilic vinylic monomers and crosslinkers are listed in Table 1.

The stabilizer may be or comprise a non-ionic surfactant, for example a non-ionic polymeric surfactant. The non-ionic surfactant may comprise at least one oligomeric surfactant. For example, the non-ionic surfactant may comprise an oligomeric surfactant. The non-ionic polymeric or oligomeric surfactant may comprise at least one polyethyleneoxy group or at least one polypropyleneoxy group. The non-ionic polymeric surfactant may comprise at least one polyethyleneoxy group. The non-ionic oligomeric surfactant may comprise at least one polyethyleneoxy group or at least one polypropyleneoxy group. The stabiliser may be selected from or comprise hypermer 2296, Abil WE09, Abil EM90 and sorbitane monooleate (Span 80).

Polymerisation may comprise activating the radical initiator. The radical initiator is typically activated by heating to form radicals that will initiate the polymerization reaction, however other methods of activation may be used, e.g. radiation. Activating the radical initiator may comprise heating the emulsion comprising swollen particles. The heating typically comprises heating the emulsion to a temperature above the temperature at which the step of allowing the monodisperse seed particles to form swollen particles was performed. The heating may comprise heating to a temperature of at least 40° C., for example heating to a temperature of at least 50° C., e.g. a temperature of at least 60° C. or a temperature of at least 70° C.

The radical initiator may be or comprise a peroxide-initiator or an azo-initiator. For example, the radical initiator may be a peroxide-initiator. For example, the radical initiator may be an azo-initiator. An exemplary radical initiator is 2,2'-azobis-2,4-dimethyl valeronitrile. An exemplary radical initiator is 2,2'-azodi(2-methylbutyronitrile). The radical initiator may be present in solution (a). The radical initiator may be present in solution (b). The radical initiator may be present in an amount of from about 0.1 wt % to about 1.5 wt % in the emulsion. For example the radical initiator may be present in the emulsion in an amount of from about 0.6 wt % to about 1.2 wt %; e.g. the radical initiator may be present in the emulsion in an amount of about 0.8% in the emulsion.

The organic solvent used in the methods of forming monodisperse crosslinked hydrogel polymer particles may comprise (or consist of) at least one of an aliphatic hydrocarbon, an aliphatic carbonate, an aliphatic ester, an aliphatic ether, an aromatic hydrocarbon, or a silicone, or a combination thereof. For example, the organic solvent may comprise (or consist of) at least two of an aliphatic hydrocarbon, an aliphatic carbonate, an aliphatic ester, an aliphatic ether, an aromatic hydrocarbon, and a silicone; or the organic solvent may comprise (or consist of) at least three of an aliphatic hydrocarbon, an aliphatic carbonate, an aliphatic ester, an aliphatic ether, an aromatic hydrocarbon, and a silicone. The organic solvent may comprise (or consist of) a mixture of heptane and toluene. The organic solvent may comprise (or consist of) a mixture of aliphatic hydrocarbons. The organic solvent may comprise (or consist of) bis(2-ethylhexyl) carbonate. The organic solvent may comprise (or consist of) bis(2-ethylhexyl) carbonate, aliphatic hydrocarbons and aromatic hydrocarbons. The organic solvent may comprise (or consist of) bis(2-ethylhexyl)adipate.

The monodisperse seed particles added to the water-in-oil emulsion (c) may have the characteristics of monodisperse seed particles formed according to a method of preparing monodisperse seed particles disclosed herein. The monodisperse seed particles added to water-in-oil emulsion (c) may be monodisperse seed particles formed according to a method of preparing monodisperse seed particles disclosed herein. The monodisperse seed particles may be monodisperse seed particles of the disclosure, e.g. monodisperse seed particles of the invention.

In an embodiment the present invention provides a method of forming monodisperse crosslinked hydrogel polymer particles. The method comprises forming a solution (a) of at least 2% wt of a hydrophilic vinylic monomer in an aqueous solution, the aqueous solution also comprising a chain transfer agent; forming a solution (b) of stabilizer in an organic solvent, wherein the organic solvent is not miscible in water, and wherein at least one of solution (a) and solution (b) comprises a radical initiator; mixing solutions (a) and (b) to form a water-in-oil emulsion (c) and adding monodisperse seed particles to the emulsion; allowing the monodisperse seed particles to form swollen particles in the emulsion; polymerising the swollen particles to form monodisperse polymer particles; forming a solution (d) of stabilizer in an organic solvent, wherein the organic solvent is not miscible in water; forming a solution (e) of at least 2% wt of a hydrophilic vinylic monomer in an aqueous solution, the aqueous solution also comprising a crosslinker comprising at least two vinyl groups, wherein at least one of solution (d) and solution (e) comprises a radical initiator; mixing solutions (d) and (e) to form a water-in-oil emulsion (f) and adding the monodisperse polymer particles to the emulsion; allowing the monodisperse polymer particles to form swollen polymer particles in the emulsion; and polymerising the swollen polymer particles to form the monodisperse crosslinked hydrogel polymer particles. As explained below, this method may be considered a two-stage method, as it comprises a first swelling step and first polymerisation step, followed by a second swelling step and a second polymerisation step. Compared to a single stage-method, the two-stage method may provide large monodisperse crosslinked hydrogel crosslinked polymer particles.

Figure 3:
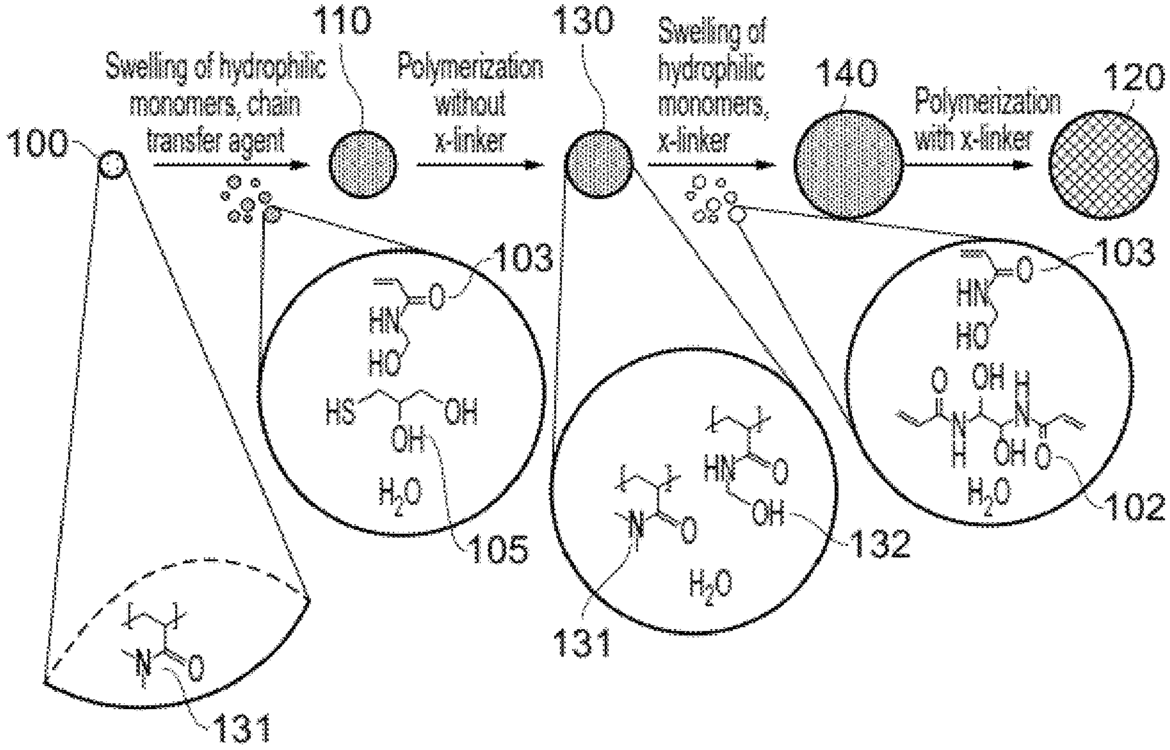
FIG. 3 is a diagrammatic representation of a two-stage swelling particle forming process of the disclosure, including an indication of example monomers and chain transfer agent.
Figure 4:
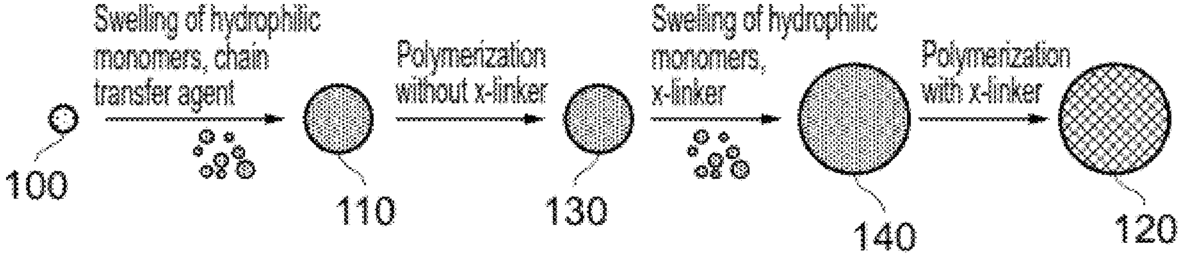
FIG. 4 is a diagrammatic representation of a two-stage swelling particle forming process of the disclosure.

Similarly to the single-stage method, the two-stage method involves swelling the seed particles with an aqueous discontinuous phase in an oil continuous phase. A schematic of this process, which may be considered a two-stage process, as it comprises two steps of swelling and two steps of polymerisation, is provided in FIG. 3 (illustrated with specific monomers) and FIG. 4 (illustrated more generally). The method illustrated in FIGS. 3 and 4 is conveniently divided into 4 steps: swelling of the monodisperse seed particles 100 with monomer 103 and chain transfer agent 105 to form swollen (monodisperse) seed particles 110; polymerisation of the monomer in the swollen seed particles to form (non-crosslinked) hydrophilic polymer particles 130; swelling of the hydrophilic polymer particles with monomer 103 and cross-linker 102 to form swollen hydrophilic polymer particles 140; and polymerisation of monomer in the hydrogel polymer particles to form crosslinked hydrogel polymer particles 150. Prior to the first step a water-in-oil emulsion is formed. The water-in-oil emulsion is formed by mixing an aqueous solution comprising a monomer, e.g. hydroxymethylacrylamide 103, and a chain transfer agent, e.g. 1-thioglycerol 105, with an oil phase comprising a steric stabiliser, with the emulsion formed when the water and oil phases are agitated (e.g. by stirring). The water-in-oil emulsion also typically contains an initiator, which may have been added to the oil phase and/or the aqueous phase. The initiator is a compound that upon activation will initiate polymerisation of the monomer. The monodisperse seed particles 100 comprise non-crosslinked oligomers of poly N,N-dimethylacrylamide 131 and are considered "activated seed particles". The seed particles 100 may be prepared as described elsewhere in this application.

In the first step monodisperse seed particles 100 are added to the water-in-oil emulsion and the emulsion is agitated for a period of time (for instance for at least 30 minutes or for at least 1 hour, typically for 4-48 hours). During this period of time the monomer 103 and chain transfer agent 105 diffuse into the activated seed particles 100 to form the swollen seed particles 110. The swollen seed particles 110 comprise a mixture of at least the monomer 103, the chain transfer agent 105 and polymer from the activated seed particles 100. The swollen seed particles 110 may also include other components, for instance one or more porogens, which can enter the particles if included in the water-in-oil emulsion. For example, in the illustrated method, water is also present in the swollen seed particles 110, and this water may be considered a porogen. The second step comprises polymerisation of the monomer 103 to form the (non-crosslinked) hydrophilic polymer particles 130. In the second step polymerisation is initiated by activating the initiator, for example by heating the emulsion. The presence of the chain transfer agent 105 results in relatively short polymers of polyhydroxymethyl acrylamide 132 (e.g. oligomers) in the hydrogel polymer particles. These relatively short polymers, combined with the lack of cross-linking, means that the hydrophilic polymer particles 130 may act as larger "activated seed particles" suitable for a further round of swelling and polymerisation. The hydrophilic polymer particles will contain the non-crosslinked relatively short polymers of polymers of polyhydroxymethyl acrylamide 132, as well as a (typically smaller proportion) of non-crosslinked oligomers of poly N,N-dimethylacrylamide 131.

Prior to the third step a water-in-oil emulsion is formed. The water-in-oil emulsion is formed by mixing an aqueous solution comprising a monomer, e.g. hydroxymethylacrylamide 103, and a crosslinker, e.g. 1,2-dihydroxy bisacrylamide 102 with an oil phase comprising a steric stabiliser. If a (very) highly crosslinked particle is desired, it is also possible to replace the monomer with a crosslinker, so that the only monomers present in the water-in-oil emulsion are crosslinking monomers (i.e. crosslinkers). The water-in-oil emulsion also typically contains an initiator, which may have been added to either the oil phase or the aqueous phase. The initiator is a compound that upon activation will initiate polymerisation of the monomer and the crosslinker. In the third step (second round of swelling) hydrophilic polymer particles 130 are added to the water-in-oil emulsion and the emulsion is agitated for a period of time (for instance for at least 30 minutes or for at least 1 hour, typically for 4-48 hours). During this period of time the monomer 103 and crosslinker 102 diffuse into the hydrophilic polymer particles 130 to form the swollen hydrogel polymer particles 140. The swollen hydrophilic polymer particles 140 comprise a mixture of at least the monomer 103, crosslinker 102 and polymers from the hydrophilic polymer particles 130. The swollen hydrogel polymer particles 140 may also include other components, for instance one or more porogens, which can enter the particles if included in the water-in-oil emulsion. For example, in the illustrated method, water is also present in the swollen seed particles 110, and this water may be considered a porogen. The fourth step comprises polymerisation of the monomer 103 and cross-linker 102 to form the crosslinked hydrogel polymer particles 104. In the fourth step polymerisation is initiated by activating the initiator, for example by heating the emulsion.

The monomer, chain transfer agent, radical initiator, stabiliser, cross-linker, organic solvent and optional porogen may each be as defined elsewhere herein. The monomer may be or comprise hydroxymethylacrylamide or hydroxyethylacrylamide. The chain transfer agent may be or comprise 1-thioglycerol. The radical initiator may be or comprise azobisdimethyl valeronitrile, e.g. 2,2'-azodi(2-methylbutyronitrile) (AMBN). The stabiliser may be or comprise Hypermer 2296, Abil WE09, and Abil EM90. The cross-linker may be 1,2-dihydroxy bisacrylamide or N,N'-((ethane-1,2-diylbis(oxy))bis(ethane-2,1-diyl))diacrylamide.

The solution (a) may comprise not more than 60% wt hydrophilic vinylic monomer. For example, the solution (a) may comprise not more than 55% wt or 50% wt hydrophilic vinylic monomer. For example, the solution (a) may comprise not more than 45% wt or 40% wt hydrophilic vinylic monomer; e.g. solution (a) may comprise not more than 30% wt hydrophilic vinylic monomer. The solution (a) may comprise at least 2% wt hydrophilic vinylic monomer. The solution (a) may comprise at least 5% wt hydrophilic vinylic monomer. The solution (a) may comprise at least 8% wt hydrophilic vinylic monomer. The solution (a) may comprise at least 2% wt % (e.g. 5% wt) hydrophilic vinylic monomer and not more than 60% wt hydrophilic vinylic monomer, for example the solution (a) may comprise at least 8% wt hydrophilic vinylic monomer and not more than 60% wt hydrophilic vinylic monomer. The solution (a) may comprise at least 2% wt % (e.g. 5% wt) hydrophilic vinylic monomer and not more than 50% wt hydrophilic vinylic monomer, for example the solution (a) may comprise at least 8% wt hydrophilic vinylic monomer and not more than 50% wt hydrophilic vinylic monomer. The solution (a) may comprise at least 2% wt % (e.g. 5% wt) hydrophilic vinylic monomer and not more than 45% wt hydrophilic vinylic monomer, for example the solution (a) may comprise at least 8% wt hydrophilic vinylic monomer and not more than 45% wt hydrophilic vinylic monomer. The solution (a) may comprise at least 2% wt % (e.g. 5% wt) hydrophilic vinylic monomer and not more than 30% wt hydrophilic vinylic monomer, for example the solution (a) may comprise at least 8% wt vinylic monomer and not more than 30% wt hydrophilic vinylic monomer. The solution (a) may comprise at least 2% wt % (e.g. 5% wt) hydrophilic vinylic monomer and not more than 15% hydrophilic vinylic monomer, e.g. the solution (a) may comprise about 10% wt hydrophilic vinylic monomer.

The solution (e) may comprise not more than 60% wt hydrophilic vinylic monomer. For example, the solution (e) may comprise not more than 55% wt or 50% wt hydrophilic vinylic monomer. For example, the solution (e) may comprise not more than 45% wt or 40% wt hydrophilic vinylic monomer; e.g. solution (e) may comprise not more than 30% wt hydrophilic vinylic monomer. The solution (e) may comprise at least 2% wt hydrophilic vinylic monomer. The solution (e) may comprise at least 5% wt hydrophilic vinylic monomer. The solution (e) may comprise at least 8% wt hydrophilic vinylic monomer. The solution (e) may comprise at least 2% wt % (e.g. 5% wt) hydrophilic vinylic monomer and not more than 60% wt hydrophilic vinylic monomer, for example the solution (e) may comprise at least 8% wt hydrophilic vinylic monomer and not more than 60% wt hydrophilic vinylic monomer. The solution (e) may comprise at least 2% wt % (e.g. 5% wt) hydrophilic vinylic monomer and not more than 50% wt hydrophilic vinylic monomer, for example the solution (e) may comprise at least 8% wt hydrophilic vinylic monomer and not more than 50% wt hydrophilic vinylic monomer. The solution (e) may comprise at least 2% wt % (e.g. 5% wt) hydrophilic vinylic monomer and not more than 45% wt hydrophilic vinylic monomer, for example the solution (e) may comprise at least 8% wt hydrophilic vinylic monomer and not more than 45% wt hydrophilic vinylic monomer. The solution (e) may comprise at least 2% wt % (e.g. 5% wt) hydrophilic vinylic monomer and not more than 30% wt hydrophilic vinylic monomer, for example the solution (e) may comprise at least 8% wt vinylic monomer and not more than 30% wt hydrophilic vinylic monomer. The solution (e) may comprise at least 2% wt % (e.g. 5% wt) hydrophilic vinylic monomer and not more than 15% hydrophilic vinylic monomer, e.g. the solution (e) may comprise about 10% wt hydrophilic vinylic monomer.

In highly crosslinked particles, the hydrophilic vinylic monomer of solution (e) may be or comprise a crosslinker. For example, the monomer may be or comprise at least one compound of formula (IIa) or (IIb).

The level of crosslinking in the crosslinked hydrogel polymer particles formed by the method can be expressed as the percentage by weight (% wt) of crosslinker monomer included in the total monomer used in the polymerisation (i.e. in the second polymerisation step). The % wt of crosslinker monomer may be equivalent to the % wt of the crosslinker in matrix polymer (i.e. the % wt of crosslinker in the dry weight of the crosslinked polymer particles). Typical levels of crosslinking include >5% wt crosslinker, for example >10% wt crosslinker, or >15% wt crosslinker, e.g. >20% wt crosslinker (such as >30% wt crosslinker). The level of crosslinking may also be, for instance 5-60% wt crosslinker, for example 10-50% wt crosslinker. The level of crosslinking may also be, for instance 15-40% wt crosslinker, for example 20-40% wt crosslinker, e.g. 20-30% wt crosslinker. The level of crosslinking may be 20-80% wt crosslinker or 25-75% wt crosslinker, e.g. 25-60% wt crosslinker or 30-50% wt crosslinker; for example in high density particles. The solution (e) may therefore comprise at an amount of crosslinker in % wt that corresponds to 5-60% of the amount of hydrophilic vinylic monomer, for example 10-50% of the amount of hydrophilic vinylic monomer. The solution (e) may therefore comprise at an amount of crosslinker in % wt that corresponds to, for instance 15-40% of the amount of hydrophilic vinylic monomer, for example 20-40% of the amount of hydrophilic vinylic monomer, e.g. 20-30% of the amount of hydrophilic vinylic monomer.

The level of crosslinking may be >30% wt crosslinker or >40% wt crosslinker (e.g. >50% wt crosslinker), for example in highly crosslinked particles. The level of crosslinking may be 10-90% wt crosslinker, 20-80% wt crosslinker or 25-75% wt crosslinker, e.g. 25-60% wt crosslinker or 30-50% wt crosslinker. In highly crosslinked particles the level of crosslinking may be up to 100% wt crosslinker, for example the hydrophilic vinylic monomer in solution (e) may be a crosslinker, e.g. the hydrophilic vinylic monomer and the crosslinker may be the same compound. The solution (e) may comprise at an amount of crosslinker in % wt that corresponds to 20-80% of the amount of hydrophilic vinylic monomer, for example 25-60% of the amount of hydrophilic vinylic monomer.

The radical initiator may be present in an amount of from about 0.1 wt % to about 1.5 wt % in each or at least one emulsion. For example the radical initiator may be present in each or at least one emulsion in an amount of from about 0.6 wt % to about 1.2 wt %; e.g. the radical initiator may be present in each or at least one emulsion in an amount of about 0.8 wt % in each or at least one emulsion.

The addition of a chain transfer agent reduces the molecular weight of the polymer of the monodisperse polymer particles by reacting with the free radical of a growing polymer chain to terminate the chain and transfer the lone electron to a radical species derived from the chain transfer agent. The radical species derived from the chain transfer agent may then react with a monomer to form a radical from the monomer, which can then react with another monomer to commence formation of a new polymer chain. The chain transfer reagent may be a thiol or a haloalkane. For example, the chain transfer agent may be selected from thiols (e.g. 1-thioglycerol, 1-octanethiol, hexane thiol, 6-mercapto-1-hexanol, and benzylthiol), alkyl thiols (e.g. 1-octanethiol, hexane thiol) and thipolyols (e.g. 1-thioglycerol). The chain transfer agent may be or comprise 1-thioglycerol. The total amount of chain transfer agent added can be in the range 1 mol per 10 mol of monomer to 1 mol per 300 mol of monomer, for example 1 mol per 20 mol of monomer to 1 mol per 100 mol monomer, e.g. approximately 1 mol chain transfer agent per 30 mol of monomer.

The monodisperse crosslinked hydrogel polymer particles formed according to a method of the invention may be porous. For example, the monodisperse crosslinked hydrogel polymer particles formed may have a porosity of at least 5%, e.g. at least 10%. The disclosure includes porous monodisperse crosslinked hydrogel polymer particles having a porosity of from 20% to 95%, particularly of from 30% to 90%, e.g. of from 40% to 90%, such as from 50% to 80%. The porous monodisperse crosslinked hydrogel polymer particles formed may be transparent to solvated molecules, for example the porous monodisperse crosslinked hydrogel polymer particles may be transparent to oligonucleotides and nucleic acid amplification reagents and sequencing reagents (e.g. primers, nucleotides and polymerases).

The monodisperse crosslinked hydrogel polymer particles formed according to a method of the invention may have a mode diameter of from 0.5 μm to 10 μm, for example of from 0.5 μm to 5 μm. The monodisperse crosslinked hydrogel polymer particles formed may have a mode diameter of at least 500 nm, e.g. at least 600 nm, optionally at least 800 nm, as in the case of particles having a diameter of at least 1 μm. The monodisperse crosslinked hydrogel polymer particles formed according to a method of the invention may have a mode diameter of not more than 10 μm, e.g. not more than 5 μm, optionally not more than 3 μm, as in the case of particles having a diameter of not more than 2 μm. The size and size distribution of the monodisperse crosslinked hydrogel polymer particles formed according to a method of the invention may be determined as described below under the heading "analytical methods".

The monodisperse crosslinked hydrogel polymer particles formed according to a method of the invention may have a CV of less than 20%, for example less than 15%. For example, the particles may have a CV of less than 10%, such as a CV of less than 8%, e.g. a CV of less than 5%.

The monodisperse crosslinked hydrogel polymer particles formed according to a method of the invention may comprise functional groups. The functional groups may be selected from a hydroxyl, a carboxylic acid (—COOH), a primary amine or a secondary amine. In an embodiment, the functional groups are provided by a hydrophilic vinylic monomer (e.g. compound of formula (I)) and not a crosslinker (e.g. compound of formula (IIa) or formula (IIb)). The functional groups may be enhanced to facilitate binding with target analytes (e.g. oligonucleotides) or target receptors. Exemplary methods of enhancing functional groups of the particles are described herein in the section relating to "Uses of the Particles".

The monodisperse crosslinked hydrogel polymer particles formed according to methods of the invention may comprise oligonucleotides attached to the particles. The oligonucleotides may be attached to the monodisperse crosslinked hydrogel polymer particles via a linker. For example, each of (or a proportion of) the monodisperse hydrogel polymer particles may comprise a plurality of oligonucleotides attached to the particle. The plurality of oligonucleotides may be identical for each individual crosslinked hydrogel polymer particle. For example, a first crosslinked hydrogel polymer particle may comprise a plurality of oligonucleotides having a first sequence attached to the first particle, and a second crosslinked hydrogel polymer particle may comprise a plurality of oligonucleotides having a second sequence attached to the second crosslinked hydrogel polymer particle. Where the monodisperse crosslinked hydrogel polymer particles are porous, the oligonucleotides may be attached to the outer surface of the particle or attached inside a pore. The pores may be of sufficient size to render the particle transparent to the oligonucleotides, such that the oligonucleotides may be located partly or wholly within the pores, even when a polymerase is attached to the oligonucleotide.

The monodisperse crosslinked hydrogel polymer particles formed according to a method of the invention may be stable (i.e. resistant to polymer degradation) in aqueous solution over the typical temperature ranges of aqueous solutions. The monodisperse crosslinked hydrogel polymer particles formed may be stable at a temperature of up to about 100° C. For example the monodisperse crosslinked hydrogel polymer particles formed may be stable in a temperature range of from about 0° C. to about 100° C.

An embodiment of the invention provides particles obtained by, or having the characteristics of particles obtained by, the preparative processes described herein.

The polymer particle forming processes described herein may be worked to be highly reproducible and scalable. The invention may therefore enable consistency between and within batches, which is a prerequisite for industrial application. The invention may also enable production of pilot scale batches of e.g. at least 300 g as well as kilogram scale industrial batches.

The polymer particle forming processes described herein can be performed consistently without the problems which in practice can arise with emulsion polymerisation, e.g. agglomeration of particles as well as variation in the product.

Preparation of Magnetic Particles

In an embodiment, provided is a method of forming monodisperse magnetic hydrogel polymer particles, comprising forming an aqueous suspension comprising monodisperse hydrogel polymer particles and a magnetic material or magnetic material precursor. The magnetic material precursor, if present, is converted into a magnetic material. The magnetic material is allowed to associate with the polymer particles. The magnetic material precursor may be provided by, for example, forming an aqueous suspension of pH less than 6 comprising monodisperse hydrogel polymer particles and $Fe^{2+}$ and/or $Fe^{3+}$ ions; which can be converted to a magnetic material by raising the pH to more than 8; and allowing the magnetic material to precipitate. The monodisperse hydrogel polymer particles may be made (e.g. are made) in accordance with a method of forming monodisperse hydrogel polymer particles disclosed herein.

The aqueous suspension of pH less than 6 may comprise $Fe^{2+}$ and $Fe^{3+}$ ions. The aqueous suspension of pH less than 6 may comprise $FeCl_2$ and $FeCl_3$. The aqueous suspension of pH less than 6 may comprise $Fe^{2+}$ and $Fe^{3+}$ ions, and may also comprise a polyvalent cation of a metal selected from Al, Mn, Ni, Cu, Co, Zn, Ca, Ge, Te, Ti or Sn or a combination thereof. Where the aqueous suspension comprises a polyvalent cation of a metal selected from Al, Mn, Ni, Cu, Co, Zn, Ca, Ge, Te, Ti or Sn or a combination thereof, the amount of the polyvalent cation may comprise up to 5 mol % of the amount of $Fe^{2+}$ and $Fe^{3+}$ ions.

Raising the pH to more than 8 may comprise addition of ammonia (e.g. aqueous ammonia) to the aqueous suspension.

The magnetic material may precipitate as nanoparticulate magnetic material and/or superparamagnetic material. The magnetic material may precipitate as paramagnetic material. The magnetic material may precipitate as superparamagnetic material. The magnetic material may precipitate as ferromagnetic material, ferrimagnetic material or both. Where the monodisperse hydrogel polymer particles are porous, the magnetic material may precipitate in the pores, for example the magnetic material may precipitate in the pores as a superparamagnetic material.

The total quantity of magnetic material present in the monodisperse magnetic hydrogel polymer particles formed by the process is generally more than 20%, preferably more than 25%, desirably more than or equal to 30%, e.g. up to 85% wt or at least 50 wt %, e.g. 30 to 80 wt %. The percentage is a weight percentage calculated on the weight of magnetic material (e.g. metal oxides) based upon the overall dry weight of the particles. Where the magnetic material consists of superparamagnetic material, the total quantity of superparamagnetic material present may be more than 20%, preferably more than 25%, desirably more than or equal to 30%, e.g. up to 85% wt or at least 50 wt %, e.g. 30 to 80 wt %, the percentages each being a weight percentage calculated on the weight of magnetic material (e.g. metal oxides) based upon the overall dry weight of the particles.

Preparation of Coated Particles

In an embodiment, provided is a method of forming coated monodisperse hydrogel polymer particles, comprising: forming a suspension comprising the monodisperse hydrogel polymer particles and at least one epoxide or silicates or orthosilicates; and reacting an epoxy group of the at least one epoxide with a surface functional group of the particles; or reacting the silicates or silanes to form a silica coating. The monodisperse hydrogel polymer particles may be made in accordance with a method of forming monodisperse hydrogel polymer particles disclosed herein. The monodisperse hydrogel polymer particles may be made in accordance with a method of forming monodisperse magnetic hydrogel polymer particles disclosed herein.

In an embodiment, the method comprises reacting an epoxy group of the at least one epoxide with a surface functional group of the particles. The suspension may comprise an organic solvent (such as an organic nitrile, e.g. acetonitrile; or an alcohol, e.g. isopropanol). The reaction may comprise a grafting reaction. The at least one epoxide monomer may comprise a mixture of epoxide monomers, e.g. at least two or at least three epoxide monomers. The at least one epoxide monomer (or mixture of epoxide monomers) may be selected from an epichlorohydrin, epibromohydrin, isopropylglycidyl ether, butyl glycidyl ether, allylglycidyl ether, 1,4-butanediol diglycidyl ether (1,4-bis (2,3-epoxypropoxy) butane), neopentylglycol diglycidyl ether, ethylene glycol diglycidyl ether, glycerol diglycidyl ether, glycidol, and glycidyl methacrylate, ethyl hexyl glycidylether, methyl glycidylether, glycerol propoxylate triglycidylether, poly(propylene glycol) diglycidylether, 1,3 butanediol diglycidylether, tert butyl glycidylether, 1,4 cyclohexanedimethanol diglycidyl ether, diethylene glycol diglycidyl ether, dodecyl glycidylether, O-(2,3 epoxypropyl)-O'-methylpolyethylene glycol glycidylether, glycidyl tetrafluoroethyl ether, 1,6 hexanediol diglycidylether, octyl glycidylether, decyl glycidylether, poly(epichlorohydrin-co-ethylene oxide-co-allyl glycidylether), polyethylene glycol diglycidyl ether, trimethylolethane triglycidylether, trimethylolpropane, triglycidylether, tert-butyldimethylsilyl glycidylether, 1,2-epoxybutane, 1,2-epoxypentane, 1,2-epoxy-5-hexene, 1,2-epoxy-hexane, 1,2-epoxy-7-octene, 1,2-epoxyoctane, 1,2,7,8-diepoxyoctane, 1,2-epoxy-9-decene, 1,2-epoxydecane, 1,2-epoxydodecane, 1,2-epoxytetradecane, or a combination thereof. The at least one epoxide monomer (or mixture of epoxide monomers) may be selected from 1,4-butanediol diglycidyl ether, glycidol, glycidyl methacrylate, or a combination thereof. The ratio of the mass of the monodisperse hydrogel polymer particles: at least one epoxide monomer may range from 1:10 to 10:1.

The surface functional group may comprise an amine. The amine may originate from a functional monomer used in the method of forming the monodisperse hydrogel polymer particles, or the amine may be introduced using standard chemistry. For example, (non-amine) functional groups of the polymer particles can be modified with reagents capable of converting the functional groups to reactive moieties that can undergo nucleophilic or electrophilic substitution, with the amine introduced by selection of a suitable reagent comprising the nucleophile or electrophile.

In an embodiment the method comprises reacting the silicates or silanes to form a silica coating. The hydrogel polymer particles may comprise iron oxide crystals (e.g. the hydrogel polymer particles may comprise magnetic material comprising iron oxide crystals) and/or hydroxy groups. Without wishing to be bound by any theory, it is believed that the presence of iron oxide crystals and/or hydroxy groups in the hydrogel polymer particles enhances the formation of the silica coating.

In an embodiment the method comprises reacting the silicates to form a silica coating. The silicates may be metasilicates, for example $Na_2SiO_3$. The suspension may comprise an aqueous solvent (e.g. the solvent may be water). Reacting the silicates to form a silica coating may comprise lowering the pH of the suspension to less than about 11 (e.g. to less than 11, 10 or 7). The ratio of the mass of the monodisperse hydrogel polymer particles: silicates may range from 1:10 to 10:1

In an embodiment the method comprises reacting silanes to form a silica coating. The silanes may be organic silanes, for example tetraethyl orthosilicate. The suspension may comprise an organic solvent, for example the solvent may be or comprise dipropylene glycol dimethyl ether. Reacting the orthosilicates to form a silica coating may comprise raising the temperature of the suspension to at least 80° C. (e.g. a temperature of at least 90° C. or 100° C.). Reacting the orthosilicates to form a silica coating may comprise raising the temperature of the suspension to a temperature in the range of from 80° C. to 155° C., for example a temperature of from 100° C. to 150° C., e.g. a temperature of from 110° C. to 150° C. (e.g. a temperature of about 130° C.). The ratio of the mass of the monodisperse hydrogel polymer particles: orthosilicates may range from 1:10 to 10:1

Uses of the Particles

The particles can be used in many applications, e.g. polynucleotide sequencing, bioassays, information storage, colour imaging, in vitro diagnostics, bioprocessing, diagnostic microbiology, biosensors and drug delivery. The polymer particles comprising magnetic material are particularly useful in assays, (e.g. where the polymer particles are conjugated with a target analyte, such as an affinity ligand), as the magnetic material allows the particles (and anything bound thereto) to be separated from bulk solution by application of a magnetic field.

The polymer particles can be activated to facilitate conjugation with a target analyte, such as a polynucleotide or other affinity ligand. Affinity ligands include monoclonal antibodies, polyclonal antibodies, antibody fragments, nucleic acids, oligonucleotides, proteins, oligopeptides, polysaccharides, sugars, peptides, peptide encoding nucleic acid molecules, immobilised metal affinity chromatography (IMAC) agents, antigens, drugs and other ligands. Where the affinity ligand is of clinical interest, the polymer particles conjugated to affinity ligands may be useful for in vitro diagnostics. In addition to the methods described below, suitable methods of activation and bioconjugation are described in G. T. Hermanson, *Bioconjugate Techniques*, 2013 ($3^{rd}$ Edition), Academic Press, the content of which is incorporated by reference herein in its entirety.

For example, functional groups on the polymeric particle can be enhanced to permit binding with target analytes or analyte receptors. In a particular example, functional groups of the polymer particles can be modified with reagents capable of converting the functional groups to reactive moieties that can undergo nucleophilic or electrophilic substitution. For example, hydroxyl groups on the polymer particles can be activated by replacing at least a portion of the hydroxyl groups with a sulfonate group or chlorine. Exemplary sulfonate groups can be derived from tresyl, mesyl, tosyl, or tosyl chloride, or any combination thereof. Sulfonate can act to permit nucleophiles to replace the sulfonate. The sulfonate may further react with liberated chlorine to provide a chlorinated group that can be used in a process to conjugate the particles. In another example, where the polymer particles comprise amine groups or carboxylic acid groups (e.g. from a functional monomer), the amine groups or carboxylic acid groups can be activated.

For example, target analyte or analyte receptors can bind to the polymer particles through nucleophilic substitution with the sulfonate group or other activated group. In a particular example, target analyte receptors terminated with a nucleophile, such as an amine or a thiol, can undergo nucleophilic substitution to replace the sulfonate groups on the surface of the polymer particles. As a result of the activation, conjugated particles can be formed.

An example of such a target analyte receptor terminated with a nucleophile is streptavidin, which is ideally suited for many different assays. For example, biotinylated single strand oligonucleotide probes bound to streptavidin conjugated particles can be used to isolate sequence specific DNA. The biotinylated probes are bound to the conjugated particles by mixing the appropriate amount of polymer particles with an excess of biotinylated probe. The particles/probe are then incubated with the DNA sample in a hybridisation buffer, e.g. SSPE or SSC, under conditions appropriate for the length and sequence of the probe and DNA. Where magnetic polymer particles are used, the excess and unwanted DNA is washed away utilizing the magnetic properties of the polymer particles. The captured DNA can be detected/quantified by PCR or any other suitable technique. For example, biotinylated double strand DNA fragments bound to streptavidin conjugated polymer particles can be used to isolate DNA sequence specific binding proteins. The biotinylated DNA is bound to the conjugated polymer particles by mixing the appropriate amount of beads with an excess of biotinylated DNA fragments. The particles/DNA are then incubated with the protein sample in a hybridisation buffer, under conditions appropriate for the protein under investigation. Where magnetic polymer particles are used, the excess and unwanted protein is washed away utilizing the magnetic properties of the polymer particles. The captured protein can be eluted from the probe (by high salt, low salt, heat, low pH etc.) for downstream applications and detection.

In another example, sulfonated particles can be further reacted with mono- or multi-functional mono- or multi-nucleophilic reagents that can form an attachment to the particle while maintaining nucleophilic activity for oligonucleotides comprising electrophilic groups, such as maleimide. In addition, the residual nucleophilic activity can be converted to electrophilic activity by attachment to reagents comprising multi-electrophilic groups, which are subsequently to attach to oligonucleotides comprising nucleophilic groups.

In another example, a monomer containing the functional group (functional monomer) may be included in the mixture of monomers during the polymerization. The functional monomer can include, for example, an acrylamide containing a carboxylic acid, phosphonic acid, sulfonic acid, ester, halogen or other amine reactive group. The ester group may be hydrolyzed before the reaction with an amine oligonucleotide or other amine containing affinity ligand.

An exemplary amine containing affinity ligand is a compound of formula

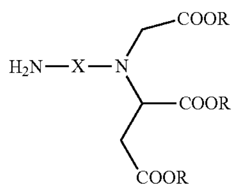

where each R independently is hydrogen or a protecting group and X represents a $C_2$-$C_{20}$ alkylene linker (e.g. a $C_5$ or $C_6$ alkylene). This affinity ligand provides a carboxymethylated aspartate (Cm-Asp) group, which may be attached to a particle (MPP), deprotected (if R is a protecting group) and complex a metal ion to form an IMAC agent

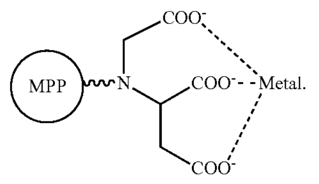

This ligand thus provides the ability to bind histidine-tags in recombinant proteins or His, Cys, Met, Gln, Asn, Lys or Tyr residues present in metalloprotein active sites in native proteins or peptides, and the ability to bind phosphorylated proteins or peptides. The production, conjugation and use of this affinity ligand in assays (e.g. with magnetic polymer particles) is described in US 2010/0222508 A1, the content of which is incorporated by reference herein in its entirety.

Other activation chemistries include incorporating multiple steps to convert a specified functional group to accommodate specific desired linkages. For example, the sulfonate modified hydroxyl group can be converted into a nucleophilic group through several methods. In an example, reaction of the sulfonate with azide anion yields an azide substituted hydrophilic polymer. The azide can be used directly to conjugate to an acetylene substituted biomolecule via "CLICK" chemistry that can be performed with or without copper catalysis. Optionally, the azide can be converted to amine by, for example, catalytic reduction with hydrogen or reduction with an organic phosphine. The resulting amine can then be converted to an electrophilic group with a variety of reagents, such as di-isocyanates, bis-NHS esters, cyanuric chloride, or a combination thereof. In an example, using di-isocyanates yields a urea linkage between the polymer and a linker that results in a residual isocyanate group that is capable of reacting with an amino substituted biomolecule to yield a urea linkage between the linker and the biomolecule. In another example, using bis-NHS esters yields an amide linkage between the polymer and the linker and a residual NHS ester group that is capable of reacting with an amino substituted biomolecule to yield an amide linkage between the linker and the biomolecule. In a further example, using cyanuric chloride yields an amino-triazine linkage between the polymer and the linker and two residual chloro-triazine groups one of which is capable of reacting with an amino substituted biomolecule to yield an amino-triazine linkage between the linker and the biomolecule. Other nucleophilic groups can be incorporated into the particle via sulfonate activation. For example, reaction of sulfonated particles with thiobenzoic acid anion and hydrolysis of the consequent thiobenzoate incorporates a thiol into the particle which can be subsequently reacted with a maleimide substituted biomolecule to yield a thio-succinimide linkage to the biomolecule. Thiol can also be reacted with a bromo-acetyl group.

Covalent linkages of biomolecules onto refractory or polymeric substrates can be created using electrophilic moieties on the substrate coupled with nucleophilic moieties on the biomolecule or nucleophilic linkages on the substrate coupled with electrophilic linkages on the biomolecule. Because of the hydrophilic nature of most common biomolecules of interest, the solvent of choice for these couplings is water or water containing some water soluble organic solvent in order to disperse the biomolecule onto the substrate. In particular, polynucleotides are generally coupled to substrates in water systems because of their poly-anionic nature. Because water competes with the nucleophile for the electrophile by hydrolyzing the electrophile to an inactive moiety for conjugation, aqueous systems generally result in low yields of coupled product, where the yield is based on the electrophilic portion of the couple. When high yields of electrophilic portion of the reaction couple are desired, high concentrations of the nucleophile are required to drive the reaction and mitigate hydrolysis, resulting in inefficient use of the nucleophile. In the case of polynucleic acids, the metal counter ion of the phosphate can be replaced with a lipophilic counter-ion, in order to help solubilize the biomolecule in polar, non-reactive, non-aqueous solvents. These solvents can include amides or ureas such as formamide, N,N-dimethylformamide, acetamide, N,N-dimethylacetamide, hexamethylphosphoramide, pyrrolidone, N-methylpyrrolidone, N,N,N',N'-tetramethylurea, N,N'-dimethyl-N,N'-trimethyleneurea, or a combination thereof; carbonates such as dimethyl carbonate, propylene carbonate, or a combination thereof; ethers such as tetrahydrofuran; sulfoxides and sulfones such as dimethylsulfoxide, dimethylsulfone, or a combination thereof; hindered alcohols such as tert-butyl alcohol; or a combination thereof. Lipophilic cations can include tetraalkylammonium or tetraarylammonium cations such as tetramethylammonium, tetraethylammonium, tetrapropylammonium, tetrabutylammonium, tetrapentylammonium, tetrahexylammonium, tetraheptylammonium, tetraoctylammonium, and alkyl and aryl mixtures thereof, tetraarylphosphonium cations such as tetraphenylphosphonium, tetraalkylarsonium or tetraarylarsonium such as tetraphenylarsonium, and trialkylsulfonium cations such as trimethylsulfonium, or a combination thereof. The conversion of polynucleic acids into organic solvent soluble materials by exchanging metal cations with lipophilic cations can be performed by a variety of standard cation exchange techniques.

The polymer particles can be activated to facilitate conjugation with a target analyte, such as a polynucleotide or other affinity ligand. For example, functional groups on the crosslinked hydrogel polymer particles can be enhanced to permit binding with target analytes or analyte receptors. In a particular example, functional groups of the polymer can be modified with reagents capable of converting hydrophilic polymer functional groups to reactive moieties that can undergo nucleophilic or electrophilic substitution. In particular, where the polymer particles have carboxyl functionality, these can be activated to facilitate conjugation, for example to biomolecules, such as nucleic acids.

In embodiments where the particles are formed with a comonomer including hydroxyl groups, hydroxyl groups on the hydrophilic particle can be activated by replacing at least a portion of the hydroxyl groups with a sulfonate group or chlorine. Exemplary sulfonate groups can be derived from tresyl, mesyl, tosyl, or tosyl chloride, or any combination thereof. Sulfonate can act to permit nucleophiles to replace the sulfonate. The sulfonate may further react with liberated chlorine to provide chlorinated groups that can be used in a process to conjugate the particles. In another example, amine groups on the hydrophilic polymer can be activated.

For example, target analyte or analyte receptors can bind to the hydrophilic polymer through nucleophilic substitution with the sulfonate group. In a particular example, target analyte receptors terminated with a nucleophile, such as an amine or a thiol, can undergo nucleophilic substitution to replace the sulfonate groups on the surface of the hydrophilic polymer. As a result of the activation, a conjugated particle can be formed.

In another example, where the particles comprise an amine (e.g. where the particles are formed from monomers comprising an amine or comprise a coating comprising an amine), nucleophilic amino groups can be modified with di-functional bis-electrophilic moieties, such as a di-isocyanate or bis-NHS ester, resulting in a hydrophilic particle reactive to nucleophiles.

When conjugated to polynucleotides, the polymer particles may include a density of polynucleotides, termed nucleotide density, of at least $7\times10^4$ per $\mu m^3$. For example, the nucleotide density may be at least $10^5$ per $\mu m^3$, such as at least $10^6$ per $\mu m^3$, at least $5\times10^6$ per $\mu m^3$, at least $8\times10^6$ per $\mu m^3$, at least $1\times10^7$ per $\mu m^3$, or even at least $3\times10^7$ per $\mu m^3$. In a further example, the nucleotide density may be not greater than $10^{15}$ per $\mu m^3$.

Such polymer particles can be used in a variety of separations techniques and analytic techniques. In particular, the polymer particles may be useful in binding polynucleotides. Such binding polynucleotides may be useful in separating polynucleotides from solution or can be used for analytic techniques, such as sequencing. In a particular example illustrated in FIG. 5, such polymeric particles can be used as a support for polynucleotides during sequencing techniques. For example, the particles may immobilize a polynucleotide for sequencing using fluorescent sequencing techniques.

In general, the polymeric particle can be treated to include a biomolecule, including nucleosides, nucleotides, nucleic acids (oligonucleotides and polynucleotides), polypeptides, saccharides, polysaccharides, lipids, or derivatives or analogs thereof. For example, the polymer particles may bind or attach to a biomolecule. A terminal end or any internal portion of a biomolecule can bind or attach to a polymeric particle. The polymer particles may bind or attach to a biomolecule using linking chemistries. A linking chemistry includes covalent or non-covalent bonds, including an ionic bond, hydrogen bond, affinity bond, dipole-dipole bond, van der Waals bond, and hydrophobic bond. A linking chemistry includes affinity between binding partners, for example between: an avidin moiety and a biotin moiety; an antigenic epitope and an antibody or immunologically reactive fragment thereof; an antibody and a hapten; a digoxigen moiety and an anti-digoxigen antibody; a fluorescein moiety and an anti-fluorescein antibody; an operator and a repressor; a nuclease and a nucleotide; a lectin and a polysaccharide; a steroid and a steroid-binding protein; an active compound and an active compound receptor; a hormone and a hormone receptor; an enzyme and a substrate; an immunoglobulin and protein A; or an oligonucleotide or polynucleotide and its corresponding complement.

Figure 5:
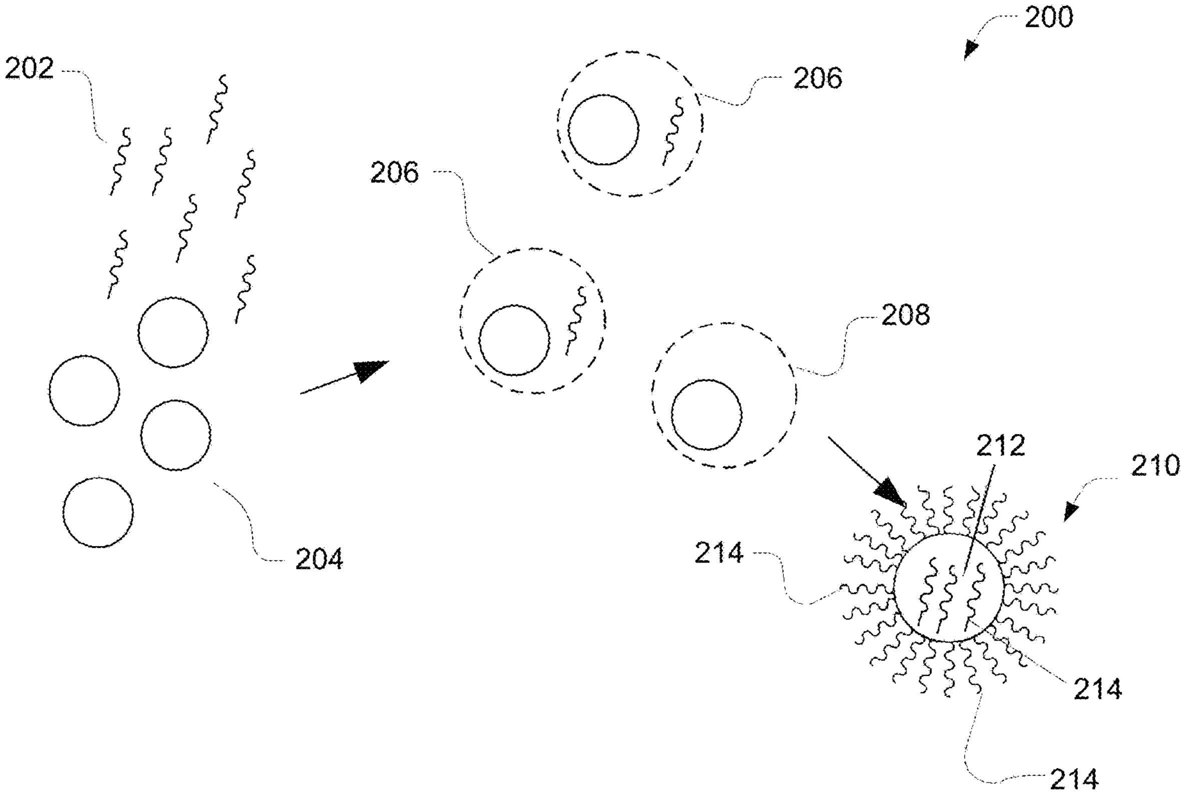
FIG. 5 illustrates the use of particles of the invention in nucleotide amplification and/or detection.

As illustrated in FIG. 5, a plurality of polymer particles 204 (for example monodisperse crosslinked hydrogel polymer particles of the disclosure) may be placed in a solution along with a plurality of polynucleotides 202. The plurality of particles 204 may be activated or otherwise prepared to bind with the polynucleotides 202. For example, the particles 204 may include an oligonucleotide complementary to a portion of a polynucleotide of the plurality of polynucleotides 202.

In a particular embodiment, the polymer particles and polynucleotides are subjected to polymerase chain reaction (PCR) amplification, such as emulsion PCR. For example, dispersed phase droplets 206 or 208 are formed as part of an emulsion and can include a particle or a polynucleotide. In an example, the polynucleotides 202 and the hydrophilic particles 204 are provided in low concentrations and ratios relative to each other such that a single polynucleotide 202 is likely to reside within the same dispersed phase droplets as a single polymer particle 204. Other droplets, such as a droplet 208, can include a single polymer particle and no polynucleotide. Each droplet 206 or 208 can include enzymes, nucleotides, salts or other components sufficient to facilitate duplication of the polynucleotide. Alternatively, amplification techniques, such as recombinase polymerase amplification (RPA) with or without emulsion, may be used.

In an aspect, the invention provides the use of hydrogel polymer particles of the invention in nucleic acid amplification. The nucleic acid amplification may be emulsion PCR.

In embodiments, methods for nucleic acid amplification comprise: conducting a primer extension reaction on a polynucleotide that is hybridized to an oligonucleotide which is attached to a polymer particle. In embodiments the polymer particle is a monodisperse crosslinked hydrogel polymer particle of the disclosure. In embodiments, methods for nucleic acid amplification comprise: (a) providing a polymer particle attached to a single-stranded oligonucleotide (e.g., a primer oligonucleotide); (b) providing a single-stranded template polynucleotide; (c) hybridising the single-stranded oligonucleotide to the single-stranded template polynucleotide; (d) contacting the single-stranded template polynucleotide with a polymerase and at least one nucleotide under conditions suitable for the polymerase to catalyse polymerisation of at least one nucleotide onto the single-stranded oligonucleotide so as to generate an extended single-stranded oligonucleotide. In embodiments, the method further comprises: (e) removing (e.g., denaturing) the single-stranded template polynucleotide from the extended single-stranded oligonucleotide so that the single-stranded oligonucleotide remains attached to the polymeric particle; (f) hybridising the remaining single-stranded oligonucleotide to a second single-stranded template polynucleotide; and (g) contacting the second single-stranded template polynucleotide with a second polymerase and a second at least one nucleotide, under conditions suitable for the second polymerase to catalyse polymerisation of the second at least one nucleotide onto the single-stranded oligonucleotide so as to generate a subsequent extended single-stranded oligonucleotide. In embodiments, steps (e), (f) and (g) can be repeated at least once. In embodiments, the polymerase and the second polymerase comprise a thermostable polymerase. In embodiments, the conditions suitable for nucleotide polymerisation include conducting the nucleotide polymerisation steps (e.g., steps (d) or (g)) at an elevated temperature. In embodiments, the conditions suitable for nucleotide polymerisation include conducting the nucleotide polymerisation step (e.g., steps (d) or (g)) at alternating temperatures (e.g., an elevated temperature and a relatively lower temperature). In embodiments, the alternating temperature ranges from 60-95° C. In embodiments, the temperature cycles can be about 10 seconds to about 5 minutes, or about 10 minutes, or about 15 minutes, or longer. In embodiments, methods for nucleic acid amplification can generate one or more polymeric particles each attached to a plurality of template polynucleotides comprising sequences that are complementary to the single-stranded template polynucleotide or to the second single-stranded template polynucleotide. In embodiments, each of the polymeric particles can be attached with a plurality of single-stranded oligonucleotides (e.g., capture oligonucleotides). In embodiments, step (b), (c), (d), (e), (f) or (g) can be conducted with a plurality of single-stranded polynucleotides. In embodiments, at least a portion of the single-stranded oligonucleotide comprises a nucleotide sequence that is complementary (or partially complementary) to at least a portion of the single-stranded polynucleotide. In embodiments, methods for nucleic acid amplification (as described above) can be conducted in an aqueous phase solution in an oil phase (e.g., dispersed phase droplet).

Following PCR, particles are formed, such as particle 210, which can include the polymer particle 212 and a plurality of copies 214 of the polynucleotide. The majority of the polynucleotides 214 are illustrated on the external surface of the particle 210 for the purposes of clarity. The polynucleotides may, however, extend within (or be located within) the particle 210, as also illustrated. For example, hydrogel and hydrophilic particles may have a low concentration of polymer relative to water and may therefore be relatively porous. They may include polynucleotide segments on the interior of and throughout the particle 210 and polynucleotides may reside in pores and other openings. In particular, the particle 210 can permit diffusion of enzymes, nucleotides, primers and reaction products used to monitor the reaction. A high number of polynucleotides per particle produces a better signal.

In embodiments, polymeric particles from an emulsion-breaking procedure may be collected and washed in preparation for sequencing. Collection may be conducted by contacting biotin moieties (e.g., linked to amplified polynucleotide templates which are attached to the polymeric particles) with avidin moieties, and separation away from polymeric particles lacking biotinylated templates. Collected polymer particles that carry double-stranded template polynucleotides may be denatured to yield single-stranded template polynucleotides for sequencing. Denaturation steps may include treatment with base (e.g., NaOH), formamide, or pyrrolidone.

Another sequencing system is the SOLiD™ sequencing system (Sequencing by Oligonucleotide Ligation and Detection) of Applied Biosystems, which uses stepwise cycled ligation for high throughput DNA sequencing. In this bead based system, beads (i.e. polymer particles) loaded with DNA templates undergo sequential ligation and cleavage reactions using 4-colour, fluorescently-labeled octameric probes. These probes are delivered serially and serve to interrogate dinucleotide positions on DNA strands. It would be desirable to support higher bead densities that facilitate an increased number of bead events per instrument run and improved probe chemistry, affording increased sequencing fidelity.

Sequencing by Oligonucleotide Ligation and Detection involves attachment of a nucleic acid target to a crosslinked polymer particles (beads) followed by immobilization of a plurality of the particles onto a surface. Each nucleic acid-bead conjugate comprises a unique DNA sequence, sequencing techniques of this type are disclosed in International Publication No. WO 2006/084132 A2 (incorporated herein by reference).

Methods of attachment of the beads to the support have utilized a flat glass microscope slide irreversibly coated with streptavidin. Nucleic acid-laden beads are contacted with biotinylated nucleotides (e.g., obtained by the action of biotinylated dNTP's and terminal deoxytransferase on the DNA target subsequent to attachment to the bead). Incubation of the biotinylated beads with the streptavidin coated slide results in immobilization of the beads onto the slide by the interaction of streptavidin with the biotin. While kinetically this is a very effective attachment scheme, movement of the beads on the slide was sometimes observed under the conditions required by the DNA sequence assay. When beads are present in high densities on the slide (e.g., up to 100,000 beads/$mm^2$) and interrogated multiple times (e.g., up to 25 times), any significant bead movement can preclude robust identification of a particular bead on subsequent scans within a dense population of beads.

US 2009/0099027 (equivalent to WO2009/026546, both incorporated herein by reference) therefore describes a covalent system for bead immobilization that reduces movement of the beads during sequencing and other forms of genetic analysis. The method comprises: reacting a nucleophilic group on the surface of a substrate with a molecule comprising a plurality of electrophilic groups thereby providing one or more free electrophilic groups on the surface of the substrate; and reacting nucleophilic groups on a surface of a particulate material with the one or more free electrophilic groups on the surface of the substrate to covalently attach the particulate material to the substrate.

US 2009/0099027 describes the modification of a nucleophilic (more particularly, amino functional) surface with a multifunctional electrophilic reagent. For example, the electrophilic surfaces of silicate glass microscope slides can be readily converted to a nucleophilic surface by reacting surface groups with (aminopropyl) trialkoxysilanes.

A DNA target nucleic acid that had been covalently attached to a crosslinked polymer bead may be modified by the action of aminoalkyl dNTP's and terminal deoxytransferase on the DNA target subsequent to attachment to the bead. The nucleophilic amino group on the DNA target can then react with the residual electrophilic group of the support surface to form multiple stable covalent bonds between the bead and the glass surface.

It has been found that stable covalent bonds can be formed between a surface containing electrophilic groups and particles containing nucleophilic groups. In addition, beads containing nucleophilic amino groups from the action of amino-dNTP's and terminal deoxytransferase on a DNA target can be immobilized under aqueous basic conditions on the modified surface. For example, surfaces comprising amino groups that have been activated with benzene 1,4-diisothiocyanate can be used to immobilize beads with nucleophilic groups. In addition, the covalent attachment appears to be quite stable, and no bead movement is observed.

The surface immobilized beads can be used in methods of analysing nucleic acid sequences based on repeated cycles of duplex extension along a single stranded template via ligation. Sequencing methods of this type are disclosed in U.S. Pat. Nos. 5,750,341; 5,969,119; and 6,306,597 B1 and in International Publication No. WO 2006/084132 A2. Each of these publications is incorporated by reference herein in its entirety. Moreover, the techniques described in the aforementioned publications can be used to analyse (e.g., sequence) nucleic acid templates attached to particles that are bound to supports as described herein. The immobilized beads can be used in sequencing methods that do not necessarily employ a ligation step, such as sequencing using labeled nucleotide that have removable blocking groups that prevent polynucleotide chain extension (e.g., U.S. Pat. Nos. 6,664,079; 6,232,465; and 7,057,026, each of which is incorporated by reference herein in its entirety). The immobilized beads can be used in a variety of techniques in which signals on the beads are repeated detected through multiple cycles.

The beads which are used in SOLiD sequencing may be monodisperse magnetic and/or coated hydrogel particles of the disclosure. An embodiment therefore includes the use of the monodisperse particles in the methods and products disclosed in the publications mentioned in the previous paragraph and the applicant of the present application considers all such uses, methods and products to fall within the present invention and reserves the right to claim them. The use of submicron particles in SOLiD sequencing enables a greater density of particles to be attached to the glass surfaces (e.g. glass panels or microscope slides). Further included in an embodiment is a method of performing SOLiD sequencing which uses monodisperse particles of the disclosure, e.g. wherein monodisperse submicron of the present disclosure are coupled to a nucleic acid target and immobilised on a surface, e.g. a glass surface. The method of immobilisation is not critical and may be covalent or non-covalent, examples of non-covalent coupling being through streptavidin/avidin-biotin binding. The covalent coupling may be as described in US 2009/0099027 and WO2009026546, for example, but any other suitable technique for covalent coupling may be used. Included in an embodiment, therefore, is a method of forming a product (an article of manufacture), comprising coupling monodisperse submicron particles of the present disclosure to a nucleic acid and optionally further comprising immobilising the resultant nucleic acid-laden particles on a surface, e.g. a glass surface. The nucleic acid may be used as a target in sequencing, e.g. using SOLiD sequencing.

For example, a method is provided that comprises:

(a) hybridizing a first initializing oligonucleotide probe to a target polynucleotide to form a probe-target duplex, wherein the oligonucleotide probe has an extendable probe terminus, wherein the target polynucleotide is attached to a polymer particle which is a member of a population of polymer particles as disclosed herein and wherein the particle is covalently attached to the surface of a solid support;

(b) ligating a first end of an extension oligonucleotide probe to the extendable probe terminus thereby forming an extended duplex containing an extended oligonucleotide probe, wherein the extension oligonucleotide probe comprises a cleavage site and a detectable label;

(c) identifying one or more nucleotides in the target polynucleotide by detecting the label attached to the just-ligated extension oligonucleotide probe;

(d) cleaving the just-ligated extension oligonucleotide probe at the cleavage site to generate the extendable probe terminus, wherein cleavage removes a portion of the just-ligated extension oligonucleotide probe that comprises the label from the probe-target duplex; and (e) repeating steps (b), (c) and (d) until a sequence of nucleotides in the target polynucleotide is determined.

Also provided is a method of sequencing a nucleic acid comprising: (a) hybridizing a primer to a target polynucleotide to form a primer-target duplex, wherein the target polynucleotide is attached at a 5' end to a polymer particle which is a member of a population of polymer particles as disclosed herein and wherein the polymer particle is covalently attached to the surface of a support; (b) contacting the primer-target duplex with a polymerase and one or more different nucleotide analogues to incorporate a nucleotide analogue onto the 3' end of the primer thereby forming an extended primer strand, wherein the incorporated nucleotide analogue terminates the polymerase reaction and wherein each of the one or more nucleotide analogues comprises (i) a base selected from the group consisting of adenine, guanine, cytosine, thymine and uracil and their analogues (ii) a unique label attached to the base or analogue thereof via a cleavable linker; (iii) a deoxyribose; and (iv) a cleavable chemical group which caps an —OH group at a 3'-position of the deoxyribose; (c) washing the surface of the support to remove any unincorporated nucleotide analogues; (d) detecting the unique label attached to the just-incorporated nucleotide analogue to thereby identify the just-incorporated nucleotide analogue; (e) optionally, permanently capping any unreacted —OH group on the extended primer strand; (f) cleaving the cleavable linker between the just incorporated nucleotide analogue and the unique label; (g) cleaving the chemical group capping the —OH group at the 3'-position of the deoxyribose of the just incorporated nucleotide analogue to uncap the —OH group; (h) washing the surface of the support to remove cleaved compounds; (i) repeating steps (b)-(h).

The polymer particles of the disclosure may be used in any method of nucleic acid sequencing which involves a polymer particle. An embodiment includes particles of the disclosure coupled to a nucleic acid as well as a method of sequencing a nucleic acid which comprises coupling a nucleic acid to a population of particles of the disclosure. The nucleic acid may be DNA or RNA.

The present disclosure includes a product (e.g. an article of manufacture) comprising a plurality of monodisperse particles of the disclosure coupled to a substrate such as, for example, glass surface, for example through a streptavidin-biotin linkage, an avidin-biotin linkage or through a covalent linkage, e.g. as described in US 2009/0099027 and WO2009/026546. The particles may be coupled to the substrate through a nucleic acid. The present disclosure includes the use of the monodisperse particles of the disclosure to make such a product. An embodiment includes the use of the attachment chemistry described in US 2009/0099027 and WO2009/026546 to attach monodisperse particles of the disclosure to a substrate, and the applicant reserves the right to claim methods of using such chemistry and the products thereof. The present specification therefore includes by reference the disclosures of US 2009/0099027 and WO2009026546.

Embodiments therefore include methods in which functionalised monodisperse polymer particles of the disclosure are subjected to one or more further reactions to obtain a desired product. Other embodiments include the use of these products in applications.

In view of the consistency of the quality and characteristics which the particles of the disclosure may possess, they may be used in methods which comprise performing processes in relation to a conjugated substance, e.g. selected from labels, biological molecules and biological structures, for example biological molecules such as amino acids, saccharides, nucleotides and nucleosides and multimers made by condensing together two or more such monomers, e.g. polypeptides, proteins, polysaccharides, oligonucleotides and nucleic acids. As labels may be mentioned dyes, e.g. fluorescent dyes, quenchers, enzymes, and semiconductor nanocrystals. Embodiments of the invention include such uses as well as:

i) conjugates comprising a population of particles of the disclosure at least a portion of which are coupled to a conjugated substance, e.g. one as just described
ii) a method comprising coupling at least a portion of a population of particles of the disclosure to a substance, e.g. one as just described
iii) a method comprising coupling at least a portion of a population of particles of the disclosure to a substrate.

Analytical Methods

Molecular Weight Measurement

The weight average molecular weight (Mw) of the oligomers in the seed particle can be determined from measurements made using gel permeation chromatography (GPC). In GPC a series of polymer particle standards are run and used to generate a calibration curve. The Mw of the oligomers may be measured by GPC relative to polystyrene standards using as eluent DMF with 0.01 M LiBr. As these Mw values are calculated relative to standards of a polymer (polystyrene) that is different to that of the seed particles, the calculated Mw represents a relative value, rather than an absolute value. The measurements will therefore be reproducible, but will not provide the actual Mw.

An outline of the GPC method that was used in the examples provided herein is as follows. The following experimental conditions were used:

Eluent: DMF with 0.01 M LiBr
Precolumn: PSS GRAM, 10 μm, Guard ID 8.0 mm×50 mm
Columns: PSS GRAM, 10 μm, Linear M ID 8.0 mm×300 mm PSS GRAM, 10 μm, Linear M ID 8.0 mm×300 mm
Temperature: 70° C.
Pump: PSS SECcurity 1260 HPLC pump
Flow rate: 1.0 mL/min
Inject. system: PSS SECcurity 1260 autosampler
Inject. volume: 50 μL
Sample conc.: 3.0 g/L
Detector: PSS SECcurity 1260 refractive index detector (RID)
Chromatography data system: PSS WinGPC UniChrom Version 8.2

Polystyrene standards with different molecular weights were measured under the above experimental conditions to obtain a calibration curve. The samples were then run. Mw was then calculated for the samples based on the PS calibration curve.

Size and Size Distribution

The size distribution of samples can be measured using disc centrifugation, e.g. CPS Disc Centrifugation™ on Disc Centrifuge Model DC20000, using protocols provided by the instrument manufacturer. Accurate results require calibration with a standard of similar density to the sample being analysed and thus is only of use where a suitable polymeric standard is available, for example a set of compact polystyrene particle standards for particles of the disclosure comprising predominantly polystyrene. Where the samples being measured have a density that is not known, e.g. for porous particles, the measurement obtained by CPS disc centrifugation will be reproducible but will not provide the actual diameter.

An outline of the CPS Disc Centrifugation™ that was used in the examples provided herein is as follows. The skilled person would be able to readily adapt this method where it is appropriate to do so for other samples, for example by selecting a suitable gradient, disc speed and standard particles, based on the size and porosity of the particles to be analysed. Disc centrifuge analysis was performed on a CPS DC20000 from CPS instruments with a disc speed of 10000 rpm and a gradient of 8-24 wt % sucrose in 1.5 g/L SDS (aq.). The gradient was made using an Auto Gradient pump from CPS instruments and the volume of the injected gradient was 16-17 mL. The samples were diluted to approximately 0.01 wt % in MilliQ-H2O prior to injection. The method used for analysis had the following settings: Max. diameter 4.0 μm, min. diameter 0.1 μm, particles density 1.6 g/mL, particle refractive index 1.592, particle absorption 0.2, particle non-sphericity 1, calibration standard diameter 1.098, calibration standard density 1.6, standard half-with 0.2 μm, liquid density 1.06 g/mL, liquid refractive index 1.355. The size reported is the absorption peak diameter and the CV is determined by setting the boarders around the main peak.

Photon correlation spectroscopy (PCS) can be used to obtain the hydrodynamic diameter of a particle in the form of the z-average. The measurement is independent of the particle density and based on Brownian motion of small particles. PCS measurements for nanosized particles can be obtained, for example with a Malvern Zetasizer Nano-ZS, Model ZEN3600. Further details and methods can be found in the Malvern Zetasizer Nano series manual (incorporated herein by reference in its entirety).

Another technique that can be used to determine the size and size distribution of particles is optical microscopy. A population of beads may be prepared by placing an aqueous solution comprising beads on a microscope slide, then capturing an image of the beads at a suitable level of magnification, e.g. 100× or greater, and analysing the size of the beads using image analysis software.

An outline of the optical microscopy method that was used in the examples provided herein is as follows. Microscopy samples were prepared by sandwiching a 0.12 mm, 9 mm diameter Secure-Sea™ spacer between a cover slip and a Secure-Sea™ Hybridization Chamber Gasket. The formed cavity was filled with 8 μL of beads diluted in 150 mM NaCl followed by a short centrifugation and attachment to a microscope slide. Phase contrast optical microscopy was then performed on an Olympus IX81 inverted microscope using 100× lens. Multiple images were collected automatically using a Matlab based macro for pManager. An out of focus image was collected as the background and subtracted from the phase contrast image. The background subtracted image was then thresholded using Otsu's method to identify individual beads for size analysis. Green fluorescent polystyrene bead with standard sizes were used to calibrate the measured bead size by fluorescence microscopy. Then a series of Alexa 488 labeled hydrogel beads were used to calibrate phase contrast size to fluorescent size.

Optical microscopy is a preferred method for measuring the size of the particles, as it provides a measurement that is independent of the density of the particles. Disc centrifuge analysis is a preferred method of measuring the size distribution of particles (CV), as optical microscopy is based on image analysis and the presence of artefacts in the image can result in an artificially high CV.

Magnetic Susceptibility

Magnetic susceptibility was determined using a MS3 meter, Magnetic Susceptibility System from Bartington Instruments equipped with a MS2B dual frequency sensor. Samples for measurements were prepared by weighing out 100.0±20.0 mg particles which were diluted in 7.0000±0.1000 g aluminium oxide. Each batch was analysed in duplicate with mass specific correction using the following settings: measurement period 1 s, number of iterations 1, and number of cycles 100.

Vibrating Sample Magnetometry (VSM)

VSM was performed on a LakeShore 7400. 3-10 mg of the sample was weighed out and placed in a lock-ring gelatin capsule (Torpac). To prevent movement during the measurement the capsule was fixed with glue and allowed to dry overnight. The hysteresis curve was collected by setting magnetic field was initially to 10000 Oe then gradually changed down to −10000 Oe and finally gradually changed to 10000 Oe.

Iron Content

Quantitative determination of the iron content of magnetic particles was performed by Alcontrol Laboratories Norway by dissolving 0.11 g of particles in 5 mL aqua regia followed by microwave heating. The sample was diluted to 50 mL with $H_2O$ and finally diluted 250-fold. The concentration of iron was then determined by Inductively Coupled Plasma Atomic Emission Spectrometry (ICP-AES) analysis performed using a Varian 720-ES instrument.

EXAMPLES

Synthesis of Seed Particles

Example 1

A 2 L jacketed round-bottom flask equipped with a mechanical anchor stirrer and a condenser was charged with 34.6 g of distilled N,N-dimethylacrylamide, 27.6 g of Kraton G1650, 1.5 g of 2,2'-Azobis(2-methylpropionitrile), 747.9 g of heptane, 187.0 g of toluene, and 1.2 g of 1-octanethiol. Once everything had dissolved the reaction mixture was purged with Ar (g) for 60 min. The reaction was then heated to 71° C. using a temperature controlled water bath connected to the reactor and heated for 16 h while stirring at 400 rpm. The resulting dispersion was analysed by dynamic light scattering yielding a z-average diameter of 360 nm.

Example 2

A 2 L jacketed round-bottom flask equipped with a mechanical anchor stirrer and a condenser was charged with 34.6 g of distilled N,N-dimethylacrylamide, 27.7 g of Kraton G1650, 1.4 g of 2,2'-Azobis(2-methylpropionitrile), 747 g of heptane, 187 g of toluene, and 2.5 g of 1-octanethiol. Once everything had dissolved the reaction mixture was purged with Ar (g) for 60 min. The reaction was then heated to 71° C. using a temperature controlled water bath connected to the reactor and heated for 16 h while stirring at 400 rpm. The resulting dispersion was analysed by dynamic light scattering yielding a z-average diameter of 970 nm.

Synthesis of Polymer Particles from Low Molecular Weight Seed Particles

Example 3

Solution 1 (monomer phase): A 250 mL Duran flask was charged with 7.4 g of acrylamide (AAm), 2.5 g of N,N'-(1, 2-dihydroxyethylene)bisacrylamide (DHEBAAm), and 14.9 g of $H_2O$. The mixture was shaken at 61° C. until all had dissolved Solution 2 (stabilizer): 33 g of Abil WE09, 36 g of mineral oil, and 145 g of diethylhexyl carbonate (Tegosoft DEC) were added to a 400 mL beaker and mixed with a magnetic stir bar until all had dissolved.

Solution 3 (emulsion): 66 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.5 g of PDMAAm seed (Example 1) were charged into a 250 mL 3-necked round bottom flask equipped with a condenser, a mechanical stirrer, and a gas inlet and stirred at 100 rpm at 60° C. for 1 h. Finally the flask was purged with Ar (g) for 15 min before addition of 2.6 g of 2,2'-azodi(2-methylbutyronitrile) (AMBN) dissolved in 2.6 g of toluene and heating to 70° C. while stirring at 50 rpm for 7 h.

Redispersion: 30 g of the crude product was added to a 250 mL centrifugation flask and filled with g N-methyl-2-pyrrolidone (NMP). The flask was shaken for 2 h followed by centrifugation for 5 min at 2000 rpm. The supernatant was removed and the product was washed additionally twice with NMP and 3 times with $H_2O$ before final redispersion in $H_2O$.

Example 4

Solution 1 (monomer phase): A 250 mL Duran flask was charged with 7.4 g of N-[tris(hydroxymethyl)methyl]acrylamide (THMAAm), 2.5 g of N,N'-(1,2-dihydroxyethylene) bisacrylamide (DHEBAAm), and 14.9 g of $H_2O$. The mixture was shaken at 61° C. until all had dissolved.

Solution 2 (stabilizer), Solution 3 (emulsion) and Redispersion: As in Example 3.

Example 5

Solution 1 (monomer phase): A 250 mL Duran flask was charged with 7.4 g of hydroxyethyl acrylamide (HEAAm), 2.5 g of N,N'-(1,2-dihydroxyethylene)bisacrylamide (DHEBAAm), and 14.9 g of $H_2O$. The mixture was shaken at 61° C. until all had dissolved.

Solution 2 (stabilizer), Solution 3 (emulsion) and Redispersion: As in Example 3.

Example 6

Solution 1 (monomer phase): A 250 mL Duran flask was charged with 7.5 g of hydroxymethyl acrylamide (HMAAm), 5.0 g of N,N'-((ethane-1,2-diylbis(oxy))bis(ethane-2,1-diyl))diacrylamide (EGBEAAm), and 12.4 g of $H_2O$. The mixture was stirred until all had dissolved.

Solution 2 (stabilizer): 35 g of Abil WE09, 38 g of mineral oil, and 152 g of diethylhexyl carbonate (Tegosoft DEC) were added to a 400 mL beaker and mixed with a magnetic stir bar until all had dissolved.

Solution 3 (emulsion): 71 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 4.2 g of PDMAAm seed (Example 1) were charged into a 250 mL 3-necked round bottom flask equipped with a condenser, a mechanical stirrer, and a gas inlet and stirred at 100 rpm at 19° C. for 1 h. Finally the flask was purged with Ar (g) for 15 min before heating to 70° C. while stirring at 50 rpm for 7 h.

Redispersion: 50 g of the crude product was added to a 250 mL centrifugation flask and filled with g N-methyl-2-pyrrolidone (NMP). The flask was shaken for 1 h followed by centrifugation for 5 min at 4000 rpm. The supernatant was removed and the product was washed additionally twice with NMP and 5 times with $H_2O$ before final redispersion in $H_2O$.

Example 7

Solution 1 (monomer phase): A 250 mL Duran flask was charged with 7.5 g of hydroxymethyl acrylamide (HMAAm), 2.5 g of piperazine diacrylamide, and 15.0 g of $H_2O$. The mixture was stirred until all had dissolved.

Solution 2 (stabilizer), Solution 3 (emulsion) and Redispersion: As in Example 6.

Example 8

Solution 1 (monomer phase): A 250 mL Duran flask was charged with 7.5 g of hydroxymethyl acrylamide (HMAAm), 5.0 g of N,N'-((ethane-1,2-diylbis(oxy))bis(ethane-2,1-diyl))diacrylamide (EGBEAAm), and 12.4 g of $H_2O$. The mixture was stirred until all had dissolved.

Solution 2 (stabilizer): 24 g of Abil WE09, 26 g of mineral oil, and 104 g of diethylhexyl carbonate (Tegosoft DEC) were added to a 250 mL beaker and mixed with a magnetic stir bar until all had dissolved.

Solution 3 (emulsion): As in Example 6.

Redispersion: 25 g of the crude product was added to a 250 mL centrifugation flask and filled with g N-methyl-2-pyrrolidone (NMP). The flask was shaken for 3 days followed by centrifugation for 10 min at 5000 rpm. The supernatant was removed and the product was washed additionally twice with NMP and 4 times with $H_2O$ before final redispersion in $H_2O$.

Example 9

Solution 1 (monomer phase): A 500 mL Duran flask was charged with 36.8 g of hydroxymethyl acrylamide (HMAAm), 2.6 g of acrylic acid, 39.4 g of N,N'-((ethane-1,2-diylbis(oxy))bis(ethane-2,1-diyl))diacrylamide (EGBEAAm), and 118.3 g of H2O. The mixture was shaken until all had dissolved.

Solution 2 (stabilizer): 7.6 g of 2,2'-azodi(2-methylbutyronitrile) (AMBN), 95.6 g of Abil WE09, 104.3 g of mineral oil, and 417.2 g of diethylhexyl carbonate (Tegosoft DEC) were added to a 1 L beaker and mixed with a magnetic stir bar until all had dissolved.

Solution 3 (emulsion): 520 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 40 g of PDMAAm seed (Example 2) were charged into a 1 L jacketed cylindrical reactor equipped with a condenser, a mechanical stirrer, and a gas inlet and stirred for 80 minutes at 100 rpm at 22° C. Finally the flask was purged with Ar (g) for 30 min before heating to 70° C. while stirring at 55 rpm for 20 h.

Redispersion and analysis: The crude product was divided into 2×1 L centrifugation flasks and centrifuged for 15 minutes at 3600 rpm. The supernatants were removed and the particles were redispersed in isopropanol. The redispersed particles were then split into a total of 4×1 L centrifuge bottles, washed 4 times with isopropanol and 8 times with $H_2O$ and before final redispersion in $H_2O$. The product was analysed using optical microscopy and disc centrifuge. Relative disc centrifuge diameter vs. standard was determined to 1.62 μm with a CV=16.1.

Example 10

Solution 1 (monomer phase): A 250 mL Duran flask was charged with 3.7 g of acrylic acid, 3.7 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (stabilizer): 2.6 g of 2,2'-azodi(2-methylbutyronitrile) (AMBN), 33 g of Abil WE09, 36 g of mineral oil, and 144 g of diethylhexyl carbonate (Tegosoft DEC) were added to a 400 mL beaker and mixed with a magnetic stir bar until all had dissolved.

Solution 3 (emulsion): 66 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.9 g of PDMAAm seed (Example 1) were charged into a 250 mL 3-necked round bottom flask equipped with a condenser, a mechanical stirrer, and a gas inlet and stirred at 100 rpm at 20° C. for 1 h. Finally the flask was purged with Ar (g) for 15 min before heating to 70° C. while stirring at 62 rpm for 7 h.

Redispersion and analysis: 77 g of the crude product was added to a 250 mL centrifugation flask and centrifuged for 20 minutes at 5000 rpm. The supernatants were removed and the particles were redispersed in isopropanol and washed in total 3 times in isopropanol followed by. The particles were resdispersed in $H_2O$ and the redispersed particles were transferred to a 1 L centrifuge flask and washed 2 times with $H_2O$. The batch was subsequently transferred to 3×250 mL centrifugation flasks and washed additionally once before final redispersion in $H_2O$. The product was analysed using optical microscopy and disc centrifuge. Relative disc centrifuge diameter vs. standard was determined to 0.37 μm with a CV=5.4%.

Example 11

Solution 1 (monomer phase): A 250 mL Duran flask was charged with 1.9 g of hydroxymethyl acrylamide (HMAAm), 1.9 g of acrylic acid, 3.7 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (stabilizer), Solution 3 (emulsion): As in Example 10.

Redispersion and analysis: As in Example 10 but using 78 g of crude. The product was analysed using optical microscopy and disc centrifuge. Relative disc centrifuge diameter vs. standard was determined to 0.43 μm with a CV=5.6%.

Example 12

Solution 1 (monomer phase): A 250 mL Duran flask was charged with 2.8 g of hydroxymethyl acrylamide (HMAAm), 0.9 g of acrylic acid, 3.7 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (stabilizer), Solution 3 (emulsion): As in Example 10.

Redispersion and analysis: As in Example 10 but using 78 g of crude. The product was analysed using optical microscopy and disc centrifuge. Relative disc centrifuge diameter vs. standard was determined to 0.43 μm with a CV=5.2%.

Example 13

Solution 1 (monomer phase): A 250 mL Duran flask was charged with 3.7 g of hydroxymethyl acrylamide (HMAAm), 3.7 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (stabilizer): 2.6 g of 2,2'-azodi(2-methylbutyronitrile) (AMBN), 33 g of Abil WE09, 36 g of mineral oil, and 144 g of diethylhexyl carbonate (Tegosoft DEC) were added to a 400 mL beaker and mixed with a magnetic stir bar until all had dissolved.

Solution 3 (emulsion): 66 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.9 g of PDMAAm seed (Example 1) were charged into a 250 mL 3-necked round bottom flask equipped with a condenser, a mechanical stirrer, and a gas inlet and stirred at 100 rpm at 20° C. for 1 h. Finally the flask was purged with Ar (g) for 15 min before heating to 70° C. while stirring at 62 rpm for 7 h.

Redispersion and analysis: 78 g of the crude product was added to a 250 mL centrifugation flask and centrifuged for 20 min at 5000 rpm. The supernatants were removed, the particles were redispersed in isopropanol and centrifuged for 15 min at 3000 rpm. The redispersed particles were washed 3 times with isopropanol. The particles were redispersed in $H_2O$ and split into a total of 3×250 mL centrifuge bottles and centrifuged for 20 min at 5000 rpm. The redispersed particles were washed 3 times with $H_2O$ before final redispersion in $H_2O$. The product was analysed using optical microscopy and disc centrifuge. Relative disc centrifuge diameter vs. standard was determined to 0.43 μm with a CV=5.4%.

Example 14

Solution 1 (monomer phase): A 250 mL Duran flask was charged with 3.4 g of hydroxyethyl acrylamide (HEAAm), 0.3 g of acrylic acid (AA), 3.7 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (stabilizer), Solution 3 (emulsion): As in Example 13.

Redispersion and analysis: 77 g of the crude product was added to a 250 mL centrifugation flask and centrifuged for 20 min at 5000 rpm. The supernatants were removed, the particles were redispersed in isopropanol and centrifuged for 15 min at 3000 rpm. The redispersed particles were washed 3 times with isopropanol. The particles were redispersed in $H_2O$ and split into a total of 3×250 mL centrifuge bottles and centrifuged for 20 min at 5000 rpm. The redispersed particles were washed 3 times with $H_2O$ before final redispersion in $H_2O$. The product was analysed using optical microscopy and disc centrifuge. Relative disc centrifuge diameter vs. standard was determined to 0.41 μm with a CV=6.1%.

Example 15

Solution 1 (monomer phase): A 250 mL Duran flask was charged with 3.4 g of N-[Tris(hydroxymethyl)methyl]acrylamide (THMAAm), 0.3 g of acrylic acid (AA), 3.7 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (stabilizer), Solution 3 (emulsion): As in Example 13.

Redispersion and analysis: 78 g of the crude product was added to a 250 mL centrifugation flask and centrifuged for 20 min at 5000 rpm. The supernatants were removed, the particles were redispersed in isopropanol and centrifuged for 15 min at 3000 rpm. The redispersed particles were washed 3 times with isopropanol. The particles were redispersed in $H_2O$ and split into a total of 3×250 mL centrifuge bottles and centrifuged for 20 min at 5000 rpm. The redispersed particles were washed 3 times with $H_2O$ before final redispersion in $H_2O$. The product was analysed using optical microscopy and disc centrifuge. Relative disc centrifuge diameter vs. standard was determined to 0.42 μm with a CV=5.7%.

Example 16

Solution 1 (monomer phase): A 250 mL Duran flask was charged with 3.2 g of hydroxymethyl acrylamide (HMAAm), 0.5 g of fumaric acid, 3.7 g of N,N'-((ethane-1,2-diylbis(oxy))bis(ethane-2,1-diyl))diacrylamide (EGBEAAm), and 17.3 g of $H_2O$. The mixture was heated to 40° C. and mixed with a magnetic stir bar until all had dissolved.

Solution 2 (stabilizer): 2.6 g of 2,2'-azodi(2-methylbutyronitrile) (AMBN), 33 g of Abil WE09, 35 g of mineral oil, and 140 g of diethylhexyl carbonate (Tegosoft DEC) were added to a 250 mL beaker and mixed with a magnetic stir bar until all had dissolved.

Solution 3 (emulsion): 66 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.9 g of PDMAAm seed (Example 1) were charged into a 250 mL 3-necked round bottom flask equipped with a condenser, a mechanical stirrer, and a gas inlet and stirred at 100 rpm at 20° C. for 1 h. Finally the flask was purged with Ar (g) for 15 min before heating to 70° C. while stirring at 65 rpm for 7 h.

Redispersion and analysis: 77 g of the crude product was added to a 250 mL centrifugation flask and centrifuged for 20 min at 5000 rpm. The supernatants were removed, the particles were redispersed in isopropanol and centrifuged for 15 min at 3000 rpm. The redispersed particles were washed 3 times with isopropanol. The particles were redispersed in $H_2O$ and split into a total of 3×250 mL centrifuge bottles and centrifuged for 20 min at 5000 rpm. The redispersed particles were washed 3 times with $H_2O$ before final redispersion in $H_2O$. The product was analysed using optical microscopy and disc centrifuge. Relative disc centrifuge diameter vs. standard was determined to 0.44 μm with a CV=5.5%.

Example 17

Solution 1 (monomer phase): A 250 mL Duran flask was charged with 3.1 g of hydroxymethyl acrylamide (HMAAm), 0.6 g of itaconic acid, 3.7 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (stabilizer), Solution 3 (emulsion): As in Example 16.

Redispersion and analysis: 77 g of the crude product was added to a 250 mL centrifugation flask and centrifuged for 20 min at 5000 rpm. The supernatants were removed, the particles were redispersed in isopropanol and centrifuged for 15 min at 3000 rpm. The redispersed particles were washed 3 times with isopropanol. The particles were redispersed in $H_2O$ and split into a total of 3×250 mL centrifuge bottles and centrifuged for 20 min at 5000 rpm. The redispersed particles were washed 3 times with $H_2O$ before final redispersion in $H_2O$. The product was analysed using optical microscopy and disc centrifuge. Relative disc centrifuge diameter vs. standard was determined to 0.47 μm with a CV=5.4%.

Example 18

Solution 1 (monomer phase): A 250 mL Duran flask was charged with 3.2 g of hydroxymethyl acrylamide (HMAAm), 0.5 g of vinylphosphonic acid, 3.7 g of N,N'-((ethane-1,2-diylbis(oxy))bis(ethane-2,1-diyl))diacrylamide (EGBEAAm), and 17.3 g of $H_2O$. The mixture was shaken until all had dissolved.

Solution 2 (stabilizer), Solution 3 (emulsion): As in Example 16.

Redispersion and analysis: 77 g of the crude product was added to a 250 mL centrifugation flask and centrifuged for 20 min at 5000 rpm. The supernatants were removed, the particles were redispersed in isopropanol and centrifuged for 15 min at 3000 rpm. The redispersed particles were washed 3 times with isopropanol. The particles were redispersed in $H_2O$ and split into a total of 3×250 mL centrifuge bottles and centrifuged for 20 min at 5000 rpm. The redispersed particles were washed 3 times with $H_2O$ before final redispersion in $H_2O$. The product was analysed using optical microscopy and disc centrifuge. Relative disc centrifuge diameter vs. standard was determined to 0.42 μm with a CV=5.3%.

Example 19

Solution 1 (monomer phase): A 250 mL Duran flask was charged with 0.6 g of hydroxymethyl acrylamide (HMAAm), 0.7 g of acrylamidopropionic acid (AAPA), 1.2 g of N,N'-((ethane-1,2-diylbis(oxy))bis(ethane-2,1-diyl))diacrylamide (EGBEAAm), and 22.2 g of $H_2O$. The mixture was shaken until all had dissolved.

Solution 2 (stabilizer): 2.6 g of 2,2'-azodi(2-methylbutyronitrile) (AMBN), 32 g of Abil WE09, 35 g of mineral oil, and 140 g of diethylhexyl carbonate (Tegosoft DEC) were added to a 400 mL beaker and mixed with a magnetic stir bar until all had dissolved.

Solution 3 (emulsion): 65 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.9 g of PDMAAm seed (Example 1) were charged into a 250 mL 3-necked round bottom flask equipped with a condenser, a mechanical stirrer, and a gas inlet and stirred at 100 rpm at 20° C. for 1 h. Finally the flask was purged with Ar (g) for 15 min before heating to 70° C. while stirring at 57 rpm for 7 h.

Redispersion and analysis: To a 1 L centrifuge flask 71 g of crude product, 500 mL $H_2O$, and 300 mL 2-BuOH were added. The flask was placed on a shaking table followed by centrifugation. The 2-BuOH was removed and 150 mL 2-BuOH was added. This was repeated once more before the particles were resuspension in $H_2O$ split into a total of 4×250 mL centrifuge bottles and centrifuged. The redispersed particles washed were washed additionally 3 times with $H_2O$ before final redispersion in $H_2O$. Bright field microscopy was performed by diluting the redispersed product to a concentration 0.01 wt % in 150 mM NaCl solution and image statistics was collected from 23 images yielding a mode diameter of 0.85 μm.

Example 20

Solution 1 (monomer phase): A 250 mL Duran flask was charged with 1.8 g of hydroxymethyl acrylamide (HMAAm), 0.7 g of acrylamidopropionic acid (AAPA), 2.5 g of N,N'-((ethane-1,2-diylbis(oxy))bis(ethane-2,1-diyl)) diacrylamide (EGBEAAm), and 19.7 g of $H_2O$. The mixture was shaken until all had dissolved.

Solution 2 (stabilizer), Solution 3 (emulsion): As in Example 19.

Redispersion and analysis: To a 1 L centrifuge flask 70 g of crude product, 500 mL $H_2O$, and 300 mL 2-BuOH were added. The flask was placed on a shaking table followed by centrifugation. The 2-BuOH was removed and 150 mL 2-BuOH was added. This was repeated 2 more times before the particle suspension split into a total of 6×250 mL centrifuge bottles and centrifuged. The particles were redispersed in $H_2O$ and centrifuged. The redispersed particles washed 5 times with $H_2O$ before final redispersion in $H_2O$. Bright field microscopy was performed by diluting the redispersed product to a concentration 0.01 wt % in 150 mM NaCl solution and image statistics was collected from 25 images yielding a mode diameter of 0.83 μm.

Example 21

Solution 1 (monomer phase): A 250 mL Duran flask was charged with 4.2 g of hydroxymethyl acrylamide (HMAAm), 0.7 g of acrylamidopropionic acid (AAPA), 4.9 g of N,N'-((ethane-1,2-diylbis(oxy))bis(ethane-2,1-diyl)) diacrylamide (EGBEAAm), and 14.8 g of $H_2O$. The mixture was shaken until all had dissolved.

Solution 2 (stabilizer): 2.6 g of 2,2'-azodi(2-methylbutyronitrile) (AMBN), 33 g of Abil WE09, 35 g of mineral oil, and 140 g of diethylhexyl carbonate (Tegosoft DEC) were added to a 400 mL beaker and mixed with a magnetic stir bar until all had dissolved.

Solution 3 (emulsion): 66 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.9 g of PDMAAm seed (Example 1) were charged into a 250 mL 3-necked round bottom flask equipped with a condenser, a mechanical stirrer, and a gas inlet and stirred at 100 rpm at 20° C. for 1 h. Finally the flask was purged with Ar (g) for 15 min before heating to 70° C. while stirring at 58 rpm for 7 h.

Redispersion and analysis: To a 1 L centrifuge flask 71 g of crude product, 500 mL $H_2O$, and 300 mL 2-BuOH were added. The flask was placed on a shaking table followed by centrifugation. The 2-BuOH was removed and 150 mL 2-BuOH was added. This was repeated 2 more times before the particle suspension split into a total of 6×250 mL centrifuge bottles and centrifuged. The particles were redispersed in $H_2O$ and centrifuged. The redispersed particles washed 5 times with $H_2O$ before final redispersion in $H_2O$. Bright field microscopy was performed by diluting the redispersed product to a concentration 0.01 wt % in 150 mM NaCl solution and image statistics was collected from 18 images yielding a mode diameter of 0.82 μm.

Example 22

Solution 1 (monomer phase): A 250 mL Duran flask was charged with 5.5 g of hydroxymethyl acrylamide (HMAAm), 0.7 g of acrylamidopropionic acid (AAPA), 6.2 g of N,N'-((ethane-1,2-diylbis(oxy))bis(ethane-2,1-diyl)) diacrylamide (EGBEAAm), and 12.3 g of $H_2O$. The mixture was shaken until all had dissolved.

Solution 2 (stabilizer), Solution 3 (emulsion): As in Example 21.

Redispersion and analysis: To a 1 L centrifuge flask 68 g of crude product, 500 mL $H_2O$, and 300 mL 2-BuOH were added. The flask was placed on a shaking table followed by centrifugation. The 2-BuOH was removed and 150 mL 2-BuOH was added. This was repeated 2 more times before the particle suspension split into a total of 6×250 mL centrifuge bottles and centrifuged. The particles were redispersed in $H_2O$ and centrifuged. The redispersed particles washed 5 times with $H_2O$ before final redispersion in $H_2O$. Bright field microscopy was performed by diluting the redispersed product to a concentration 0.01 wt % in 150 mM NaCl solution and image statistics was collected from 22 images yielding a mode diameter of 0.86 μm.

Example 23

Solution 1 (monomer phase): A 250 mL Duran flask was charged with 3.1 g of hydroxymethyl acrylamide (HMAAm), 0.7 g of acrylamidopropionic acid (AAPA), 3.7 g of N,N'-((ethane-1,2-diylbis(oxy))bis(ethane-2,1-diyl)) diacrylamide (EGBEAAm), and 17.3 g of $H_2O$. The mixture was shaken until all had dissolved.

Solution 2 (stabilizer): 2.6 g of 2,2'-azodi(2-methylbutyronitrile) (AMBN), 32 g of Abil WE09, 35 g of mineral oil, and 140 g of diethylhexyl carbonate (Tegosoft DEC) were added to a 400 mL beaker and mixed with a magnetic stir bar until all had dissolved.

Solution 3 (emulsion): 66 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 9.9 g of PDMAAm seed (Example 1) were charged into a 250 mL 3-necked round bottom flask equipped with a condenser, a mechanical stirrer, and a gas inlet and stirred at 100 rpm at 20° C. for 1 h. Finally the flask was purged with Ar (g) for 15 min before heating to 70° C. while stirring at 58 rpm for 7 h.

Redispersion and analysis: To a 1 L centrifuge flask 70 g of crude product, 500 mL $H_2O$, and 300 mL 2-BuOH were added. The flask was placed on a shaking table followed by centrifugation. The 2-BuOH was removed and 150 mL 2-BuOH was added. This was repeated 2 more times before the particle suspension split into a total of 6×250 mL centrifuge bottles and centrifuged. The particles were redispersed in $H_2O$ and centrifuged. The redispersed particles washed 5 times with $H_2O$ before final redispersion in $H_2O$. Bright field microscopy was performed by diluting the redispersed product to a concentration 0.01 wt % in 150 mM NaCl solution and image statistics was collected from 22 images yielding a mode diameter of 0.84 μm.

Example 24

Solution 1 (monomer phase): A 250 mL Duran flask was charged with 3.1 g of hydroxymethyl acrylamide (HMAAm), 0.7 g of acrylamidopropionic acid (AAPA), 3.7 g of N,N'-((ethane-1,2-diylbis(oxy))bis(ethane-2,1-diyl)) diacrylamide (EGBEAAm), and 17.3 g of $H_2O$. The mixture was shaken until all had dissolved.

Solution 2 (stabilizer), Solution 3 (emulsion): As in Example 23.

Redispersion and analysis: To a 1 L centrifuge flask 71 g of crude product, 500 mL $H_2O$, and 300 mL 2-BuOH were added. The flask was placed on a shaking table followed by centrifugation. The 2-BuOH was removed and 150 mL 2-BuOH was added. This was repeated 2 more times before the particle suspension split into a total of 6×250 mL centrifuge bottles and centrifuged. The particles were redispersed in $H_2O$ and centrifuged. The redispersed particles washed 5 times with $H_2O$ before final redispersion in $H_2O$. Bright field microscopy was performed by diluting the redispersed product to a concentration 0.01 wt % in 150 mM NaCl solution and image statistics was collected from 25 images yielding a mode diameter of 0.85 μm.

Example 25

Solution 1 (monomer phase): A 500 mL Duran flask was charged with 28.6 g of hydroxymethyl acrylamide (HMAAm), 0.95 g of acrylamidopropionic acid (AAPA), 19.7 g of N,N'-((ethane-1,2-diylbis(oxy))bis(ethane-2,1-diyl))diacrylamide (EGBEAAm), and 29.4 g of $H_2O$. The mixture was shaken until all had dissolved).

Solution 2 (stabilizer): 3.8 g of 2,2'-azodi(2-methylbutyronitrile) (AMBN), 48 g of Abil WE09, 53 g of mineral oil, and 210 g of diethylhexyl carbonate (Tegosoft DEC) were added to a 600 mL beaker and mixed with a magnetic stir bar until all had dissolved.

Solution 3 (emulsion): 262 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 40 g of PDMAAm seed (Example 1) were charged into a 1 L jacketed round bottom flask equipped with a condenser, a mechanical stirrer, and a gas inlet and stirred overnight at 100 rpm at 22° C. Finally the flask was purged with Ar (g) for 30 min before heating to 70° C. while stirring at 64 rpm for 7 h.

Redispersion and analysis: The crude product was divided into 2×250 mL centrifugation flasks and centrifuged for 15 min at 5000 rpm and 10 min at 7000 rpm. The supernatants were removed and the particles were redispersed in isopropanol. The redispersed particles were then split into a total of 6×250 mL centrifuge bottles, washed 4 times with isopropanol and 6 times with $H_2O$ and before final redispersion in $H_2O$. The particles were then filtered through three different filtration mesh fabrics: Sefar Nitex 03-64/32, Sefar Nitex 03-30/18, and Sefar Nitex 03-1/1. The product was analysed using optical microscopy and disc centrifuge. Bright field microscopy was performed by diluting the redispersed product to a concentration of 0.01 wt % in 150 mM NaCl solution and image statistics was collected from 18 images yielding a mode diameter of 0.91 μm. Relative disc centrifuge diameter using CPS method 3 was determined to 0.54 μm with a CV=6.2%.

Example 26

Solution 1 (monomer phase): A 500 mL Duran flask was charged with 27.0 g of hydroxymethyl acrylamide (HMAAm), 2.6 g of acrylamidopropionic acid (AAPA), 19.7 g of N,N'-((ethane-1,2-diylbis(oxy))bis(ethane-2,1-diyl))diacrylamide (EGBEAAm), and 49.3 g of $H_2O$. The mixture was shaken until all had dissolved.

Solution 2 (stabilizer), solution 3 (emulsion): As in Example 25.

Redispersion and analysis: The crude product was divided into 2×250 mL centrifugation flasks and centrifuged for 25 min at 5000 rpm. The supernatants were removed and the particles were redispersed in isopropanol. The redispersed particles were then split into a total of 6×250 mL centrifuge bottles, washed 4 times with isopropanol and 5 times with $H_2O$ and before final redispersion in $H_2O$. The particles were then filtered through two different filtration mesh fabrics: Sefar Nitex 03-30/18, and Sefar Nitex 03-1/1. The product was analysed using optical microscopy and disc centrifuge. Bright field microscopy was performed by diluting the redispersed product to a concentration 0.01 wt % in 150 mM NaCl solution and image statistics was collected from 21 images yielding a mode diameter of 0.90 μm. Relative disc centrifuge diameter using CPS method 3 was determined to 0.53 μm with a CV=5.2%.

Example 27

Solution 1 (monomer phase): A 500 mL Duran flask was charged with 24.8 g of hydroxymethyl acrylamide (HMAAm), 5.0 g of acrylamidopropionic acid (AAPA), 19.9 g of N,N'-((ethane-1,2-diylbis(oxy))bis(ethane-2,1-diyl))diacrylamide (EGBEAAm), and 49.7 g of $H_2O$. The mixture was shaken until all had dissolved.

Solution 2 (stabilizer): 3.8 g of 2,2'-azodi(2-methylbutyronitrile) (AMBN), 52 g of Abil WE09, 57 g of mineral oil, and 228 g of diethylhexyl carbonate (Tegosoft DEC) were added to a 1000 mL beaker and mixed with a magnetic stir bar until all had dissolved.

Solution 3 (emulsion): 284 g of solution 2 was added to solution 1 followed by mixing using an Ultraturrax for 1 min. Further emulsification was performed by sonication using an UP 200s from Hielscher Ultrasound Technology with cycle setting 0.9 and amplitude setting 40%. In the next step solution 3 and 17 g of PDMAAm seed (Example 1) were charged into a 1 L jacketed round bottom flask equipped with a condenser, a mechanical stirrer, and a gas inlet and stirred overnight at 100 rpm at 25° C. Finally the flask was purged with Ar (g) for 30 min before heating to 70° C. while stirring at 62 rpm for 7 h.

Redispersion and analysis: The crude product was divided into 2×250 mL centrifugation flasks and centrifuged for 20 min at 3000 rpm and 10 min 5000 rpm. The supernatants were removed and the particles were redispersed in isopropanol. The redispersed particles were then split into a total of 6×250 mL centrifuge bottles, washed 4 times with isopropanol and 6 times with $H_2O$ and before final redispersion in $H_2O$. The particles were then filtered through two different filtration mesh fabrics: Sefar Nitex 03-30/18, and Sefar Nitex 03-1/1. The product was analysed using optical microscopy and disc centrifuge. Bright field microscopy was performed by diluting the redispersed product to a concentration of 0.01 wt % in 150 mM NaCl solution and image statistics was collected from 30 images yielding a mode diameter of 1.0 μm. Relative disc centrifuge diameter using CPS method 3 was determined to 0.57 μm with a CV=6.3%.

Magnetisation of Polymer Particles

Example 28

Magnetization: A 3-necked, 50 mL round bottom flask equipped with a mechanical stirrer was charged with 9.8 g of particle suspension in $H_2O$ (Example 3, 3.1% dry content) and purged with Ar (g) for 20 min before addition of 0.18 g of $FeCl_2 \times 4H_2O$, and 0.20 g of $FeCl_3 \times 6H_2O$. The mixture was stirred for 10 min at 250 rpm and 1.24 g of $NH_3$ (25%) was added and the reaction allowed to proceed for 1 h under Ar (g).

Work-up and analysis: The batch added into a 250 mL centrifugation flask and washed 12 times with $H_2O$. A 1 mL sample of the batch was added to a 2 mL Eppendorf tube and placed on a DynaMag™-2 Magnet and within 1 min the sample had completely migrated towards the magnet.

Example 29

Magnetization: A 3-necked, 50 mL round bottom flask equipped with a mechanical stirrer was charged with 7.5 g of particle suspension in $H_2O$ (Example 4, 4.0% dry content) and 2.4 mL of $H_2O$ and purged with Ar (g) for 20 min before addition of 0.18 g of $FeCl_2 \times 4H_2O$, and 0.20 g of $FeCl_3 \times 6H_2O$. The mixture was stirred for 10 min at 250 rpm and 1.24 g of $NH_3$ (25%) was added and the reaction allowed to proceed for 1 h under Ar (g).

Work-up and analysis: The batch added into a 250 mL centrifugation flask and washed 12 times with $H_2O$. A 1 mL sample of the batch was added to a 2 mL Eppendorf tube and placed on a DynaMag™-2 Magnet and within 1 min the sample had completely migrated towards the magnet.

Example 30

Magnetization: A 3-necked, 50 mL round bottom flask equipped with a mechanical stirrer was charged with 6.0 g of particle suspension in $H_2O$ (Example 5, 5.0% dry content) and 3.8 mL of $H_2O$ and purged with Ar (g) for 20 min before addition of 0.18 g of $FeCl_2 \times 4H_2O$, and 0.20 g of $FeCl_3 \times 6H_2O$. The mixture was stirred for 10 min at 250 rpm and 1.24 g of $NH_3$ (25%) was added and the reaction allowed to proceed for 1 h under Ar (g).

Work-up and analysis: The batch added into a 250 mL centrifugation flask and washed 12 times with $H_2O$. A 1 mL sample of the batch was added to a 2 mL Eppendorf tube and placed on a DynaMag™-2 Magnet and within 1 min the sample had completely migrated towards the magnet.

Example 31

Magnetization: A 3-necked, 50 mL round bottom flask equipped with a mechanical stirrer was charged with 9.7 g of particle suspension in $H_2O$ (Example 6, 3.1% dry content), 0.18 g of $FeCl_2 \times 4H_2O$, and 0.20 g of $FeCl_3 \times 6H_2O$. The mixture was stirred for 5 min at 250 rpm followed by an Ar (g) purge for 25 min. Finally, 1.24 mL of $NH_3$ (25%) was added and the reaction allowed to proceed for 1 h under Ar (g).

Work-up and analysis: The batch added into a 250 mL centrifugation flask and washed 7 times with $H_2O$. A 1.5 mL sample of the batch was added to a 1.5 mL Eppendorf tube and placed on a DynaMag™-2 Magnet and within 1 min the sample had completely migrated towards the magnet.

Example 32

Magnetization: A 3-necked, 50 mL round bottom flask equipped with a mechanical stirrer was charged with 9.5 g of particle suspension in $H_2O$ (Example 7, 3.1% dry content), 0.18 g of $FeCl_2 \times 4H_2O$, and 0.20 g of $FeCl_3 \times 6H_2O$. The mixture was stirred for 5 min at 250 rpm followed by an Ar (g) purge for 25 min. Finally, 1.24 mL of $NH_3$ (25%) was added and the reaction allowed to proceed for 1 h under Ar (g).

Work-up and analysis: The batch added into a 250 mL centrifugation flask and washed 7 times with $H_2O$. A 1.5 mL sample of the batch was added to a 1.5 mL Eppendorf tube and placed on a DynaMag™-2 Magnet and within 1 min the sample had completely migrated towards the magnet.

Example 33

Magnetization: A 3-necked, 50 mL round bottom flask equipped with a mechanical stirrer was charged with 9.1 g of particle suspension in $H_2O$ (Example 8, 3.1% dry content), 0.18 g of $FeCl_2 \times 4H_2O$, and 0.20 g of $FeCl_3 \times 6H_2O$. The mixture was stirred for 5 min at 250 rpm followed by an Ar (g) purge for 25 min. Finally, 1.24 mL of $NH_3$ (25%) was added and the reaction allowed to proceed for 1 h under Ar (g).

Work-up and analysis: The batch added into a 250 mL centrifugation flask and washed 7 times with $H_2O$. A 1.5 mL sample of the batch was added to a 1.5 mL Eppendorf tube and placed on a DynaMag™-2 Magnet and within 1 min the sample had completely migrated towards the magnet.

Example 34

Magnetization: A 3-necked, 250 mL round bottom flask equipped with a mechanical stirrer was charged with 72 g of particle suspension in $H_2O$ (Example 25, 5.6% dry content), 2.4 g of $FeCl_2 \times 4H_2O$, and 2.7 g of $FeCl_3 \times 6H_2O$. The mixture was stirred for 10 min at 150 rpm followed by an Ar (g) purge for 30 min. Finally, the stir speed with set to 250 rpm and 15 g of $NH_3$ (25%) was added and the reaction allowed to proceed for 1 h under Ar (g).

Work-up and analysis: The batch was split into 2×250 mL centrifugation flasks and washed 15 times with $H_2O$. Fe content in dry particles were determined to 190 mg/g, magnetic susceptibility was $64 \cdot 10^{-5}$ $m^3/kg$ and the saturation magnetization at 10000 Oe was 16.0 $Am^2/kg$.

Example 35

Magnetization: A 3-necked, 250 mL round bottom flask equipped with a mechanical stirrer was charged with 72 g of particle suspension in $H_2O$ (Example 25, 5.6% dry content), 4.8 g of $FeCl_2 \times 4H_2O$, and 5.4 g of $FeCl_3 \times 6H_2O$. The mixture was stirred for 10 min at 150 rpm followed by an Ar (g) purge for 30 min. Finally, the stir speed with set to 250 rpm and 30 g of $NH_3$ (25%) was added and the reaction allowed to proceed for 1 h under Ar (g).

Work-up and analysis: The batch was split into 2×250 mL centrifugation flasks and washed 30 times with $H_2O$. Fe content in dry particles were determined to 255 mg/g and magnetic susceptibility was $72 \cdot 10^{-5}$ $m^3/kg$ and the saturation magnetization at 10000 Oe was 21.5 $Am^2/kg$.

Example 36

Magnetization: A 3-necked, 250 mL round bottom flask equipped with a mechanical stirrer was charged with 72 g of particle suspension in $H_2O$ (Example 25, 5.6% dry content), 7.3 g of $FeCl_2 \times 4H_2O$, and 8.2 g of $FeCl_3 \times 6H_2O$. The mixture was stirred for 10 min at 150 rpm followed by an Ar (g) purge for 30 min. Finally, the stir speed with set to 250 rpm and 45 g of $NH_3$ (25%) was added and the reaction allowed to proceed for 1 h under Ar (g).

Work-up and analysis: The batch was split into 2×250 mL centrifugation flasks and washed 45 times with $H_2O$. Fe content in dry particles were determined to 336 mg/g and magnetic susceptibility was $81 \cdot 10^{-5}$ $m^3/kg$ and the saturation magnetization at 10000 Oe was 30.5 $Am^2/kg$.

Example 37

Magnetization: A 3-necked, 250 mL round bottom flask equipped with a mechanical stirrer was charged with 71 g of particle suspension in $H_2O$ (Example 26, 5.6% dry content), 7.3 g of $FeCl_2 \times 4H_2O$, and 8.2 g of $FeCl_3 \times 6H_2O$. The mixture was stirred for 10 min at 150 rpm followed by an Ar (g) purge for 30 min. Finally, the stir speed with set to 250 rpm and 45 g of $NH_3$ (25%) was added and the reaction allowed to proceed for 1 h under Ar (g).

Work-up and analysis: The batch was split into 2×250 mL centrifugation flasks and washed 65 times in total (5 times with $H_2O$, followed by 1 time in 1 M acetic acid, and 59 times with $H_2O$.) Fe content in dry particles was determined to 248 mg/g, magnetic susceptibility was $62 \cdot 10^{-5}$ $m^3/kg$ and the saturation magnetization at 10000 Oe was 20.6 $Am^2/kg$.

Example 38

Magnetization: A 3-necked, 100 mL round bottom flask equipped with a mechanical stirrer was charged with 39 g of particle suspension in $H_2O$ (Example 27, 5.1% dry content), 3.7 g of $FeCl_2 \times 4H_2O$, and 4.1 g of $FeCl_3 \times 6H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was split into 2×250 mL centrifugation flasks and washed 65 times (5 times with $H_2O$, followed by 1 time in 1 M acetic acid, and 59 times with $H_2O$.). The magnetic susceptibility was $72 \cdot 10^{-5}$ $m^3/kg$ and the saturation magnetization at 10000 Oe was 24.7 $Am^2/kg$.

Example 39

Magnetization: A 3-necked, 250 mL round bottom flask equipped with a mechanical stirrer was charged with 35 g of particle suspension in $H_2O$ (Example 19, 1.7% dry content), 33 g $H_2O$, 3.7 g of $FeCl_2 \times 4H_2O$, and 4.1 g of $FeCl_3 \times 6H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 9 times with $H_2O$, two times with 0.01 M citric acid buffer (pH 5.3), and additionally 28 times with $H_2O$. Fe content in dry particles was determined to 478 mg/g, magnetic susceptibility was $72 \cdot 10^{-5}$ $m^3/kg$ and the saturation magnetization at 10000 Oe was 37.8 $Am^2/kg$.

Example 40

Magnetization: A 3-necked, 100 mL round bottom flask equipped with a mechanical stirrer was charged with 42 g of particle suspension in $H_2O$ (Example 20, 1.8% dry content), 1.5 g $H_2O$, 2.3 g of $FeCl_2 \times 4H_2O$, and 2.6 g of $FeCl_3 \times 6H_2O$. The mixture was stirred for 10 min at 150 rpm followed by an Ar (g) purge for 30 min. Finally, the stir speed with set to 250 rpm and 14 g of $NH_3$ (25%) was added and the reaction allowed to proceed for 1 h under Ar (g).

Work-up and analysis: The batch was transferred to a 250 mL centrifugation flask and washed 9 times with $H_2O$, two times with 0.01 M citric acid buffer (pH 5.3), and additionally 27 times with $H_2O$. Fe content in dry particles was determined to 363 mg/g, magnetic susceptibility was $67 \cdot 10^{-5}$ $m^3/kg$ and the saturation magnetization at 10000 Oe was 31.0 $Am^2/kg$.

Example 41

Magnetization: A 3-necked, 250 mL round bottom flask equipped with a mechanical stirrer was charged with 58 g of particle suspension in $H_2O$ (Example 23, 4.1% dry content), 9.4 g $H_2O$, 3.7 g of $FeCl_2 \times 4H_2O$, and 4.1 g of $FeCl_3 \times 6H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 9 times with $H_2O$, two times with 0.01 M citric acid buffer (pH 5.3), and additionally 27 times with $H_2O$. Fe content in dry particles was determined to 233 mg/g, magnetic susceptibility was $53 \cdot 10^{-5}$ $m^3/kg$ and the saturation magnetization at 10000 Oe was 20.2 $Am^2/kg$.

Example 42

Magnetization: A 3-necked, 250 mL round bottom flask equipped with a mechanical stirrer was charged with 68 g of particle suspension in $H_2O$ (Example 21, 3.5% dry content), 3.7 g of $FeCl_2 \times 4H_2O$, and 4.1 g of $FeCl_3 \times 6H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 9 times with $H_2O$, two times with 0.01 M citric acid buffer (pH 5.3), and additionally 38 times with $H_2O$. Fe content in dry particles was determined to 177 mg/g, magnetic susceptibility was $42 \cdot 10^{-5}$ $m^3/kg$ and the saturation magnetization at 10000 Oe was 15.0 $Am^2/kg$.

Example 43

Magnetization: A 3-necked, 250 mL round bottom flask equipped with a mechanical stirrer was charged with 58 g of particle suspension in $H_2O$ (Example 22, 5.1% dry content), 9.0 g $H_2O$, 3.7 g of $FeCl_2 \times 4H_2O$, and 4.1 g of $FeCl_3 \times 6H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 9 times with $H_2O$, two times with 0.01 M citric acid buffer (pH 5.3), and additionally 38 times with $H_2O$. Fe content in dry particles was determined to 205 mg/g and magnetic susceptibility was $52 \cdot 10^{-5}$ $m^3/kg$ and the saturation magnetization at 10000 Oe was 16.6 $Am^2/kg$.

Example 44

Magnetization: A 3-necked, 250 mL round bottom flask equipped with a mechanical stirrer was charged with 51 g of particle suspension in $H_2O$ (Example 24, 3.5% dry content), 17 g $H_2O$, 3.7 g of $FeCl_2 \times 4H_2O$, and 4.1 g of $FeCl_3 \times 6H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 9 times with $H_2O$, two times with 0.01 M citric acid buffer (pH 5.3), and additionally 27 times with $H_2O$. Fe content in dry particles was determined to 288 mg/g, magnetic susceptibility was $68 \cdot 10^{-5}$ $m^3/kg$ and the saturation magnetization at 10000 Oe was 23.8 $Am^2/kg$.

Example 45

Magnetization: A 1 L cylindrical reactor equipped with a mechanical stirrer was charged with 252 g of particle suspension in $H_2O$ (Example 9, 5.6% dry content), 18.4 g of $FeCl_2 \times 4H_2O$, and 20.5 g of $FeCl_3 \times 6H_2O$. The mixture was stirred for 10 min at 150 rpm followed by an Ar (g) purge for 30 min. Finally, the stir speed with set to 250 rpm and 112 g of $NH_3$ (25%) was added and the reaction allowed to proceed for 1 h under Ar (g.

Work-up and analysis: The batch was split into 2×1 L centrifugation flasks and washed 33 times with $H_2O$.

Example 46

Magnetization: A 3-necked, 250 mL round bottom flask equipped with a mechanical stirrer was charged with 44 g of particle suspension in $H_2O$ (Example 10, 4.5% dry content), 31 g $H_2O$, 3.7 g of $FeCl_2 \times 4$ $H_2O$, and 4.1 g of $FeCl_3 \times 6$ $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 21 times with $H_2O$. A 1.5 mL sample of the batch was added to a 1.5 mL Eppendorf tube and placed on a DynaMag™-2 Magnet and within 1 min the sample had completely migrated towards the magnet.

Example 47

Magnetization: A 3-necked, 250 mL round bottom flask equipped with a mechanical stirrer was charged with 37 g of particle suspension in $H_2O$ (Example 11, 5.6% dry content), 39 g $H_2O$, 3.7 g of $FeCl_2 \times 4$ $H_2O$, and 4.1 g of $FeCl_3 \times 6$ $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 30 times with $H_2O$.

Example 48

Magnetization: A 3-necked, 250 mL round bottom flask equipped with a mechanical stirrer was charged with 34 g of particle suspension in $H_2O$ (Example 12, 5.6% dry content), 41 g $H_2O$, 3.7 g of $FeCl_2 \times 4$ $H_2O$, and 4.1 g of $FeCl_3 \times 6$ $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 30 times with $H_2O$. A 1.5 mL sample of the batch was added to a 1.5 mL Eppendorf tube and placed on a DynaMag™-2 Magnet and within 1 min the sample had completely migrated towards the magnet.

Example 49

Magnetization: A 3-necked, 250 mL round bottom flask equipped with a mechanical stirrer was charged with 42 g of particle suspension in $H_2O$ (Example 13, 4.7% dry content), 33 g $H_2O$, 3.7 g of $FeCl_2 \times 4$ $H_2O$, and 4.1 g of $FeCl_3 \times 6$ $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 34 times with $H_2O$. A 1.5 mL sample of the batch was added to a 1.5 mL Eppendorf tube and placed on a DynaMag™-2 Magnet and within 1 min the sample had completely migrated towards the magnet.

Example 50

Magnetization: A 3-necked, 250 mL round bottom flask equipped with a mechanical stirrer was charged with 44 g of particle suspension in $H_2O$ (Example 14, 4.5% dry content), 31 g $H_2O$, 3.7 g of $FeCl_2 \times 4$ $H_2O$, and 4.1 g of $FeCl_3 \times 6$ $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 40 times with $H_2O$. A 1.5 mL sample of the batch was added to a 1.5 mL Eppendorf tube and placed on a DynaMag™-2 Magnet and within 1 min the sample had completely migrated towards the magnet.

Example 51

Magnetization: A 3-necked, 250 mL round bottom flask equipped with a mechanical stirrer was charged with 44 g of particle suspension in $H_2O$ (Example 15, 4.5% dry content), 31 g $H_2O$, 3.7 g of $FeCl_2 \times 4$ $H_2O$, and 4.1 g of $FeCl_3 \times 6$ $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 40 times with $H_2O$. A 1.5 mL sample of the batch was added to a 1.5 mL Eppendorf tube and placed on a DynaMag™-2 Magnet and within 1 min the sample had completely migrated towards the magnet.

Example 52

Magnetization: A 3-necked, 250 mL round bottom flask equipped with a mechanical stirrer was charged with 35 g of particle suspension in $H_2O$ (Example 16, 5.65% dry content), 40 g $H_2O$, 3.7 g of $FeCl_2$×4 $H_2O$, and 4.1 g of $FeCl_3$×6 $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 27 times with $H_2O$. A 1.5 mL sample of the batch was added to a 1.5 mL Eppendorf tube and placed on a DynaMag™-2 Magnet and within 1 min the sample had completely migrated towards the magnet.

Example 53

Magnetization: A 3-necked, 250 mL round bottom flask equipped with a mechanical stirrer was charged with 45 g of particle suspension in $H_2O$ (Example 17, 4.47% dry content), 30 g $H_2O$, 3.7 g of $FeCl_2$×4 $H_2O$, and 4.1 g of $FeCl_3$×6 $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 27 times with $H_2O$. A 1.5 mL sample of the batch was added to a 1.5 mL Eppendorf tube and placed on a DynaMag™-2 Magnet and within 1 min the sample had completely migrated towards the magnet.

Example 54

Magnetization: A 3-necked, 250 mL round bottom flask equipped with a mechanical stirrer was charged with 49 g of particle suspension in $H_2O$ (Example 18, 4.12% dry content), 26 g $H_2O$, 3.7 g of $FeCl_2$×4 $H_2O$, and 4.1 g of $FeCl_3$×6 $H_2O$. The mixture was stirred for 10 min at 150 rpm followed by an Ar (g) purge for 30 min. Finally, the stir speed with set to 250 rpm and 22 g of $NH_3$ (25%) was added and the reaction allowed to proceed for 1 h under Ar (g).

Work-up and analysis: The batch was transferred to a 250 mL centrifugation flask and washed 27 times with $H_2O$. A 1.5 mL sample of the batch was added to a 1.5 mL Eppendorf tube and placed on a DynaMag™-2 Magnet and within 1 min the sample had completely migrated towards the magnet.

Epoxy Coating Polymer Particles

Example 55—Tosyl Activation of Polyacrylamide Particles

To a 13 w % solution of particles of Example 9 in acetone (46.7 mL), 0.7 g of pyridine and 1.4 g of p-toluenesulfonyl chloride were added under stirring. The reaction was then further stirred over night at room temperature. Upon completion, the supernatant was removed and work-up was performed by washing with 4×250 mL of acetone.

Example 56—Amination of Tosylated Polyacrylamide Particles 5 g of tosylated particles of Example 55 in acetone had the solvent removed and were subsequently re-suspended in a total of 75 g of 2,2'-(ethylenedioxy)bis(ethylamine) (EDEA). The mixture was stirred for 4 h at 72° C. The reaction product was washed with 3×300 mL $H_2O$, 3×300 mL 10 mM acetic acid (aq), 3×300 mL $H_2O$ and finally 4×300 mL N-methylpyrrolidinone.

Example 57—Epoxy Coating of Aminated Polyacrylamide Particles 4.1 g of aminated particles of Example 56 in 265.5 g of NMP had 235 g of the solvent removed and to the remainder 8.5 g of 1,4-butanediol diglycidyl ether, 3.3 g of glycidol and 6.1 g of glycidyl methacrylate were added under stirring. After 5 minutes, the temperature was increased to 87° C. and the mixture stirred for 20 h. Afterwards, the reaction product was allowed to cool for 30 minutes and then washed with 200 mL acetone, 2×200 mL methanol, 2×200 mL 30:70 methanol:isopropanol and 4×200 mL isopropanol.

Example 58—Acrylic Acid Grafting onto Polyacrylamide Particles 52 mg of 2,2'-Azobis(2-methylpropionitrile) (AIBN) was dissolved in 20 g of isopropanol by stirring and this was added to 4.3 g of particles of Example 57 in 47 g of isopropanol. 1.1 mL of acrylic acid was introduced and the mixture heated to 72° C. while stirring and after reaching the desired temperature the reaction was continued for 20 h. Subsequently, it was allowed to cool for 20 min and washed with 2×300 mL isopropanol and 3×200 mL methanol.

Example 59—One Step Epoxy Coating of Polyacrylamide Particles

To a 10 wt % solution of particles of Example 35 in acetonitrile (1.42 mL), 0.12 g of 1,4-butanediol diglycidyl ether, 0.05 g of glycidol and 0.09 g of glycidyl methacrylate were added. After this, 0.03 g of lutidine and 0.05 g of p-toluenesulfonic acid monohydrate were also added and the reaction was shaken at 70° C. for 19 h. After cooling, the reaction was worked-up by washing with 4×5 mL of acetone.

Silica Coating Polymer Particles

Example 60

A 3-necked 50 mL round bottom flask equipped with a mechanical stirrer was charged with 1.5 g of $Na_2SiO_3$ and 10 mL of $H_2O$. The pH of the solution was adjusted with 1 M HCl to pH 12-13 before addition of 7.8 g of particles of Example 35 (dry content 6.4 wt %). The mixture was stirred for 10 min at 200 rpm before the flask was lowered into an oil bath preheated to 60° C. The pH was then adjusted to pH 6 using dropwise addition of 1 M HCl. The mixture was then allowed to stir for 15 min before the reaction mixture was transferred to a 100 mL Duran flask and 5 magnetic shifts in $H_2O$ were performed. The coating of $SiO_2$ was confirmed by the appearance of a peak at 1094 $cm^{-1}$ in FTIR spectroscopy performed on dried samples.

Example 61

A 3-necked 50 mL round bottom flask equipped with a mechanical stirrer was charged with 0.5 g of $Na_2SiO_3$ and 10 mL of $H_2O$. The pH of the solution was adjusted with 1 M HCl to pH 12-13 before addition of 7.8 g of particles of Example 35 (dry content 6.4 wt %). The mixture was stirred for 5 min at 200 rpm before the flask was lowered into an oil bath preheated to 60° C. The pH was then adjusted to pH 2.5 using dropwise addition of 1 M HCl. The mixture was then allowed to stir for 5 min before the reaction mixture was transferred to a 250 mL Duran flask and 7 magnetic shifts in $H_2O$ were performed. The coating of $SiO_2$ was confirmed by the appearance of a peak at 1094 $cm^{-1}$ in FTIR spectroscopy performed on dried samples.

Example 62

A 3-necked 50 mL round bottom flask equipped with a mechanical stirrer was charged with 0.5 g of $Na_2SiO_3$ and 10 mL of $H_2O$. The pH of the solution was adjusted with 1 M HCl to pH 12-13 before addition of 8.9 g of particles of Example 26 (dry content 5.6 wt %). The mixture was stirred for 5 min at 200 rpm before the flask was lowered into an oil bath preheated to 60° C. The pH was then adjusted to pH 2.5 using dropwise addition of 1 M HCl. The mixture was then allowed to stir for 5 min before the reaction mixture was transferred to a 250 mL centrifugation flask and 5 centrifugation shifts in $H_2O$ were performed. The coating of $SiO_2$ was confirmed by the appearance of a peak at 1094 $cm^{-1}$ in FTIR spectroscopy performed on dried samples.

Example 63—Silane Route

A 20 mL screw top vial was charged with 7.8 g of particles of Example 35 (dry content 6.4 wt %) and 3 magnetic shifts with methanol and 5 magnetic shifts in dipropylene glycol dimethyl ether. The suspension was then transferred to a 50 mL 3-necked round bottom flask equipped with a mechanical stirrer followed by addition of 4.7 g of tetraethyl orthosilicate and 80 μL of $H_2O$. The reaction was then heated to 130° C. in and stirred overnight. Subsequently the reaction mixture was transferred to a 20 mL screw top vial and 5 magnetic shifts in dipropylene glycol dimethyl ether and 5 magnetic shifts in $H_2O$ was performed. Finally the particle suspension was agitated for 3 days. The coating of $SiO_2$ was confirmed by the appearance of a peak at 1094 $cm^{-1}$ in FTIR spectroscopy performed on dried samples.

Antibody Coupling and Functional Assays

Example 64

Anti-Tnl mAb was coupled to particles of Examples 34, 35 and 36 according to the following procedure. A 2 mL Sarstedt tube was charged with 5 mg beads (500 μl of 1% stock solution). The tube was placed on a magnet and the supernatant was removed and 1 mL 15 mM MES buffer (pH 6.0) was added. The MES buffer washing step was repeated 3 times before resuspension in 205 μL of MES buffer. Subsequently, 45 μL of EDC (20 mg/mL in $H_2O$) was added and the tube was vortexed followed by 30 min incubation on roller at room temperature. The tube was placed on a magnet, the supernatant removed followed by resuspension in 200 μL of MES buffer. 52 μL of Anti-Tnl mAb SDIX (3.8 mg/mL) was added to the tube and the tube was vortexed followed by incubation on a roller for 2 h at room temperature. The particles are then washed twice with 1 mL TBST buffer (50 mM Tris-HCl pH 7.4 with 140 mM NaCl, and 0.1% Tween-20) followed by resuspension in TBST buffer over-night at 37° C. on a roller. Finally the particles were washed a final time with 1 mL TBST buffer followed by resuspension in 985 μL TBST buffer to get a 5 mg/mL particle suspension.

Example 65

Anti-hGH mAb GhG2 was coupled to particles of Examples 34, 35 and 36 according to the following procedure. A 2 mL Sarstedt tube was charged with 5 mg particles (500 μl of 1% stock solution). The tube was placed on a magnet and the supernatant was removed and 1 mL 15 mM MES buffer (pH 6.0) was added. The MES buffer washing step was repeated 3 times before resuspension in 205 μL of MES buffer. Subsequently, 45 μL of EDC (20 mg/mL in $H_2O$) was added and the tube was vortexed followed by 30 min incubation on roller at room temperature. The tube was placed on a magnet, the supernatant removed followed by resuspension in 190 μL of MES buffer. 60 μL of Anti-hGH mAb GhG2 (3.5 mg/mL) was added to the tube and the tube was vortexed followed by incubation on a roller for 2 h at room temperature. The particles are then washed twice with 1 mL TBST buffer (50 mM Tris-HCl pH 7.4 with 140 mM NaCl, and 0.1% Tween-20) followed by resuspension in TBST buffer over-night at 37° C. on a roller. Finally the particles were washed a final time with 1 mL TBST buffer followed by resuspension in 985 μL TBST buffer to get a 5 mg/mL particle suspension.

Example 66

Anti-Tnl mAb was coupled to particles of Examples 34, 37 and 38 according to the following procedure. A 2 mL Sarstedt tube was charged with 5 mg particles (500 μl of 1% stock solution). The tube was placed on a magnet and the supernatant was removed and 1 mL 15 mM MES buffer (pH 6.0) was added. The MES buffer washing step was repeated 3 times before resuspension in 205 μL of MES buffer. Subsequently, 45 μL of EDC (20 mg/mL in $H_2O$) was added and the tube was vortexed followed by 30 min incubation on roller at room temperature. The tube was placed on a magnet, the supernatant removed followed by resuspension in 205 μL of MES buffer. 42.5 μL of Anti-Tnl mAb SDIX (4.7 mg/mL) was added to the tube and the tube was vortexed followed by incubation on a roller for 2 h at room temperature. The particles were then washed twice with 1 mL TBST buffer (50 mM Tris-HCl pH 7.4 with 140 mM NaCl, and 0.1% Tween-20) followed by resuspension in TBST buffer over-night at 37° C. on a roller. Finally the particles were washed a final time with 1 mL TBST buffer followed by resuspension in 985 μL TBST buffer to get a 5 mg/mL bead suspension.

Example 67

Figure 6:
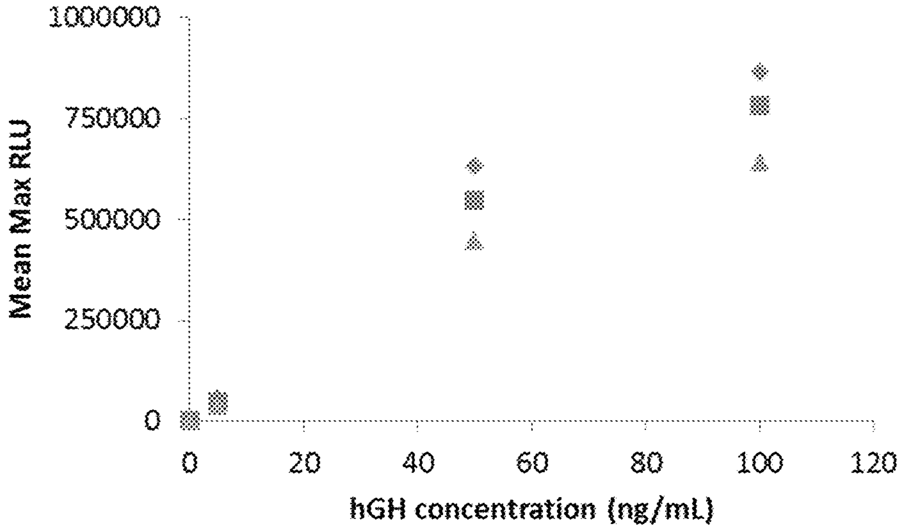
FIG. 6 illustrates the signal as a function of antigen concentration obtained in the assay of Example 67. Diamonds indicate the results for particles of Example 34, squares indicate results for particles of Example 35 and triangles indicate the results of particles of Example 36.

A 96 well microplate (Greiner-bio-one) was used for the experiment and for each batch of particles 4 different antigen concentrations (0, 5 ng/mL, 50 ng/mL, and 100 ng/mL of recombinant human growth hormone in bovine serum) were screened in triplicate. To each well 50 μL of antigen solution and 50 μL of detection antibody (mAb GhB9-AP), the plate was sealed with tape and incubated on a shaker at 37° C. for 15 min. Subsequently 100 μL of suspended particle coupled with anti-hGH mAb GhG2 prepared according to Example 65 was added, the plate sealed with tape and incubated on a shaker at 37° C. for 30 min. The microplate was placed on a magnet and the supernatant removed and the beads were washed with 3×200 μL TBST buffer before final resuspension in 20 μL of TBST buffer. Finally the substrate (DynaLight Substrate w/RapidGlow) was added and the plate was read on a BioTek Synergy™ 4 plate reader. The results obtained are illustrated in FIG. 6.

Example 68

Figure 7:
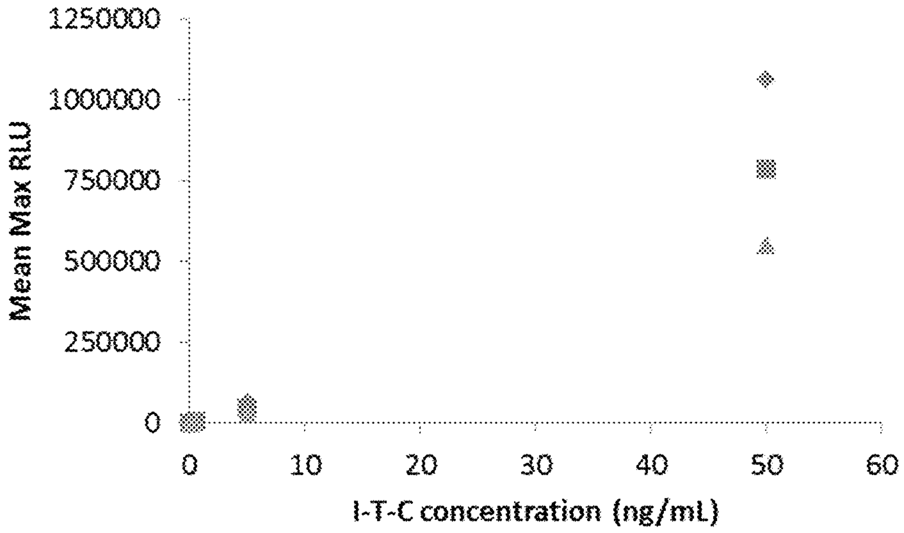
FIG. 7 illustrates the signal as a function of antigen concentration obtained in the assay of Example 68. Diamonds indicate the results using particles of Example 34, squares indicate results using particles of Example 35 and triangles indicate the results of particles of Example 36.

A 96 well microplate (Greiner-bio-one) was used for the experiment and for each batch of particles 4 different antigen concentrations (0, 0.5 ng/mL, 5 ng/mL, and 50 ng/mL of human cardiac troponin I-T-C complex in bovine serum) were screened in triplicate. To each well 50 μL of antigen solution and 50 μL of detection antibody (mAb 560), the plate was sealed with tape and incubated on a shaker at 37° C. for 10 min. Subsequently 100 μL of suspended particles coupled with Anti-Tnl mAb SDIX prepared according to Example 6564 was added, the plate sealed with tape and incubated on a shaker at 37° C. for 30 min. The microplate was placed on a magnet and the supernatant removed and the beads were washed with 3×200 μL TBST buffer before final resuspension in 20 μL of TBST buffer. Finally the substrate (DynaLight Substrate w/RapidGlow) was added and the plate was read on a BioTek Synergy™ 4 plate reader. The results obtained are illustrated in FIG. 7.

Example 69

Figure 8:
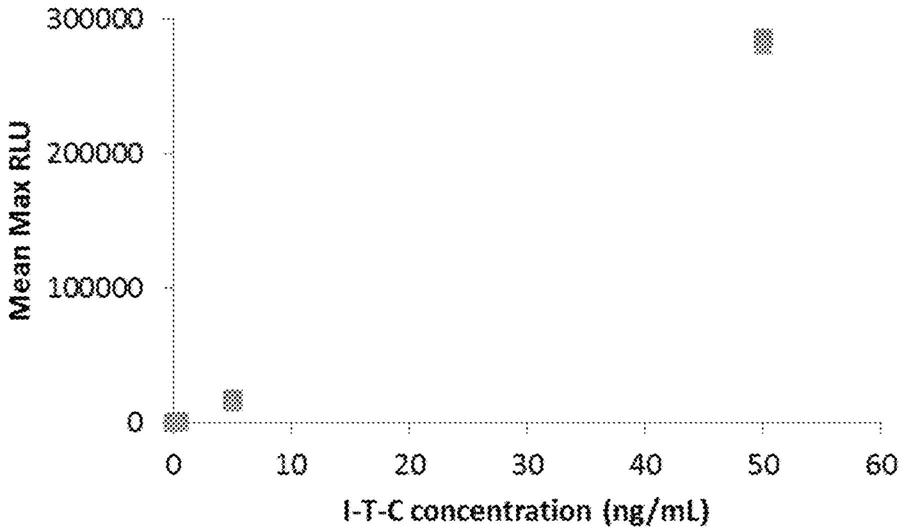
FIG. 8 illustrates the signal as a function of antigen concentration obtained in the assay of Example 69. Diamonds indicate the results using particles of Example 34, squares indicate results using particles of Example 37 and triangles indicate the results of particles of Example 38.

A 96 well microplate (Greiner-bio-one) was used for the experiment and for each batch of particles 4 different antigen concentrations (0, 0.5 ng/mL, 5 ng/mL, and 50 ng/mL of human cardiac troponin I-T-C complex in bovine serum) was screened in triplicate. To each well 50 μL of antigen solution and 50 μL of detection antibody (mAb 560), the plate was sealed with tape and incubated on a shaker at 37° C. for 10 min. Subsequently 100 μL of suspended particles of Example 6566 coupled with Anti-Tnl mAb SDIX was added, the plate sealed with tape and incubated on a shaker at 37° C. for 30 min. The microplate was placed on a magnet and the supernatant removed and the beads were washed with 3×200 μL TBST buffer before final resuspension in 20 μL of TBST buffer. Finally the substrate (DynaLight Substrate w/RapidGlow) was added and the plate was read on a BioTek Synergy™ 4 plate reader. The results obtained are illustrated in FIG. 8.

Example 70

A 96 well microplate (Greiner-bio-one) was used for the experiment in which the nonspecific binding of particles of Examples 34, 35 and 36 were evaluated and compared to a commercial Dynabeads® MyOne™ Epoxy. Initially 10 μL of bead suspension (10 mg/mL) was diluted with 990 μL of TBST buffer and to the microwells with each particle batch being evaluated in triplicate. Subsequently, 100 μL of AE conjugate (mouse IgG conjugated to Acridinium ester (AE) diluted in 30 mM MES buffer) was added, the plate sealed with tape and incubated for 30 min at 37° C. The plate was placed on a magnet and the supernatants were removed followed by 3×300 μL wash in TBST buffer. Finally, the particles were resuspended in 20 μL of TBST using a shaker followed by the addition trigger solutions 75 μL of 1.32% $H_2O_2$ and 75 μL of 0.35 N NaOH and the plate was read on a Berthold Centro LB 960 Microplate Luminometer.

Figure 9:
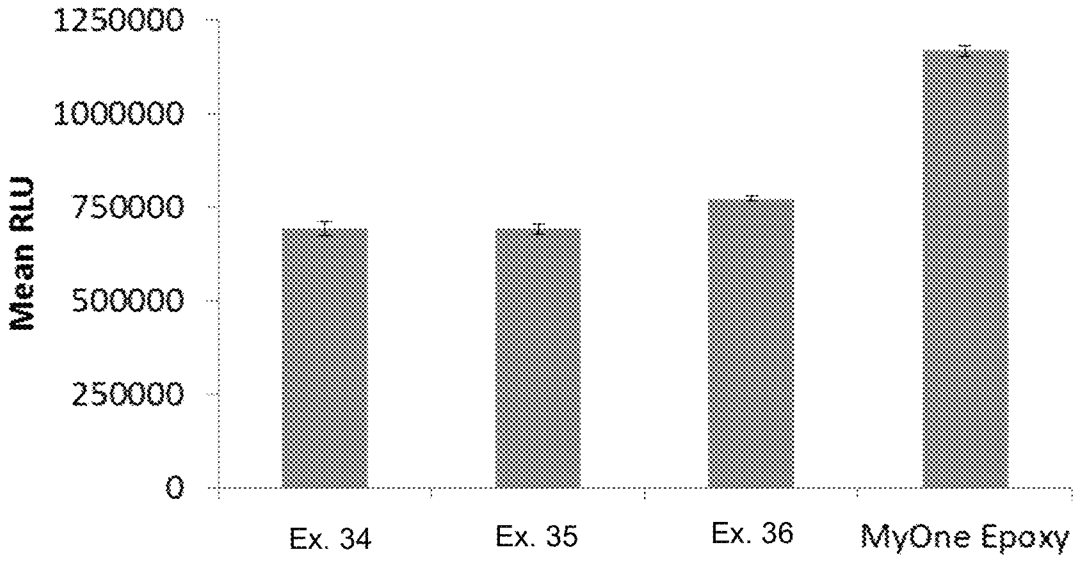
FIG. 9 illustrates the non-specific binding obtained using particles of Examples 34, 35 and 36 compare to commercial MyOne™ Epoxy particles.

The results are illustrated in FIG. 9, which shows that the particles of each of Examples 34, 35 and 36 have lower levels of non-specific binding than the MyOne™ Epoxy particles. These results, combined with the results illustrated in FIGS. 6-8, indicate that particles of the invention are useful in assays and related bead based separation applications.

Synthesis of Seed Particles

Example 71

A 2 L jacketed round-bottom flask equipped with a mechanical anchor stirrer and a condensor was charged with 34.6 g of distilled N,N-dimethylacrylamide, 27.7 g of Kraton G1650, 1.4 g of 2,2'-Azobis(2-methylpropionitrile), 747 g of heptane, 187 g of toluene, and 1.2 g of 1-octanethiol. Once everything had dissolved the reaction mixture was purged with Ar (g) for 60 min. The reaction was then heated to 71° C. using a temperature controlled water bath connected to the reactor and heated for 20 h while stirring at 350 rpm. The resulting dispersion was analyzed by dynamic light scattering yielding a z-average diameter of 382 nm.

Synthesis of Polymer Particles from Low Molecular Weight Seed Particles

Example 72

Solution 1 (monomer phase): A 250 mL Duran flask was charged with 5.0 g of N-(Hydroxymethyl)-acrylamide (HMAAm), 2.4 g of vinylimidazole (Vlm), 7.4 g of N,N'-((ethane-1,2-diylbis(oxy))bis(ethane-2,1-diyl))diacrylamide (EGBEAAm), and 34 g of $H_2O$. The mixture was shaken until all had dissolved.

Solution 2 (stabilizer): 60 g of Abil WE09, 66 g of mineral oil, 5.0 g 2,2'-Azobis(2-methylbutyronitrile) (AMBN) and 263 g of diethylhexyl carbonate (Tegosoft DEC) were added to a 500 mL beaker and mixed with a magnetic stir bar until all had dissolved.

Solution 3 (emulsion): 127 g of solution 2 was added to solution 1 followed by mixing using an Ultraturrax for 1 min. In the next step, solution 3 and 24 g of PDMAAm seed (Example 71) were charged into a 500 mL jacketed reaction vessel equipped with a condenser, a mechanical stirrer, and a gas inlet and stirred at 100 rpm at RT for 1 h followed by an Ar (g) purge for 25 min. Finally, the heating was set to 70° C. while stirring at 60 rpm for 7 h.

Redispersion: The crude product was added to a 250 mL centrifugation followed by centrifugation for 15 min at 3000 rpm. The supernatant was removed and the product was washed 3 times with isopropanol and 4 times with $H_2O$ before final redispersion in $H_2O$.

Example 73

Solution 1 (monomer phase): A 250 mL Duran flask was charged with 6.9 g of N-(Hydroxymethyl)-acrylamide (HMAAm), 0.48 g of vinylimidazole (Vlm), 7.4 g of N,N'-((ethane-1,2-diylbis(oxy))bis(ethane-2,1-diyl))diacrylamide (EGBEAAm), and 34 g of $H_2O$. The mixture was shaken until all had dissolved.

Solution 2 (stabilizer): As in Example 72.

Solution 3 (emulsion): 127 g of solution 2 was added to solution 1 followed by mixing using an Ultraturrax for 1 min. In the next step, solution 3 and 24 g of PDMAAm seed (Example 71) were charged into a 500 mL jacketed reaction vessel equipped with a condenser, a mechanical stirrer, and a gas inlet and stirred at 100 rpm at RT for 1 h followed by an Ar (g) purge for 25 min. Finally, the heating was set to 70° C. while stirring at 60 rpm for 7 h.

Redispersion: The crude product was added to a 250 mL centrifugation followed by centrifugation for 15 min at 3000 rpm. The supernatant was removed and the product was washed 3 times with isopropanol and 4 times with $H_2O$ before final redispersion in $H_2O$.

Example 74

Solution 1 (monomer phase): A 250 mL Duran flask was charged with 5.2 g of N-(Hydroxymethyl)-acrylamide (HMAAm), 1.2 g of vinylimidazole (VIm), 0.93 g og acrylic acid, 7.4 g of N,N'-((ethane-1,2-diylbis(oxy))bis(ethane-2, 1-diyl))diacrylamide (EGBEAAm), and 34 g of $H_2O$. The mixture was shaken until all had dissolved.

Solution 2 (stabilizer): As in Example 72.

Solution 3 (emulsion): 127 g of solution 2 was added to solution 1 followed by mixing using an Ultraturrax for 1 min. In the next step, solution 3 and 24 g of PDMAAm seed (Example 71) were charged into a 500 mL jacketed reaction vessel equipped with a condenser, a mechanical stirrer, and a gas inlet and stirred at 100 rpm at RT for 1 h followed by an Ar (g) purge for 25 min. Finally, the heating was set to 70° C. while stirring at 60 rpm for 7 h.

Redispersion: The crude product was added to a 250 mL centrifugation followed by centrifugation for 15 min at 3000 rpm. The supernatant was removed and the product was washed 3 times with isopropanol and 4 times with $H_2O$ before final redispersion in $H_2O$.

Example 75

Solution 1 (monomer phase): A 250 mL Duran flask was charged with 2.875 g acrylic acid (AA), 8.651 g of N-acryloylmorpholine, 3.820 g DHEBA and 61.19 g of $H_2O$. The mixture was shaken at 61° C. until all had dissolved.

Solution 2 (stabilizer): 96.62 g of Abil WE09, 105.09 g of mineral oil, 420.32 g of diethylhexyl carbonate (Tegosoft DEC), and 7.938 g AMBN were added to a 1 L beaker and mixed with a magnetic stir bar until all had dissolved.

Solution 3 (emulsion): 198.20 g of solution 2 was added to solution 1 followed by mixing using an Ultraturrax for 1 min. In the next step solution 3 and 36.70 g of PDMAAm seed (Example 71) were charged into a 300 mL reactor equipped with a condenser, a mechanical stirrer, and a gas inlet and stirred at 100 rpm room temperature for 1 h 15 min. Finally the flask was purged with Ar (g) for 30 min before heating to 70° C. while stirring at 50 rpm for 7 h.

Redispersion: The crude product was added to a 1 L centrifugation flask and centrifuged for 40 min at 5000 rpm. The supernatant was removed and the product was washed additionally 3 times isopropanol and 3 times with $H_2O$ before final redispersion in $H_2O$.

Magnetisation of Polymer Particles

Example 76

Magnetization: A 3-necked, 250 mL round bottom flask equipped with a mechanical stirrer was charged with 89 g of particle suspension in $H_2O$ (Example 72, 3.4% dry content), 26 g $H_2O$, 7.3 g of $FeCl_2{\times}4H_2O$, and 8.2 g of $FeCl_3{\times}6H_2O$. The mixture was stirred for 1 h at 100 rpm followed by an Ar (g) purge for 45 min. Finally, the stir speed with set to 320 rpm and 45 g of $NH_3$ (25%) was added and the reaction allowed to proceed for 1 h under Ar (g).

Work-up and analysis: The batch was transferred to a 1 L centrifugation flask and washed 35 times with $H_2O$. Fe content in dry particles was determined to 412 mg/g, magnetic susceptibility was $72{\cdot}10^{-5}$ $m^3/kg$ and the saturation magnetization at 10000 Oe was 33 $Am^2/kg$.

Example 77

Magnetization: A 3-necked, 250 mL round bottom flask equipped with a mechanical stirrer was charged with 72 g of particle suspension in $H_2O$ (Example 73, 4.2% dry content), 43 g $H_2O$, 7.3 g of $FeCl_2{\times}4H_2O$, and 8.2 g of $FeCl_3{\times}6H_2O$. The mixture was stirred for 1 h at 100 rpm followed by an Ar (g) purge for 45 min. Finally, the stir speed with set to 320 rpm and 45 g of $NH_3$ (25%) was added and the reaction allowed to proceed for 1 h under Ar (g).

Work-up and analysis: The batch was transferred to a 1 L centrifugation flask and washed 35 times with $H_2O$. Fe content in dry particles was determined to 404 mg/g, magnetic susceptibility was $76{\cdot}10^{-5}$ $m^3/kg$ and the saturation magnetization at 10000 Oe was 33 $Am^2/kg$.

Example 78

Magnetization: A 3-necked, 250 mL round bottom flask equipped with a mechanical stirrer was charged with 91 g of particle suspension in $H_2O$ (Example 74, 3.3% dry content), 24 g $H_2O$, 7.3 g of $FeCl_2{\times}4H_2O$, and 8.2 g of $FeCl_3{\times}6H_2O$. The mixture was stirred for 1 h at 100 rpm followed by an Ar (g) purge for 45 min. Finally, the stir speed with set to 320 rpm and 45 g of $NH_3$ (25%) was added and the reaction allowed to proceed for 1 h under Ar (g).

Work-up and analysis: The batch was transferred to a 1 L centrifugation flask and washed 35 times with $H_2O$. Fe content in dry particles was determined to 399 mg/g, magnetic susceptibility was $70{\cdot}10^{-5}$ $m^3/kg$ and the saturation magnetization at 10000 Oe was 31 $Am^2/kg$.

Example 79

Magnetization: A 3-necked, 100 mL round bottom flask equipped with a mechanical stirrer was charged with 36.10 g of particle suspension in $H_2O$ (Example 75, 2.81% dry content), 33.02 g $H_2O$, 2.478 g of $FeCl_2{\times}4H_2O$, and 2.791 g of $FeCl_3{\times}6H_2O$. The mixture was stirred for 50 min at 100 rpm followed by an Ar (g) purge for 40 min. Finally, the stir speed with set to 300 rpm and 15.18 g of $NH_3$ (25%) was added and the reaction allowed to proceed for 1 h 20 min under Ar (g).

Work-up and analysis: The batch was transferred to a 1 L centrifugation flask and washed 30 times with $H_2O$.

Further Embodiments

The disclosure also includes the embodiments set out in the following numbered clauses:

1. Monodisperse coated hydrogel polymer particles comprising a polymer formed from (a) a hydrophilic vinylic monomer having a log $P_{oct/wat}$ (log P) of less than about 0.6, wherein the hydrophilic vinylic monomer comprises at least one hydrophilic vinylic monomer selected from a monomer comprising —C(O)$NH_2$, —C(O)$NHCH_3$, —C(O)$NHCH_2CH_3$, or —C(O)N$(CH_3)_2$; and (b) a crosslinker comprising at least two vinyl groups; and a coating; wherein the crosslinker comprises at least one compound of formula (IIa):

(IIa)

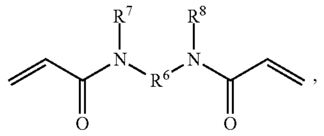

wherein $R^6$ is selected from —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, or polyether comprising 2 to 100 $C_2$-$C_3$ ether units, and $R^7$ and $R^8$ are each independently selected from —H, —$C_1$-$C_6$ alkyl, —$C_1$-$C_6$ heteroalkyl, —$C_3$-$C_6$ cycloalkyl, —$C_1$-$C_6$ hydroxyalkyl, or —$C_1$-$C_6$ ether; or $R^7$ and $R^8$ are joined together to form —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, polyether comprising 2 to 100 $C_2$-$C_3$ ether units.

2. The polymer particles of clause 1, wherein $R^6$ is selected from —$C_1$-$C_6$ alkyl-, —$C_1$-$C_6$ heteroalkyl-, —$C_1$-$C_6$ cycloalkyl-, —$C_1$-$C_6$ ether-, or polyether comprising 2 to 100 $C_2$-$C_3$ ether units, and $R^7$ and $R^8$ are each independently selected from —H, —$C_1$-$C_6$ alkyl, —$C_1$-$C_6$ heteroalkyl, —$C_3$-$C_6$ cycloalkyl, —$C_1$-$C_6$ hydroxyalkyl, or —$C_1$-$C_6$ ether; or $R^7$ and $R^8$ are joined together to form —$C_1$-$C_6$ alkyl-, —$C_1$-$C_6$ heteroalkyl-, —$C_1$-$C_6$ cycloalkyl-, —$C_1$-$C_6$ ether-, polyether comprising 2 to 100 $C_2$-$C_3$ ether units.

3. The polymer particles of clause 1, wherein $R^6$ is $(CH_2)_r(OCH_2CH_2)_nO(CH_2)s$, wherein r and s are each independently 2 or 3, and n is an integer from 1 to 100.

4. The polymer particles of clause 1, wherein the polymer particles have an average diameter of from 0.5 μm to 10 μm, and/or wherein the coefficient of variation (CV) is less than 20%

5. The polymer particles of clause 1, wherein the hydrophilic vinylic monomer is selected from or comprises acrylamide, methacrylamide, hydroxymethyl acrylamide, [tris(hydroxymethyl)methyl]acrylamide, (3-aminopropyl)methacrylamide, and 2-hydroxyethyl methacrylamide.

6. The polymer particles of clause 1, wherein the hydrophilic vinylic monomer comprises a monomer having an $R_{atom}$ according to the following formula:

$$R_{atom} = \frac{N_C}{N_N + N_O}$$

wherein $N_C$ is the number of carbon atoms, $N_N$ the number of nitrogen atoms, and $N_O$ the number of oxygen atoms in said hydrophilic vinylic monomer;

wherein $R_{atom}$<2.75, when said hydrophilic vinylic monomer is an acrylamide.

7. The polymer particles of clause 1, wherein the crosslinker is or comprises N,N'-(1,2-dihydroxyethylene) bisacrylamide, N,N'-methylenebis(acrylamide), N,N'-ethylenebis(acrylamide), piperazine diacrylamide, N,N'-((ethane-1,2-diylbis(oxy))bis(ethane-2,1-diyl)) diacrylamide, polyethyleneglycol diacrylamide with a molecular weight ≤2000, 4-Arm PEG-Acrylamide with a molecular weight ≤2000, and/or N,N-bis(2-acrylamidoethyl)acrylamide, 1,2-dihydroxy bis-acrylamide, N,N'-((ethane-1,2-diylbis(oxy))bis(ethane-2,1-diyl)) diacrylamide, polyethyleneglycol diacrylamide with a molecular weight MW≤2000 and 4-Arm PEG-Acrylamide with a molecular weight MW≤2000, or N,N'-((ethane-1,2-diylbis(oxy))bis(ethane-2,1-diyl))diacrylamide.

8. The polymer particles of clause 1, wherein the crosslinker has a log P value of less than about 1.

9. The polymer particles of clause 1, wherein the coating is or comprises an organic coating or a silica coating.

10. The polymer particles of clause 9, wherein the coating comprises an organic coating formed from at least one epoxide monomer.

11. The polymer particles of clause 9, wherein the coating comprises silica.

12. The polymer particles of clause 1, wherein the polymer comprises pores.

13. The polymer particles of clause 12, wherein the pores provide a polymer with a level of porosity of 40% to 95%.

14. A method of forming coated monodisperse hydrogel polymer particles, comprising:

forming a suspension comprising the monodisperse hydrogel polymer particles and at least one epoxide or silicates or orthosilicates; and reacting an epoxy group of the at least one epoxide with a surface functional group of the particles; or reacting the silicates or orthosilicates to form a silica coating;

wherein the monodisperse hydrogel polymer particles are formed from (a) a hydrophilic vinylic monomer having a log P (log P) of less than about 0.6; and (b) a crosslinker comprising at least two vinyl groups.

15. The method of clause 14, wherein the hydrophilic vinylic monomer comprises at least one hydrophilic vinylic monomer selected from a monomer comprising —$C(O)NH_2$, —$C(O)NHCH_3$, —$C(O)NHCH_2CH_3$, or —$C(O)N(CH_3)_2$; and (b) a crosslinker comprising at least two vinyl groups; and a coating; wherein the crosslinker comprises at least one compound of formula (IIa):

(IIa)

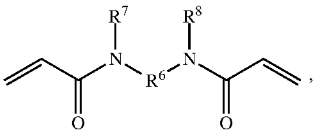

wherein $R^6$ is selected from —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, or polyether comprising 2 to 100 $C_2$-$C_3$ ether units, and $R^7$ and $R^8$ are each independently selected from —H, —$C_1$-$C_6$ alkyl, —$C_1$-$C_6$ heteroalkyl, —$C_3$-$C_6$ cycloalkyl, —$C_1$-$C_6$ hydroxyalkyl, or —$C_1$-$C_6$ ether; or $R^7$ and $R^8$ are joined together to form —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, polyether comprising 2 to 100 $C_2$-$C_3$ ether units.

16. The method of clause 14, wherein the coefficient of variation (CV) of the coated monodisperse hydrogel polymer particles formed is less than 20%.

17. The method of clause 14, wherein the surface functional group is an amine.

18. The method of clause 14, wherein reacting the silicates to form a silica coating comprises lowering the pH of the suspension to less than 11.

19. The method of clause 14, wherein reacting the orthosilicates to form a silica coating comprises raising the temperature of the suspension to in excess of 90° C.

20. A method for performing an assay, comprising contacting a solution, wherein the solution comprises an analyte, with the monodisperse hydrogel polymer particles of claim 1; and separating the particles bound to the analyte from the solution.

The invention claimed is:

1. Monodisperse coated hydrogel polymer particles comprising a polymer formed from (a) a hydrophilic vinylic monomer having a log $P_{oct/wat}$ (log P) of less than about 0.6, wherein the hydrophilic vinylic monomer comprises at least one hydrophilic vinylic monomer selected from a monomer comprising —C(O)$NH_2$, —C(O)$NHCH_3$, —C(O)$NHCH_2CH_3$, or —C(O)$N(CH_3)_2$; and (b) a crosslinker comprising at least two vinyl groups; and a coating; wherein the crosslinker comprises at least one compound of formula (IIa):

(IIa)

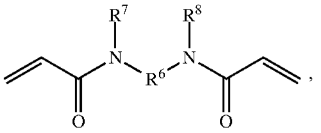

wherein $R^6$ is selected from —$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, or polyether comprising 2 to 100 $C_2$-$C_3$ ether units, and $R^7$ and $R^8$ are each independently selected from —H, —$C_1$-$C_6$ alkyl, —$C_1$-$C_6$ heteroalkyl, —$C_3$-$C_6$ cycloalkyl, —$C_1$-$C_6$ hydroxyalkyl, or —$C_1$-$C_6$ ether; or $R^7$ and $R^8$ are joined together to form-$C_1$-$C_6$ alkyl-, —$C_1$-$C_6$ heteroalkyl-, —$C_1$-$C_6$ cycloalkyl-, —$C_1$-$C_6$ hydroxyalkyl-, —$C_1$-$C_6$ ether-, polyether comprising 2 to 100 $C_2$-$C_3$ ether units; and wherein the coating comprises an organic coating formed from at least one epoxide monomer or comprises silica.

2. The polymer particles of claim 1, wherein $R^6$ is selected from —$C_1$-$C_6$ alkyl-, —$C_1$-$C_6$ heteroalkyl-, —$C_1$-$C_6$ cycloalkyl-, —$C_1$-$C_6$ ether-, or polyether comprising 2 to 100 $C_2$-$C_3$ ether units, and $R^7$ and $R^8$ are each independently selected from —H, —$C_1$-$C_6$ alkyl, —$C_1$-$C_6$ heteroalkyl, —$C_3$-$C_6$ cycloalkyl, —$C_1$-$C_6$ hydroxyalkyl, or —$C_1$-$C_6$ ether; or $R^7$ and $R^8$ are joined together to form-$C_1$-$C_6$ alkyl-, —$C_1$-$C_6$ heteroalkyl-, —$C_1$-$C_6$ cycloalkyl-, —$C_1$-$C_6$ ether-, polyether comprising 2 to 100 $C_2$-$C_3$ ether units.

3. The polymer particles of claim 1, wherein $R^6$ is $(CH_2)_r(OCH_2CH_2)_nO(CH_2)_s$, wherein r and s are each independently 2 or 3, and n is an integer from 1 to 100.

4. The polymer particles of claim 1, wherein the polymer particles have an average diameter of from 0.5 μm to 10 μm, and/or wherein the coefficient of variation (CV) is less than 20%.

5. The polymer particles of claim 1, wherein the hydrophilic vinylic monomer is selected from or comprises acrylamide, methacrylamide, hydroxymethyl acrylamide, [tris (hydroxymethyl)methyl]acrylamide, (3-aminopropyl) methacrylamide, and 2-hydroxyethyl methacrylamide.

6. The polymer particles of claim 1, wherein the hydrophilic vinylic monomer comprises a monomer having an $R_{atom}$ according to the following formula:

$$R_{atom} = \frac{N_C}{N_N + N_O}$$

wherein $N_C$ is the number of carbon atoms, NN the number of nitrogen atoms, and No the number of oxygen atoms in said hydrophilic vinylic monomer;

wherein $R_{atom}$<2.75, when said hydrophilic vinylic monomer is an acrylamide.

7. The polymer particles of claim 1, wherein the crosslinker comprises N,N'-(1,2-dihydroxyethylene)bisacrylamide, N,N'-methylenebis(acrylamide), N,N'-ethylenebis(acrylamide), piperazine diacrylamide, N,N'-((ethane-1,2-diylbis (oxy))bis(ethane-2,1-diyl))diacrylamide, polyethyleneglycol diacrylamide with a molecular weight ≤2000, N,N-bis(2-acrylamidoethyl)acrylamide, 1,2-dihydroxy bis-acrylamide, or polyethyleneglycol diacrylamide with a molecular weight MW≤2000 and.

8. The polymer particles of claim 1, wherein the crosslinker has a log P value of less than about 1.

9. The polymer particles of claim 1, wherein the polymer comprises pores.

10. The polymer particles of claim 9, wherein the pores provide a polymer with a level of porosity of 40% to 95%.

* * * * *